US008802797B2

(12) United States Patent
Hagadorn et al.

(10) Patent No.: US 8,802,797 B2
(45) Date of Patent: Aug. 12, 2014

(54) VINYL-TERMINATED MACROMONOMER OLIGOMERIZATION

(71) Applicant: ExxonMobil Chemical Patents Inc., Baytown, TX (US)

(72) Inventors: John R Hagadorn, Houston, TX (US); Patrick Brant, Seabrook, TX (US); Robbert Duchateau, Eindhoven (NL); Rafael Sablong, Eindhoven (NL)

(73) Assignee: ExxonMobil Chemical Patents Inc., Houston, TX (US)

( * ) Notice: Subject to any disclaimer, the term of this patent is extended or adjusted under 35 U.S.C. 154(b) by 44 days.

(21) Appl. No.: 13/629,323

(22) Filed: Sep. 27, 2012

(65) Prior Publication Data

US 2013/0030135 A1 Jan. 31, 2013

Related U.S. Application Data

(63) Continuation-in-part of application No. 13/589,388, filed on Aug. 20, 2012, now Pat. No. 8,431,662, and a continuation-in-part of application No. 12/488,066, filed on Jun. 19, 2009, now Pat. No. 8,283,428, and a continuation-in-part of application No. 12/143,663, filed on Jun. 20, 2008, now Pat. No. 8,372,930.

(60) Provisional application No. 61/601,729, filed on Feb. 22, 2012.

(51) Int. Cl.
| C08F 4/52 | (2006.01) |
| C08F 4/64 | (2006.01) |
| C08F 4/76 | (2006.01) |
| C08F 210/06 | (2006.01) |
| C08F 10/06 | (2006.01) |

(52) U.S. Cl.
USPC ........... 526/160; 526/161; 526/170; 526/172; 526/943; 526/941; 526/348; 526/351; 526/348.2; 526/348.3; 526/348.5; 526/348.6

(58) Field of Classification Search
USPC .................................. 526/348, 172, 160, 352
See application file for complete search history.

(56) References Cited

U.S. PATENT DOCUMENTS

| 3,022,305 A | 2/1962 | Carboni |
| 3,149,178 A | 9/1964 | Hamilton et al. |
| 3,235,484 A | 2/1966 | Colfer |
| 3,382,291 A | 5/1968 | Brennan |
| 3,742,082 A | 6/1973 | Brennan |
| 3,769,363 A | 10/1973 | Brennan |
| 3,780,128 A | 12/1973 | Shubkin |
| 3,876,720 A | 4/1975 | Heilman et al. |
| 4,069,023 A | 1/1978 | Brois et al. |
| 4,110,377 A | 8/1978 | Clerici et al. |
| 4,172,855 A | 10/1979 | Shubkin |
| 4,197,398 A | 4/1980 | Floyd et al. |
| 4,239,930 A | 12/1980 | Allphin et al. |
| 4,367,352 A | 1/1983 | Watts, Jr. et al. |
| 4,413,156 A | 11/1983 | Watts, Jr. et al. |
| 4,568,663 A | 2/1986 | Mauldin |
| 4,619,756 A | 10/1986 | Dickakian |
| 4,619,758 A | 10/1986 | Pratt et al. |
| 4,704,491 A | 11/1987 | Tsutsui et al. |
| 4,814,540 A | 3/1989 | Watanabe et al. |
| 4,827,064 A | 5/1989 | Wu |
| 4,827,073 A | 5/1989 | Wu |
| 4,910,355 A | 3/1990 | Shubkin et al. |
| 4,914,254 A | 4/1990 | Pelrine |
| 4,926,004 A | 5/1990 | Pelrine et al. |
| 4,956,122 A | 9/1990 | Watts et al. |
| 4,967,032 A | 10/1990 | Ho |
| 4,973,414 A | 11/1990 | Nerger et al. |
| 4,988,764 A | 1/1991 | Nishio et al. |
| 4,999,403 A | 3/1991 | Datta et al. |
| 5,026,948 A | 6/1991 | Forbus |
| 5,068,487 A | 11/1991 | Theriot |
| 5,087,788 A | 2/1992 | Wu |
| 5,145,819 A | 9/1992 | Winter et al. |
| 5,211,834 A | 5/1993 | Forester |
| 5,229,022 A | 7/1993 | Song et al. |
| 5,241,025 A | 8/1993 | Hlatky et al. |
| 5,252,677 A | 10/1993 | Tomita et al. |
| 5,266,186 A | 11/1993 | Kaplan |
| 5,348,982 A | 9/1994 | Herboltzheimer et al. |
| 5,350,817 A | 9/1994 | Winter et al. |

(Continued)

FOREIGN PATENT DOCUMENTS

| CN | 101011062 | 8/2007 |
| DE | 2041797 | 3/1972 |

(Continued)

OTHER PUBLICATIONS

Advincula et al., *Polymer Brushes: Synthesis, Characterization, Applications*, Materials Characterization, 2005, vol. 55, pp. 249.
Alonzo et al., *Structure and Scaling Behavior of Polymer Brushes with Multiple Tethers*, Polymer Preprints, 2007, vol. 48, No. 1, pp. 781-782.
Amin et al., *Versatile Pathways for In Situ Polyolefin Functionalization with Heteroatoms: Catalytic Chain Transfer*, Angew. Chem. Int. Ed., 2008, vol. 47, No. 11, pp. 2006-2025.
Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.

(Continued)

*Primary Examiner* — Rip A. Lee
(74) *Attorney, Agent, or Firm* — Catherine L. Bell

(57) ABSTRACT

Vinyl-terminated macromonomer oligomerization, namely, a process to produce polymacromonomers comprising contacting a vinyl-terminated macromonomer with a catalyst system capable of oligomerizing vinyl-terminated macromonomer, in the presence of an aluminum containing compound, a zinc containing compound, or a combination thereof, under polymerization conditions to produce a polymacromonomer, and polymacromonomers produced thereby. Also, polymacromonomers having a degree of polymerization greater than 10, a glass transition temperature Tg of less than 60° C., and an Mn of greater than or equal to about 5000 Da.

39 Claims, 4 Drawing Sheets

(56) References Cited

U.S. PATENT DOCUMENTS

| | | |
|---|---|---|
| 5,382,634 A | 1/1995 | Koyama et al. |
| 5,439,607 A | 8/1995 | Patil |
| 5,444,125 A | 8/1995 | Tomita et al. |
| 5,498,809 A | 3/1996 | Emert et al. |
| 5,504,171 A | 4/1996 | Etherton et al. |
| 5,504,172 A | 4/1996 | Imuta et al. |
| 5,514,761 A | 5/1996 | Etherton et al. |
| 5,545,674 A | 8/1996 | Behrmann et al. |
| 5,616,153 A | 4/1997 | Mike et al. |
| 5,670,595 A | 9/1997 | Meka et al. |
| 5,688,887 A | 11/1997 | Bagheri et al. |
| 5,696,045 A | 12/1997 | Winter et al. |
| 5,705,577 A | 1/1998 | Rossi et al. |
| 5,741,946 A | 4/1998 | Wei |
| 5,744,541 A | 4/1998 | Sawaguchi et al. |
| 5,750,815 A | 5/1998 | Grubbs et al. |
| 5,756,428 A | 5/1998 | Emert et al. |
| 5,756,609 A | 5/1998 | Cohen |
| 5,773,534 A | 6/1998 | Antonelli et al. |
| 5,811,379 A | 9/1998 | Rossi et al. |
| 5,856,256 A | 1/1999 | Marks et al. |
| 5,859,159 A | 1/1999 | Rossi et al. |
| 5,874,661 A | 2/1999 | Verrelst et al. |
| 5,936,041 A | 8/1999 | Diana et al. |
| 5,998,547 A | 12/1999 | Hohner |
| 6,017,859 A | 1/2000 | Rossi et al. |
| 6,022,929 A | 2/2000 | Chen et al. |
| 6,043,401 A | 3/2000 | Bagheri et al. |
| 6,049,017 A | 4/2000 | Vora et al. |
| 6,087,460 A | 7/2000 | Marks et al. |
| 6,100,224 A | 8/2000 | Peiffer et al. |
| 6,111,027 A | 8/2000 | Wright et al. |
| 6,114,445 A | 9/2000 | Tzoganakis et al. |
| 6,114,457 A | 9/2000 | Markel et al. |
| 6,114,477 A | 9/2000 | Merrill et al. |
| 6,117,962 A | 9/2000 | Weng et al. |
| 6,133,209 A | 10/2000 | Rath et al. |
| 6,143,686 A | 11/2000 | Vizzini et al. |
| 6,143,846 A | 11/2000 | Herrmann et al. |
| 6,143,942 A | 11/2000 | Verrelst et al. |
| 6,147,173 A | 11/2000 | Holtcamp |
| 6,147,180 A | 11/2000 | Markel et al. |
| 6,169,154 B1 | 1/2001 | Machida et al. |
| 6,184,327 B1 | 2/2001 | Weng et al. |
| 6,197,910 B1 | 3/2001 | Weng et al. |
| 6,207,606 B1 | 3/2001 | Lue et al. |
| 6,211,108 B1 | 4/2001 | Bishop et al. |
| 6,225,432 B1 | 5/2001 | Weng et al. |
| 6,248,832 B1 | 6/2001 | Peacock |
| 6,255,426 B1 | 7/2001 | Lue et al. |
| 6,258,903 B1 | 7/2001 | Mawson et al. |
| 6,262,202 B1 | 7/2001 | Walzer, Jr. et al. |
| 6,268,518 B1 | 7/2001 | Resconi et al. |
| 6,271,323 B1 | 8/2001 | Loveday et al. |
| 6,291,695 B1 | 9/2001 | Marks et al. |
| 6,297,301 B1 | 10/2001 | Erderly et al. |
| 6,323,284 B1 | 11/2001 | Peacock |
| 6,342,574 B1 | 1/2002 | Weng et al. |
| 6,359,091 B1 | 3/2002 | Godschalx et al. |
| 6,407,189 B1 | 6/2002 | Herrmann |
| 6,410,666 B1 | 6/2002 | Grubbs et al. |
| 6,414,090 B2 | 7/2002 | Minami et al. |
| 6,414,091 B2 | 7/2002 | Moritomi et al. |
| 6,423,793 B1 | 7/2002 | Weng et al. |
| 6,444,773 B1 | 9/2002 | Markel |
| 6,448,350 B1 | 9/2002 | Dall'Occo et al. |
| 6,476,167 B2 | 11/2002 | Peters |
| 6,525,157 B2 | 2/2003 | Cozewith et al. |
| 6,534,611 B1 | 3/2003 | Darling et al. |
| 6,548,724 B2 | 4/2003 | Bagheri et al. |
| 6,555,635 B2 | 4/2003 | Markel |
| 6,569,965 B2 | 5/2003 | Markel et al. |
| 6,573,350 B1 | 6/2003 | Markel et al. |
| 6,576,306 B2 | 6/2003 | Mehta et al. |
| 6,635,597 B1 | 10/2003 | Marks et al. |
| 6,646,081 B2 | 11/2003 | Godschalx et al. |
| 6,660,809 B1 | 12/2003 | Weng et al. |
| 6,703,457 B2 | 3/2004 | Van Baar et al. |
| 6,706,828 B2 | 3/2004 | DiMaio |
| 6,713,438 B1 | 3/2004 | Baillargeon et al. |
| 6,750,307 B2 | 6/2004 | Weng et al. |
| 6,774,191 B2 | 8/2004 | Weng et al. |
| 6,780,936 B1 | 8/2004 | Agarwal et al. |
| 6,803,429 B2 | 10/2004 | Morgan et al. |
| 6,809,168 B2 | 10/2004 | Agarwal et al. |
| 6,884,914 B2 | 4/2005 | Mathys et al. |
| 6,897,261 B1 | 5/2005 | Machida et al. |
| 6,927,265 B2 | 8/2005 | Kaspar et al. |
| 6,939,930 B2 | 9/2005 | Reinking et al. |
| 6,977,287 B2 | 12/2005 | Agarwal et al. |
| 7,005,491 B2 | 2/2006 | Weng et al. |
| 7,101,936 B2 | 9/2006 | Weng et al. |
| 7,126,031 B2 | 10/2006 | Boussie et al. |
| 7,183,359 B2 | 2/2007 | Hanna et al. |
| 7,223,822 B2 | 5/2007 | Abhari et al. |
| 7,247,385 B1 | 7/2007 | Tzoganakis et al. |
| 7,256,240 B1 | 8/2007 | Jiang |
| 7,276,567 B2 | 10/2007 | Voskoboynikov et al. |
| 7,294,681 B2 | 11/2007 | Jiang et al. |
| 7,297,653 B2 | 11/2007 | Rodriguez |
| 7,297,806 B2 | 11/2007 | Brookhart, III et al. |
| 7,339,018 B2 | 3/2008 | Arjunan |
| 7,524,910 B2 | 4/2009 | Jiang et al. |
| 7,541,402 B2 | 6/2009 | Abhari et al. |
| 7,541,413 B2 | 6/2009 | Crowther et al. |
| 7,550,528 B2 | 6/2009 | Abhari et al. |
| 7,589,160 B2 | 9/2009 | Resconi et al. |
| 7,700,707 B2 | 4/2010 | Abhari et al. |
| 7,790,810 B2 | 9/2010 | Coates et al. |
| 7,820,607 B2 | 10/2010 | Matsuda et al. |
| 7,897,679 B2 | 3/2011 | Stevens et al. |
| 7,943,716 B2 | 5/2011 | Resconi et al. |
| 7,960,487 B2 | 6/2011 | Yang et al. |
| 8,022,142 B2 | 9/2011 | Jiang et al. |
| 8,058,351 B2 | 11/2011 | Pawlow et al. |
| 8,283,419 B2 | 10/2012 | Hagadorn et al. |
| 8,283,428 B2 | 10/2012 | Brant et al. |
| 2001/0007896 A1 | 7/2001 | Agarwal et al. |
| 2001/0053837 A1 | 12/2001 | Agarwal et al. |
| 2002/0013440 A1 | 1/2002 | Agarwal et al. |
| 2002/0137978 A1 | 9/2002 | Grubbs et al. |
| 2003/0055184 A1 | 3/2003 | Song et al. |
| 2003/0161752 A1 | 8/2003 | Luk et al. |
| 2004/0054086 A1 | 3/2004 | Schauder et al. |
| 2004/0127614 A1 | 7/2004 | Jiang et al. |
| 2004/0127649 A1 | 7/2004 | Arjunan |
| 2004/0127654 A1 | 7/2004 | Brant et al. |
| 2004/0138392 A1 | 7/2004 | Jiang et al. |
| 2004/0214953 A1 | 10/2004 | Yamada et al. |
| 2004/0220320 A1 | 11/2004 | Abhari et al. |
| 2004/0220336 A1 | 11/2004 | Abhari et al. |
| 2004/0249046 A1 | 12/2004 | Abhari et al. |
| 2005/0054793 A1 | 3/2005 | Reinking et al. |
| 2005/0159299 A1 | 7/2005 | Rodriguez et al. |
| 2005/0215693 A1 | 9/2005 | Wang et al. |
| 2005/0261440 A1 | 11/2005 | Dickakian et al. |
| 2006/0052553 A1 | 3/2006 | Resconi et al. |
| 2006/0083945 A1 | 4/2006 | Morishita et al. |
| 2006/0199873 A1 | 9/2006 | Mehta et al. |
| 2006/0270814 A1 | 11/2006 | Mako et al. |
| 2006/0280982 A1 | 12/2006 | Kanaoka et al. |
| 2006/0293453 A1 | 12/2006 | Jiang et al. |
| 2006/0293455 A1 | 12/2006 | Jiang et al. |
| 2006/0293460 A1 | 12/2006 | Jacob et al. |
| 2006/0293461 A1 | 12/2006 | Jiang et al. |
| 2006/0293462 A1 | 12/2006 | Jacob et al. |
| 2007/0129497 A1 | 6/2007 | Jiang et al. |
| 2007/0265178 A1 | 11/2007 | Patil et al. |
| 2007/0282073 A1 | 12/2007 | Weng et al. |
| 2007/0284787 A1 | 12/2007 | Weng et al. |
| 2007/0293640 A1 | 12/2007 | Jiang et al. |
| 2008/0064891 A1 | 3/2008 | Lee |
| 2008/0177121 A1 | 7/2008 | Wu et al. |
| 2008/0228017 A1 | 9/2008 | Burdett et al. |

(56) References Cited

U.S. PATENT DOCUMENTS

| | | |
|---|---|---|
| 2008/0234451 A1 | 9/2008 | Kenwright et al. |
| 2008/0251460 A1 | 10/2008 | Gstrein et al. |
| 2008/0293937 A1 | 11/2008 | Marks et al. |
| 2009/0105423 A1 | 4/2009 | Pawlow et al. |
| 2009/0149623 A1 | 6/2009 | Higami et al. |
| 2009/0198089 A1 | 8/2009 | Burton et al. |
| 2009/0205969 A1 | 8/2009 | Jimenez et al. |
| 2009/0221750 A1 | 9/2009 | Tsunogae et al. |
| 2009/0247441 A1 | 10/2009 | Baum |
| 2009/0264544 A1 | 10/2009 | Loy |
| 2009/0318640 A1 | 12/2009 | Brant et al. |
| 2009/0318644 A1 | 12/2009 | Brant et al. |
| 2009/0318646 A1 | 12/2009 | Brant et al. |
| 2009/0318647 A1 | 12/2009 | Hagadorn et al. |
| 2010/0069573 A1 | 3/2010 | Arriola et al. |
| 2010/0152387 A1 | 6/2010 | Steininger et al. |
| 2010/0152388 A1 | 6/2010 | Jiang et al. |
| 2010/0170829 A1 | 7/2010 | Ng et al. |
| 2011/0124820 A1 | 5/2011 | Lee et al. |

FOREIGN PATENT DOCUMENTS

| | | |
|---|---|---|
| EP | 0 283 958 | 9/1988 |
| EP | 0 481 480 | 4/1992 |
| EP | 0 485 822 | 5/1992 |
| EP | 0 485 823 | 5/1992 |
| EP | 0 604 917 | 7/1994 |
| EP | 0 613 873 | 7/1994 |
| EP | 0 619 325 | 10/1994 |
| EP | 0 719 802 | 7/1996 |
| EP | 0 767 182 | 4/1997 |
| EP | 0 802 216 | 10/1997 |
| EP | 0 958 309 | 11/1999 |
| EP | 1 361 232 | 11/2003 |
| EP | 1 693 357 | 8/2006 |
| EP | 1 849 757 | 10/2007 |
| EP | 1 862 491 | 12/2007 |
| EP | 1 906 473 | 4/2008 |
| FR | 2 437 243 | 4/1980 |
| FR | 2 910 004 | 6/2008 |
| GB | 1 310 847 | 3/1973 |
| JP | 47034499 | 11/1972 |
| JP | 02-064115 | 3/1990 |
| JP | 1993/320260 | 3/1993 |
| JP | 2000/038418 | 2/2000 |
| JP | 2000/038420 | 2/2000 |
| JP | 2000/080134 | 3/2000 |
| JP | 2005/009158 | 1/2005 |
| JP | 2005/093181 | 4/2005 |
| JP | 2005/139284 | 6/2005 |
| JP | 2005/336092 | 12/2005 |
| JP | 2006/002057 | 1/2006 |
| JP | 2006/342244 | 12/2006 |
| JP | 2007/169340 | 7/2007 |
| JP | 2007/246433 | 9/2007 |
| JP | 2008/050278 | 3/2008 |
| JP | 2008/287976 | 11/2008 |
| JP | 2008/291061 | 12/2008 |
| JP | 2009/299045 | 12/2009 |
| JP | 2009/299046 | 12/2009 |
| JP | 2010/013625 | 1/2010 |
| JP | 2010/037555 | 2/2010 |
| JP | 2010/202628 | 9/2010 |
| JP | 2011/026448 | 2/2011 |
| JP | 2012/051859 | 3/2012 |
| JP | 2012/052062 | 3/2012 |
| NL | 7010357 | 10/1970 |
| SU | 498300 | 1/1976 |
| WO | WO 93/12151 | 6/1993 |
| WO | WO 93/21242 | 10/1993 |
| WO | WO 95/27717 | 10/1995 |
| WO | WO 96/23751 | 8/1996 |
| WO | WO 97/09296 | 3/1997 |
| WO | WO 97/47665 | 12/1997 |
| WO | WO 98/16508 | 4/1998 |
| WO | WO 98/32784 | 7/1998 |
| WO | WO 98/40373 | 9/1998 |
| WO | WO 98/49229 | 11/1998 |
| WO | WO 99/05182 | 2/1999 |
| WO | WO 99/07788 | 2/1999 |
| WO | WO 99/28354 | 6/1999 |
| WO | WO 99/46270 | 9/1999 |
| WO | WO 00/00576 | 1/2000 |
| WO | WO 00/37514 | 6/2000 |
| WO | WO 00/55218 | 9/2000 |
| WO | WO 96/39451 | 9/2000 |
| WO | WO 01/09200 | 2/2001 |
| WO | WO 01/42322 | 6/2001 |
| WO | WO 01/81493 | 11/2001 |
| WO | WO 02/34795 | 5/2002 |
| WO | WO 02/50145 | 6/2002 |
| WO | WO 02/079127 | 10/2002 |
| WO | WO 03/040095 | 5/2003 |
| WO | WO 03/040233 | 5/2003 |
| WO | WO 03/040442 | 5/2003 |
| WO | WO 2004/026923 | 4/2004 |
| WO | WO 2004/031250 | 4/2004 |
| WO | WO 2004/046214 | 6/2004 |
| WO | WO 2004/076545 | 9/2004 |
| WO | WO 2004/090425 | 10/2004 |
| WO | WO 2004/090426 | 10/2004 |
| WO | WO 2004/090427 | 10/2004 |
| WO | WO 2005/092935 | 10/2005 |
| WO | WO 2006/069742 | 7/2006 |
| WO | WO 2006/127483 | 11/2006 |
| WO | WO 2007/003238 | 1/2007 |
| WO | WO 2007/011459 | 1/2007 |
| WO | WO 2007/018743 | 2/2007 |
| WO | WO 2007/045634 | 4/2007 |
| WO | WO 2008/027268 | 3/2008 |
| WO | WO 2008/080081 | 7/2008 |
| WO | WO 2008/087263 | 7/2008 |
| WO | WO 2008/141941 | 11/2008 |
| WO | WO 2009/009158 | 1/2009 |
| WO | WO 2009/053594 | 4/2009 |
| WO | WO 2009/061499 | 5/2009 |
| WO | WO 2009/134227 | 11/2009 |
| WO | WO 2010/057922 | 5/2010 |

OTHER PUBLICATIONS

Babu et al., "Microstructure of Poly(1-hexene) Produced by ansa-Zirconocenium Catalysis", Macromolecules, 1994, vol. 27, pp. 3383-3388.

Balboni et al., Macromolecular Chemistry and Physics, 2001, vol. 202, No. 10, pp. 2010-2028.

Baldwin et al., "Cationic Alkylaluminum-Complexed Zirconocene Hydrides as Participants in Olefin Polymerization Catalysis", JACS, 2010, vol. 132, No. 40, pp. 13969-13971.

Becer et al., Click Chemistry Beyond Metal-Catalyzed Cycloaddition, Angewandte Chemie, International Edition, 2009, vol. 48, No. 27, pp. 4900-4908.

Bhriain et al., "Polymeryl-Exchange Between Ansa-Zirconocene Catalysts for Norbornene-Ethene Copolymerization and Aluminum or Zinc Alkyls", Macromolecules, 2005, vol. 38, pp. 2056-2063.

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly($\alpha$-olefin)s", Macromolecules, 2005, vol. 38, pp. 7178-7183.

Brintzinger et al., Stereospecific Olefin Polymerization with Chiral Metallocene Catalysts, Angew. Chem. Int. Ed. Engl., 1995, 34, pp. 1143-1170.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2, 6-Bis(Imino)Pyridyl Ligands: Synthesis, Structures, and Polymerization Studies, Journal of the American Chemical Society, 1999, vol. 121, No. 38, pp. 8728-8740.

(56) References Cited

OTHER PUBLICATIONS

Brzezinska et al., *Synthesis of ABA Triblock Copolymers via Acyclic Diene Metathesis Polymerization and Living Polymerization of α-Amino Acid-N-Carboxyanhydrides*, Macromolecules, 2001, vol. 34, pp. 4348-4354.

Bujadoux et al., *Use of bridged and non-bridged metallocene catalysts in high pressure/high temperature ethylene/α-olefin copolymerization*, Metallocene Polymers, 1995, pp. 377-402.

Busico et al., $^1$ *H NMR Analysis of Chain Unsaturations in Ethene/1-Octene Copolymers Prepared with Metallocene Catalysts at High Temperature*, Macromolecules, 2005, vol. 38, No. 16, pp. 6988-6996.

Carboni et al., *Reactions of Tetrazines with Unsaturated Compounds: A New Synthesis of Pyridazines*, Journal of the American Chemical Society, 1959, vol. 81, No. 16, pp. 4342-4346.

Chen et al., *Entropically Driven Phase Separation of Highly Branched/Linear Polyolefin Blends*, Journal of Polymer Science, Part B: Polymer Physics, 2000, vol. 38, No. 22, pp. 2965-2975.

Chen et al., Reactive & Functional Polymers, 2008, vol. 68, No. 9, pp. 1307-1313.

Cheng et al., *Facile One-Pot Synthesis of Brush Polymers through Tandem Catalysis Using Grubbs' Catalyst for Both Ring-Opening Metathesis and Atom Transfer Radical Polymerizations*, Nano Letters, 2006, vol. 6, No. 8, pp. 1741-1746.

Cherian et al., Macromolecules, 2005, vol. 38, pp. 6259-6268.

Chung, *Synthesis of Functional Polyolefin Copolymers with Graft and Block Structures*, Progress in Polymer Science, 2002, vol. 27, No. 1, pp. 39-85.

Ciolino et al., *Novel Synthesis of Polyethylene-Poly(dimethylsiloxane) Copolymers with a Metallocene Catalyst*, Journal of Polymer Science, Part A: Polymer Chemistry, 2004, vol. 42, No. 10, pp. 2462-2473.

Clavier et al., *s-Tetrazines as Building Blocks for New Functional Molecules and Molecular Materials*, Reviews, 2010, vol. 110, No. 6, pp. 3299-3314.

Clerici et al., "*Catalytic C-Alkylation of Secondary Amines With Alkenes*", Synthesis, 1980, vol. 4, pp. 305-306.

Cherian et al., Synthesis of Allyl-Terminated Syndiotactic Propylene: Macromonomers for the Synthesis of Branched Polyolefins, Macromol., 2005, 38, pp. 6259-6268.

Coates, Precise Control of Polyolefin Stereochemistry Using Single-Site Metal Catalysts, Chem. Rev., 2000, 100, pp. 1223-1252.

Corey et al., "*Reactions of Hydrosilanes and Olefins in the Presence of $Cp_2MCl_2/nBuLi$*", Organometallics, 1992, vol. 11, pp. 672-683.

Cossy et al., "*Cross-Metathesis reaction. Generation of Highly Functionalized Olefins from Unsaturated Alcohols*", Journal of Organometallic Chemistry, 2001, vol. 634, Issue 2, pp. 216-221.

Cosyns, et al., "*Process for Upgrading $C_3$, $C_4$ and $C_5$ Olefinic Streams*", Pet. & Coal, 1995, vol. 37, No. 4, pp. 23-33.

Crowther et al., "*Group 4 Metal Dicarbollide Chemistry. Synthesis, Structure, and Reactivity of Electrophilie Alkyl Complexes $(Cp)(C2B9H_{11})M(R)$ (M=Hf, Zr)*", JACS, 1991, vol. 113, pp. 1455-1457.

Deeken et al., *How Common Are True Aminopyridinato Complexes?*, Z. Anorg. Allg. Chem., 2007, vol. 633, pp. 320-325.

Dekmezian et al., *Characterization and Modeling of Metallocene-Based Branch-Block Copolymers*, Macromolecules, 2002, vol. 35, No. 25, pp. 9586-9594.

Ding et al., *The Preparation of 3,6-Bis(3-hexylthien-2-yl)-s-tetrazine and Its Conjugated Polymers*, Journal of Polymer Science Part A: Polymer Chemistry, 2011, vol. 49, No. 15, pp. 3374-3386.

Doi et al., "*Living*" Coordination Polymerization of Propene with a Highly Active Vanadium-Based Catalyst, Macromolecules, 1986, vol. 19, No. 12, pp. 2896-2900.

Doring etal, European Journal of Inorganic Chemistry, 2010, No. 18, pp. 2853-2860.

Djalali et al., *Amphipolar Core-shell Cylindrical Brushes*, Macromolecular Rapid Communications, 1999, vol. 20, No. 8, pp. 444-449.

Eisenberger et al., "*Tantalum-amidate Complexes for the Hydroaminoalkylation of Secondary Amines: Enhanced Substrate Scope and Enantioselective Chiral Amine Synthesis*", Angewandte Chemie International Edition, 2009, vol. 48, pp. 8361-8365.

Elvers et al., Ullmann's Encyclopedia of Industrial Chemistry, vol. A13, VCH Verlagsgesellschaft mbH, Weinheim, 1989, pp. 243-247 and 275-276.

Eshuis, et al., "*Catalytic Olefin Oligomerization and polymerization with cationic group IV metal complexes $[Cp_2Mme(THT)]^+$ $[BPH_4]^-$, M=Ti, Zr and Hf*", Journal of Molecular Catalysis, 1990, vol. 62, pp. 277-287.

Ewen et al., Syndiospecific Propylene Polymerizations with Group 4 Metallocenes, J. Am. Chem. Soc., 1988, 110, pp. 6255-6256.

Flory, *Molecular Size Distribution in Ethylene Oxide Polymers*, Journal of American Chemical Society, 1940, vol. 62, No. 6, pp. 1561-1565.

Frauenrath et al., "*Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)*", Macromol. Rapid Commun., 1998, vol. 19, pp. 391-395.

Furuyama et al., "*New High-Performance Catalysts Developed at Mitsui Chemicals for Polyolefins and Organic Synthesis*", Catalysis Surveys from Asia, 2004, vol. 8, No. 1, pp. 61-71.

Galeotti et al., "*Self-Functionalizing Polymer Film Surfaces Assisted by Specific Polystyrene End-Tagging*", Chem. Mater., 2010, vol. 22, pp. 2764-2769.

Glatz et al., *First Row Transition Metal Aminopyridinates—The Missing Complexes*, Eur. J. Inorg. Chem., 2009, No. 10, pp. 1385-1392.

Hajela et al., Competitive Chain Transfer by β-Hydrogen and β-methyl Elimination for the Model Ziegler-Natta Olefin Polymerization System $[Me_2Si(\eta^5-C_5Me_4)_2]Sc\{CH_2CH(CH_3)_2\}(PMe_3)$, Organometallics, 1994, 13, pp. 1147-1154.

Hansell et al., *Additive-Free Clicking for Polymer Functionalization and Coupling by Tetrazine-Norbornene Chemistry*, Journal of the American Chemical Society, 2011, vol. 133, No. 35, pp. 13828-13831.

Harney et al., "*End-Group-Confined Chain Walking Within a Group 4 Living Polyolefin and Well-Defined Cationic Zirconium Alkyl Complexes for Modeling This Behavior*", JACS, 2004, vol. 126, pp. 4536-4537.

Herzon et al., "*Direct, Catalytic Hydroaminoalkylation of Unactivated Olefins with N-Alkyl Arylamines*", JACS, 2007, vol. 129, pp. 6690-6691.

Herzon et al., "*Hydroaminoalkylation of Unactivated Olefins with Dialkylamines*", JACS, 2007, vol. 130, pp. 14940-14941.

Hoogenboom et al., *Synthesis of star-shaped poly(ε-caprolactone) via 'click' chemistry and 'supramolecular click' chemistry*, Chemical Communications, 2006, pp. 4010-4012.

Hoogenboom, et al., *Synthesis and Characterization of Novel Substituted 3,6-Di(2-pyridyl)pyridazine Metal Coordinating Ligands*, European Journal of Organic Chemistry, 2003, vol. 2003, No. 24, pp. 4887-4896.

Jagtap et al., *Atomic Force Microscopy (AFM): Basics and Its Important Applications for Polymer Characterization: An Overview*, Journal of Polymer Material, 2005, vol. 21, No. 1, pp. 1-26.

Janiak et al., "*Metallocene Catalysts for Olefin Oligomerization*", Macromol. Symp., 2006, vol. 236, pp. 14-22.

Janiak et al., "*Analyses of Propene and 1-Hexene Oligomers from Zirconium/MAO Catalysts—Mechanistic Implications by NMR, SEC, and MALDI-TOF MS*", Macromol. Chem. Phys., 2002, vol. 203, pp. 129-138.

Janiak et al., "*Metallocene and Related Catalysts for Olefin, Alkyne and Silane Dimerization and Oligomerization*", Coordination Chemistry Reviews, 2006, vol. 250, pp. 66-94.

Jiang et al., "*Highly Z-Selective Metathesis Homocoupling of Terminal Olefins*", JACS, 2009, vol. 131, pp. 16630-16631.

Johnson et al., *Copolymerization of Ethylene and Propylene with Functionalized Vinyl Monomers by Palladium (II) Catalysts*, Journal of American Chemical Society, 1996, vol. 118, No. 1, pp. 267-268.

Jones et al., "*Synthesis and Reactive Blending of Amine and Anhydride End-Functional Polyolefins*", Polymer, 2004, vol. 45, pp. 4189-4201.

(56) References Cited

OTHER PUBLICATIONS

Kaneyoshi, Hiromu et al., Synthesis of Block and Graft Copolymers with Linear Polyethylene Segments by Combination of Degenerative Transfer Coordination Polymerization and Atom Transfer Radical Polymerization, Macromolecules, 38, 2005, pp. 5425-5435.

Kaneyoshi et al., *Synthesis of a Linear Polyethylene Macromonomer and Preparation of Polystyrene-graft-Polyethylene Copolymers via Grafting-Through Atom Transfer Radical Polymerization*, Journal of Applied Polymer Science, 2007, vol. 105, No. 1, pp. 3-13.

Kawahara et al., *The Detailed Analysis of the Vinylidene Structure of Metallocene-catalyzed Polypropylene*, Polymer, 2004, vol. 45, No. 2, pp. 355-357.

Kesti et al., "*Group 4 Metallocene Olefin Hydrosilyation Catalysts*", Organometallics, 1992, vol. 11, pp. 1095-1103.

Kim et al., *The Synthesis of Random Brush for Nanostructure of Block Copolymer*, Macromol. Symp., 2007, vol. 249-250, pp. 303-306.

Kissin et al., "*Post-Oligomerization of α-Olefin Oligomers: A Route to Single-Component and Multipcomponent Synthetic Lubricating Oils*", Journal of Applied Polymer Science, 2009, vol. 111, pp. 273-280.

Klep et al., *Nanoparticles: Synthesis, Passivation, Stabilization and Functionalization*, The 233rd ACS National Meeting, Chicago, IL, Mar. 25-29, 2007, COLL 124, Abstract.

Kobayashi, "*Routes to Functionalized Polyolefins*", The Dow Chemical Company, 2003.

Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.

Kolodka et al., "*Synthesis and Characterization of Long-Chain-Branched Polyolefins with Metallocene Catalysts: Copolymerization of Ethylene with Poly(Ethylene-Co-Propylene) Macromonomer*", Macromol. Rapid Commun., 2003, vol. 24, pp. 311-315.

Koo et al., "*Efficient New Routes to Functionalized Polyolefins*", ChemTech. 1999, pp. 13-19.

Koo et al., "*Silicon-Modified Ziegler-Natta Polymerization. Catalytic Approaches to Silyl-Capped and Silyl-Linked Polyolefins Using "Single-Site" Cationic Ziegler-Natta Catalysts*", Journal of American Chemical Society, 1999, vol. 121, pp. 8791-8802.

Kostalik et al., "*Solvent Processable Tetraalkylammonium-Functionalized Polyethylene for Use as an Alkaline Anion Exchange Membrane*", Macromolecules, 2010, vol. 43, pp. 7147-7150.

Kovalev et al., *Cycloaddition to sym-Tetrazines (The Corboni-Lindsey Reaction) (Review)*, Chemistry of Heterocyclic Compounds, 1981, vol. 17, No. 11, pp. 1063-1076.

Kubiak et al., "*Titanium-Catalyzed Hydroaminoalkylation of Alkenes by C-H Bond Activation at SP3 Centers in the Alpha-Position to a Nitrogen Atom*", Angewandte Chemie International Edition, 2009, vol. 48, No. 6, pp. 1153-1156.

Labinger et al., Metal-Hydride and Metal-Alkyl Bond Strengths: The Influence of Electronegativity Differences, Organometallics, 1988, 7 pp. 926-928.

Lahitte et al., *Homopolymerization of ω -Allyl or ω -Undecenyl Polystyrene Macromonomers via Coordination Polymerization*, Polymer Preprint, ACS, Div. of Polym. Chem., 2003, vol. 44, No. 2, pp. 46-47.

Lahitte et al., *Homopolymerization of ω -Styryl-Polystyrene Macromonomers in the Presence of CpTiF₃/MAO*, Macromolecular Rapid Communications, 2004, vol. 25, No. 10, pp. 1010-1014.

Lahitte et al., *Design of New Styrene Enriched Polyethylenes via Coordination Copolymerization of Ethylene with Mono- or α, ω -difunctional Polystyrene Macromonomers*, Polymer, 2006, vol. 47, No. 4, pp. 1063-1072.

Langston et al., "*One-Pot Synthesis of Long Chain Branch PP (LCBPP) Using Ziegler-Natta Catalyst and Branching Reagents*", Macromol. Symp., 2007, vol. 260, pp. 34-41.

Lehmus et al., "*Chain End Isomerization as a Side Reaction in Metallocene-Catalyzed Ethylene and Propylene Polymerizations*", Macromolecules, 2000, vol. 33, pp. 8534-8540.

Liu et al., *Kinetics of Initiation, Propagation, and Termination for the [rac-(C2H4(1-indenyl)2)ZrMe]{MeB(C6F5)3}-Catalyzed Polymerization of 1-Hexene*, Journal of the American Chemical Society, 2001, vol. 123, pp. 11193-11207.

Nikopoulou et al., "*Anionic Homo- and Coploymerization of Styrenic Triple-Tailed Polybutadiene Macromonomers*", Journal of Polymer Science: Part A-Polymer Chemistry, 2007, vol. 45, Issue 16, pp. 3513-3523.

Kapnistos et al., "*Linear Rheology of Comb Polymers with Star-Like Backbones: Melts and Solutions*", Rheologica Acta, 2006, vol. 46, No. 2, pp. 273-286.

Lopez et al., *Synthesis of Well-defined Polymer Architectures by Successive Catalytic Olefin Polymerization and Living/Controlled Polymerization Reactions*, Progress in Polymer Science, 2007, vol. 32, No. 4, pp. 419-454.

Lu et al., "*Reactivity of Common Functional Groups with Urethanes: Models for Reactive Compatibilization of Thermoplastic Polyurethane Blends*", Journal of Polymer Science: Part A: Polymer Chemistry, 2002, vol. 40, pp. 2310-2328.

McNamee et al., *Preparation and Characterization of Pure and Mixed Monolayers of Poly(ethylene Glycol) Brushes Chemically Adsorbed to Silica Surfaces*, Langmuir, 2007, vol. 23, No. 8, pp. 4389-4399.

Markel, et al., "*Metallocene-Based Branch-Block Thermoplastic Elastomers*", Macromolecules, 2000, vol. 33, pp. 8541-8548.

Mathers et al., *Cross Metathesis Functionalization of Polyolefins*, Chemical Communications—Chemcom, Royal Society of Chemistry, 2004, No. 4, pp. 422-423.

Matoishi et al., *Value-added Olefin-based Materials Originating from FI Catalysis: Production of Vinyl- and Al-terminated PEs, End-functionalized PEs, and PE/polyethylene Glycol Hybrid Materials*, Catalysis Today, 2011, vol. 164, No. 1, pp. 2-8.

Matyiaszewski, *Functional Star, Comb, Brush and (Hyper)Branched Polymers by ATRP*, Polymeric Materials: Science & Engineering, 2001, vol. 84, pp. 363-364.

Mazzolini et al., *Polyethylene End Functionalization Using Radical-Mediated Thiol-Ene Chemistry: Use of Polyethylenes Containing Alkene End Functionality*, Macromolecules, 2011, vol. 44, pp. 3381-3387.

Moscardi et al., "*Propene Polymerization with the Isospecfic, Highly Regioselective rac-Me₂C(3-t-Bu-1-Ind)₂ZrCl₂/MAO Catalyst. 2. Combined DFT/MM Analysis of Chain Propagation and Chain Release Reactions*", Organometallics 2001, vol. 20, pp. 1918-1931.

Nagai et al., *Novel Well-defined Funcationalized Polyolefins and Polyolefin-polar Polymer Block Copolymers: Formations and Their Features*, Poly Preprints, 2008, vol. 49, No. 2, 776-777.

Nakatsuka et al., *Creation and Application of New Materials by a Fusion of FI-catalyst Technology and Fine Organic Synthesis Technology*, Shokubai, 2010, vol. 52, No. 8, pp. 569-574.

Negishi et al., "*Reaction of Zirconocene Dichloride with Alkyl-lithiums or Alkyl Grignard Reagents as a Convenient Method for Generating a "Zirconocene" Equivalent and its Use in Zirconium-Promoted Cyclization of Alkenes, Alkynes, Dienes, Enynes, and Diyness[1]*", Tetrahedron Letters, 1986, vol. 27, No. 25, pp. 2829-2832.

Nilsson et al., "*Structural Effects on Thermal Properties and Morphology in XLPE*", European Polymer Journal, 2010, vol. 46, pp. 1759-1769.

Ornelas et al., *Efficient Mono- and Bifunctionalization of Poly-olefin Dendrimers by Olefin Metathesis*, Angew. Chem. Int. Ed., 2005, vol. 44, No. 45, pp. 7399-7404.

Ornelas et al., *Cross Olefin Metathesis for the Selective Functionalization, Ferrocenylation, and Solubilization in Water of Olefin-Terminated Dendrimers, Polymers, and Gold Nanoparticles and for a Divergent Dendrimer Constructions*, Journal of American Chemical Society, 2008, vol. 130, No. 4, pp. 1495-1506.

Parks et al., "*Studies on the Mechanism of B(C₆F₅)₃-Catalyzed Hydrosilation of Carbonyl Functions*", J. Org. Chem., 2000, vol. 65, pp. 3090-3098.

Passaglia et al., "*Grafting of Diethyl Maleate and Maleic Anhydride Onto Styrene-b-(Ethylene-co-1-Butene)-b-Styrene Triblock Copolymer (SEBS)*", Polymer, 2000, vol. 41, pp. 4389-4400.

(56) References Cited

OTHER PUBLICATIONS

Patil et al., *New Monomers and Comb Polymers*, The 233rd ACS National Meeting, Chicago, IL, Mar. 25-29, 2007, BMGT 17, Abstract.

Prochnow et al., "*Tetrabenzyltitanium: An Improved Catalyst for the Activation of SP3 C-H Bonds Adjacent to Nitrogen Atoms*", ChemCatChem, 2009, vol. 1, No. 1, pp. 162-172.

Quirk et al., "*Anionic Synthesis of Secondary Amine Functionalized Polymers by Reaction of Polymeric Organolithiums with N-Benzylidenemethylamine*", Macromolecular Chemistry and Physics, 2002, vol. 203, pp. 1178-1187.

Rathgeber, et al., "*Bottle-brush Macromolecules in Solution: Comparison Between Results Obtained from Scattering Experiments and Computer Simulations*", Polymer, 2006, vol. 47, pp. 7318-7327.

Rathgebar et al., *On the Shape of Bottle-Brush Macromolecules: Systematic Variation of Architectural Parameters*, The Journal of Chemical Physics, 2005, vol. 122, No. 12, pp. 124904-1 and 124904-13.

Resconi et al., *Chain Transfer Reactions in Propylene Polymerization with Zirconocene Catalysts*, Topics in Catalysis, 1999, vol. 7, No. 1-4, pp. 145-163.

Resconi et al., *Selectivity in Propene Polymerization with Metallocene Catalysts*, Chem. Rev., 2000, 100, pp. 1253-1345.

Resconi, et al., "*Olefin Polymerization at Bis(pentamethylcyclopentadienyl)zirconium and—hafnium Centers: Chain-Transfer Mechanisms*," J. Am. Chem. Soc., 1992, vol. 114, pp. 1025-1032.

Reznichenko et al., "*Group 5 Metal Binaptholate Complexes for Catalytic Asymmetric Hydroaminoalkylation and Hydroamination/Cyclization*", Organometallics, 2011, vol. 30, pp. 921-924.

Roesky, "*Catalytic Hydroaminoalkylation*", Angewandte Chemie International Edition, 2009, vol. 48, pp. 4892-4894.

Rodriguez et al., *Poly(4-vinylpyridazine). First Synthesis, Characterization and Properties*, Polymeric Materials Science and Engineering, Proceedings of the ACS Division of Polymeric Materials Science and Engineering, 1990, vol. 63, pp. 376-382 (Abstract).

Rose et al., "*Poly(ethylene-co-propylene macromonomer)s: Synthesis and Evidence for Starlike Conformaitons in Dilute Solution*", Macromolecules, 2008, vol. 41, pp. 559-567.

Rossi et al., "*End Groups in 1-Butene Polymerization Via Methylaluminoxane and Zirconocene Catalyst*", Macromolecules, 1995, vol. 28, pp. 1739-1749.

Rulhoff et al., *Direct copolymerization of Propene and Ethyene-based Macromers to Produce Long Chain Branched Syndiotactic Polypropene*, Macromolecular Symposia, 236 (Olefin Polymerization), pp. 161-157.

Rulhoff, et al., "*Synthesis and Characterization of Defined Branched Poly(propylene)s with Different Microstructures by Copolymerization of Propylene and Linear Ethylene Oligomers ($C_n$=26-28) with Metallocenes*", Macromolecular Chemistry and Physics, 2006, vol. 207, pp. 1450-1460.

Rybak et al., "*Acyclic Diene Metathesis with a Monomer with a Monomer from Renewable Resources: Control of Molecular Weight and One-Step Preparation of Block Copolymers*", ChemSusChem, 2008, vol. 1, pp. 542-547.

Sainath et al., *Synthesis and Characteristics of Succinic Anhydride- and Disodium Succinate—Terminated Low Molecular Weight Polyethylenes*, Macromolecules, Communication to the Editor, 2009, pp. A-C.

Sainath et al., *Synthesis and Characteristics of Succinic Anhydride- and Disodium Succinate—Terminated Low Molecular Weight Polyethylenes*, Mitsui Chemicals, Inc., Research Center, Japan, pp. S1-S12, 2009.

Scherman et al., "*Synthesis and Characterization of Stereoregular Ethylene-Vinyl Alcohol Copolymers Made by Ring-Opening Metathesis Polymerization*", Macromolecules, 2005, vol. 38, pp. 9009-9014.

Schulz, *Über die Beziehung zwischen Reaktionsgeschwindigkeit and Zusammensetzung des Reaktionsproduktes bei Makropolymerisationsvorgängen*, Phys. Chem. Abst. B, 1935, 30, pp. 379-398.

Schulze et al., *Synthesis of Poly(propene-g-styrene) Graft Copolymers by Metallocene Catalyzed Copolymerization of Propene with Allyl-Terminated Polystyrene Macromonomer Obtained via Quasiliving Atom Transfer Radical Polymerization and the Effect of the Grafts on Blending Polypropene with Polystyrene*, Macromolecules, 2003, vol. 36, No. 13, pp. 4719-4726.

Scott et al., *Di- and Trivalent Lanthanide Complexes Stabilized by Sterically Demanding Aminopyridianto Ligands*, Eur. J. Inorg. Chem., 2005, pp. 1319-1324.

Seayed et al., "*Hydroaminomethylation of Olefins Using a Rhodium Carbene Catalyst*", Tetrahedron Letters, 2003, vol. 44, No. 8, pp. 1679-1683.

Segawa et al., "*Catalytic Hydroaminoalkylation of Alkene*", Yuki Gosei Kagaku Kyokaishi, 2009, vol. 67, No. 8, pp. 834-844 (Abstract only).

Seppälä et al., *Polymerization and Characterization of Long-Chain Branched Polyethylene Obtained via Metallocene Catalysts*, Polymer Preprint, ACS, Div. Polym. Chem., 2003, vol. 44, No. 2, pp. 26.

Shiono et al., *Copolymerization of poly(propylene) macromonomer with ethylene by (tert-butanamide)dimethyl(tetramethyl-qscyclopentadienyl) silane titanium dichloride/methylaluminoxane catalyst*, Macromol. Chem. Phys., 1997, vol. 198, pp. 3229-3237.

Shiono et al., "*Additive Effects of Trialkylaluminum on Propene Polymerization with (t-BuNSiMe$_2$Flu)TiMe$_2$-Based Catalysts*", Applied Catalysis A: General, 2000, vol. 200, pp. 145-152.

Shiono et al., *Copolymerization of Atactic Polypropene Macromonomer with Propene by an Isospecific Metallocene Catalyst*, Macromolecules, 1999, 32, pp. 5723-5727.

Sill et al., "*Bis-Dendritic Polyethylene Prepared by Ring-Opening Metathesis Polymerization in the Presence of Bis-Dendritic Chain Transfer Agents*", Journal of Polymer Science: Part A: Polymer Chemistry, 2005, vol. 43, pp. 5429-5439.

Small, et al., "*Polymerization of Propylene by a New Generation of Iron Catalysts: Mechanisms of Chain Initiation, Propagation, and Termination*", Macromolecules, 1999, vol. 32, pp. 2120-2130.

Small et al., *Highly Active Iron and Cobalt Catalysts for the Polymerization of Ethylene*, Journal of American Chemical Society, 1998, vol. 120, No. 16, pp. 4049-4050.

Sokoloff, *Theory of Friction Between Neutral Polymer Brushes*, Macromolecules, 2007, vol. 40, No. 11, pp. 4053-4058.

Stadler et al., *Synthesis and Characterization of Novel Ethylene-graft-Ethylene/Propylene Copolymers*, Macromolecules, 2011, vol. 44, pp. 5053-5063.

Stadler et al., "*Long-Chain Branches in Syndiotactic Polypropene Induced by Vinyl Chloride*", Macromolecular Chemistry and Physics, 2010, vol. 211, pp. 1472-1481.

Sun et al., *Iron Complexes Bearing 2-Imino-1,10-phenanthrolinyl Ligands as Highly Active Catalysts for Ethylene Oligomerization*, Organometallics, 2006, vol. 25, No. 3, pp. 666-677.

Sun et al., *Effect of Short Chain Branching on the Coil Dimensions of Polyolefins in Dilute Solution*, Macromolecules, 2001, vol. 34, No. 19, pp. 6812-6820.

Sunderhaus et al., "*Oxidation of Carbon-Silicon Bonds: The Dramatic Advantage of Strained Siletanes*", Organic Letters, 2003, vol. 5, No. 24, pp. 4571-4573.

Switek et al., "*ABA Triblock Copolymers with a Ring-Opening Metathesis Polymerization/Macromolecular Chain-Transfer Agent Approach*", Journal of Polymer Science: Part A: Polymer Chemistry, 2007, vol. 45, pp. 361-373.

Tellmann et al., *Selective Dimerization/Oligomerization of α-Olefins by Cobalt Bis(imino)pyridine Catalysts Stabilized by Trifluoromethyl Substituents: Group 9 Metal Catalysts with Productivities Matching Those of Iron Systems*, Organometallics, 2005, vol. 24, No. 2, pp. 280-286.

Thomas et al., "*Synthesis of Telechelic Polyisoprene via Ring-Opening Metathesis Polymerization in the Presence of Chain Transfer Agent*", Macromolecules, 2010, vol. 43, pp. 3705-3709.

Toyota et al., Synthesis of terminally functionalized polyolefins, Polymer Bulletin 48, 2002, pp. 213-219.

(56) References Cited

OTHER PUBLICATIONS

VanderHart et al., *Effect of Tacticity on the Structure of Poly(1-octadecene)*, Macromolecular Chemistry and Physics, 2004, vol. 205, No. 14, pp. 1877-1885.

Vogt, Oligomerization of Ethylene to Higher Linear α-Olefins, B. Cornils et al., Editors, Applied Homogeneous Catalysis with Organometallic Compounds, A Comprehensive Handbook, vol. 1, VCH Verlagsgesellschaft mbH, Weinheim, 1996, pp. 245-258.

Wasilke et al., "*Concurrent Tandem Catalysis*", Chemical Rev, 2005, vol. 105, pp. 1001-1020.

Wei et al., "*Aufbaureaktion Redux: Scalable Production of Precision Hydrocarbons from $AlR_3$ (R=Et or iBu) by Dialkyl Zinc Mediated Ternary Living Coordinative Chain-Transfer Polymerization*", Angewandte Chemie Inernational Edition, 2010, vol. 49, pp. 1768-1772.

Weng et al., *Synthesis of Long-Chain Branched Propylene Polymers via Macromonomer Incorporation*, Macromol. Rapid Commun., 2001, vol. 22, No. 18, pp. 1488-1492.

Weng et al., Synthesis of Vinyl-Terminated Isotactic Poly(propylene), Macromol. Rapid Commun., 2000, 21, No. 16, pp. 1103-1107.

Weng et al., Long Chain Branched Isotactic Polypropylene, Macromolecules, 2002, vol. 35, pp. 3838-3843.

Wintermantel et al., *Molecular Bottlebrushes*, Macromolecules, 1996, vol. 29, No. 3, pp. 978-983.

Wu et al., *Synthesis of Polynorbornene-poly(ethylene-co-propylene) Diblock Copolymers*, Polymeric Materials Science and Engineering, 1998, vol. 78, pp. 158-159.

Xu et al., *Ethylene Copolymerization with 1-Octene Using a 2-Methylbenz[e]indenyl-Based ansa-Monocyclopentadienylamido Complex and Methylaluminoxane Catalyst*, Macromolecules, 1998, vol. 31, pp. 4724-4729.

Yang, et al., "*Cationic Metallocene Polymerization Catalysts, Synthesis and Properties of the First Base-Free Zirconocene Hydride*", Angew. Chem. Intl. Edn. Engl., 1992, vol. 31, pp. 1375-1377.

Yanjarappa et al., *Recent Developments in the Synthesis of Functional Poly(olefin)s*, Progress in Polymer Science, 2002, vol. 27, No. 7, pp. 1347-1398.

Yin et al., "*Scope and Mechanism of Allylic C-H Amination of Terminal Alkenes by the Palladium/PhL(OPiv)$_2$ Catalyst System: Insights into the Effect of Naphthoquinone*", JACS, 2010, vol. 132, pp. 11978-11987.

Zhang et al., "*Functionalization of Polyolefins Through Catalytic Hydrosilylation and Imidation Reactions*", ANTEC, 2005, pp. 2686-2690.

Zhang et al., *Conformation of Cylindrical Brushes in Solution: Effect of Side Chain Length*, Macromolecules, 2006, vol. 39, No. 24, pp. 8440-8450.

Zhao et al., *Comb-Coil Polymer Brushes on the Surface of Silica Nanoparticles*, Macromolecules, 2005, vol. 38, No. 26, pp. 10619-10622.

Zhu et al., Synthesis and Characterization of Long-Chain-Branched Polyolefins with Metallocene Catalysts: Copolymerization of Ethylene with Poly(ethylene-co-propylene) Macromonomer, Macromol. Rap. Commun., 2003, 24, pp. 311-315.

Oligomerization of VT-aPP and catalyst precursor structure.

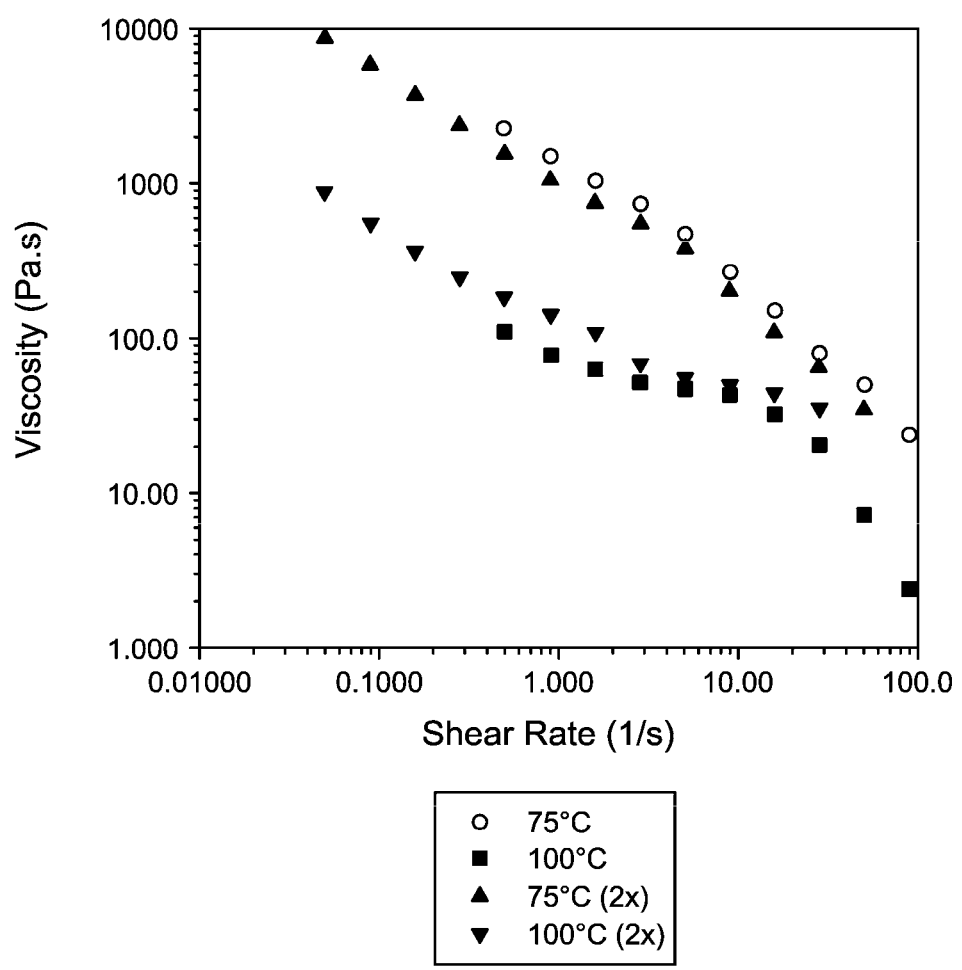

VINYL-TERMINATED MACROMONOMER OLIGOMERIZATION

PRIORITY CLAIM

This application claims the benefit of and priority from application U.S. Ser. No. 61/601,729, filed Feb. 22, 2012; and this application is a continuation-in-part of U.S. Ser. No. 12/488,066, filed Jun. 19, 2009, now U.S. Pat. No. 8,283,428 which is a continuation-in-part of 12/143,663, filed Jun. 20, 2008, now Allowed; each of which are hereby incorporated herein by reference in their entireties. This application is also a continuation-in-part of U.S. Ser. No. 13/589,388, filed Aug. 20, 2012, which is incorporated by reference herein.

FIELD OF THE INVENTION

This invention relates to oligomerization/polymerization of vinyl-terminated macromonomers and the oligomacromonomers/polymacromonomers produced by such oligomerization.

BACKGROUND OF THE INVENTION

Polyolefins are of great interest in industry as they have many uses in many different areas. For example, polyolefins, such as polyethylene and polypropylene, are often used in everything from waxes and plasticizers to films and structural components. Of late many have been interested in modifying the architecture of such polyolefins in the hopes of obtaining new and better combinations of properties. One method of controlling polyolefin architecture is to select monomers that will impart specific characteristics or tailoring the monomers used. For example, several have tried to produce large "monomers" called "macromonomers" or "macromers" having amounts of vinyl, vinylidene or vinylene termination that can be polymerized with smaller olefins such as ethylene or propylene to impart long chain branching, structural properties, etc. to a polyolefin. Typically, vinyl macromonomers are found more useful or easier to use than vinylene or vinylidene macromonomers.

Vinyl-terminated (VT) polyethylene (PE) and poly(ethylene/propylene) have been used as macromonomers with propylene copolymerization for the synthesis of long chain branched polymers. These VT-macromonomers, generated in situ or isolated prior to use, can for example be used to afford comb-like polyolefins, with improved properties such as processability, even for low macromonomer incorporation. Yet, the oligomerization of at least some types of macromers with a high degree of polymerization has been elusive.

SUMMARY OF THE INVENTION

In an embodiment, a process to produce polymacromonomers comprises contacting a vinyl-terminated macromonomer having a number average molecular weight (Mn) of 125 (preferably 160) Da or more and at least 30% (preferably at least 40%, at least 50%, preferably at least 60%, preferably at least 70%) vinyl termination (as measured by $^1$H NMR) relative to total unsaturations, and up to 40 wt % of $C_2$ to $C_{18}$ comonomer, with a catalyst system capable of oligomerizing vinyl-terminated macromonomer, optionally, in the presence of a reversible chain transfer agent selected from an aluminum containing compound, a zinc containing compound, or a combination thereof, under polymerization conditions at a temperature from 20° C. to 180° C. and a reaction time of 1 min to 24 hours to produce a polymacromonomer having a degree of polymerization greater than 10, a branching index g' (vis) less than 0.9, a Tg from −10° C. to 40° C. and an Mn of greater than or equal to about 5000 Da.

In another embodiment, this invention relates to a process to produce polymacromonomers comprising contacting (1) a vinyl-terminated macromonomer having an Mn of 125 Da or more and at least 70% vinyl termination (as measured by $^1$H NMR) relative to total unsaturations, and (2) up to 40 wt % of $C_2$ to $C_{18}$ comonomer, with (3) a catalyst system capable of oligomerizing vinyl-terminated macromonomer, in the presence of a chain transfer agent, under polymerization conditions at a temperature from 20° C. to 180° C. and a reaction time of 1 min to 24 hours to produce a polymacromonomer having a degree of polymerization greater than 10, a branching index $g'_{(vis)}$ less than 0.9, a Tg from −10° C. to 40° C., and an Mn of greater than or equal to about 5000 Da.

In an embodiment, a polymacromonomer comprises at least one atactic propylene macromonomer and from 0 wt % to 40 wt % of a $C_2$ to $C_{18}$ comonomer, wherein the polymacromonomer has a degree of polymerization greater than 10, an Mn greater than 1600 (preferably greater than 5000) Da, a branching index $g'_{(vis)}$ less than 0.9, and a glass transition temperature less than 60° C., wherein the macromonomer prior to polymerization comprises:
1) from 12 to 600 carbon atoms,
2) an Mn of 170 or more,
3) a melting point (Tm) of 60° C. or less, and
4) less than 10 wt % aromatic containing monomer, based on the weight of the macromonomer.

BRIEF DESCRIPTION OF THE FIGURES

FIG. 2c is a graph of viscosity as a function of shear rate at various temperatures for a oligomacromonomer according to an embodiment (run 82).

DETAILED DESCRIPTION

Figure 1:
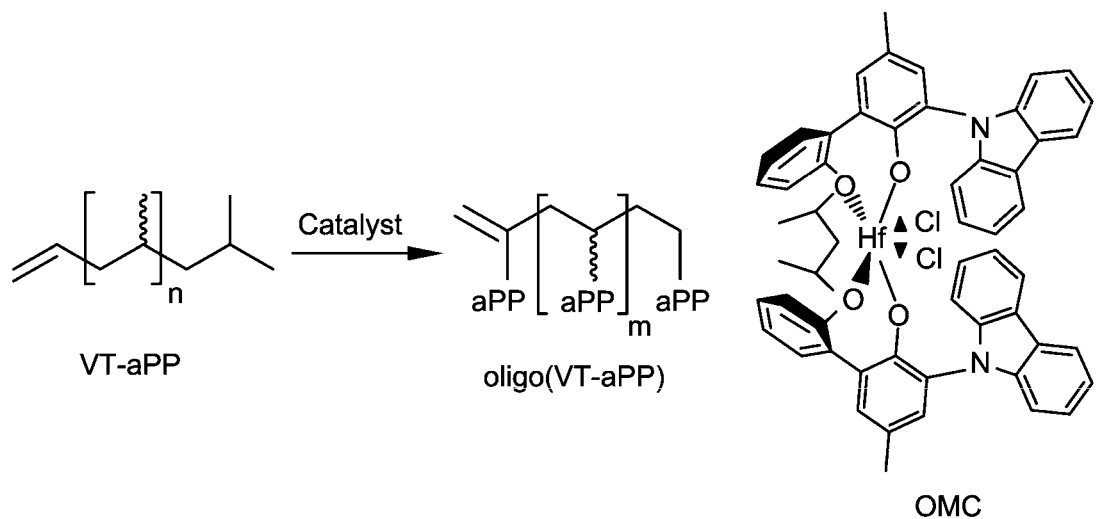
FIG. 1 is a representation of oligomerization of VT-aPP and catalyst precursor structure.

In the structures depicted throughout this specification and the claims, a solid line indicates a bond, and an arrow indicates that the bond may be dative.

As used herein, the new notation for the Periodic Table Groups is used as described in *Chemical and Engineering News*, 63(5), 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

A "polymer" has two or more of the same or different mer units. A "homopolymer" is a polymer having mer units that are the same. A "copolymer" is a polymer having two or more mer units that are different from each other. A "heterooligomer" is an oligomeric copolymer. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 30,000 g/mol or less (e.g., 21,000, 10,000, 8,000, 5,000 or 2,500 g/mol or less); in other embodiments, an oligomer has a low number of mer units (such as 200, 150, 100, 75 or 50 mer units or less).

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

For purposes of this invention, the term "macromonomer" refers to a polymerizable olefin oligomer, which in embodiments has an Mn, prior to incorporation of the macromonomer units into a polymeric chain, of from 100 to 10,000 g/mol as measured by $^1$H NMR. The term "polymacromonomer" refers to a polymeric species comprising at least two macromonomer units and "oligomacromonomer" refers to a low molecular weight polymacromonomer having a low degree of polymerization. The "degree of polymerization" refers to the number average number of macromonomer units in a polymacromonomer, or the number of macromonomer units in a polyolefin-co-macromonomer. A co-oligomer is an oligomer comprising at least two different monomers or macromonomer units, such as, for example, propylene and ethylene monomers, macromonomers having different compositions or different molecular weights, and the like. A homo-macromonomer is a macromonomer comprising units of the same monomer (such as propylene). A propylene oligomer/polymer/macromonomer/polymacromonomer is an oligomer/polymer/macromonomer/polymacromonomer having at least 50 mol % of propylene, respectively.

The terms "catalyst" and "catalyst compound" are defined to mean a compound capable of initiating catalysis. In the description herein, the catalyst may be described as a catalyst precursor, a pre-catalyst compound, or a transition metal compound (for example, a metallocene compound), and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion. Likewise, when catalyst components are described as comprising neutral stable forms of the components, it is well understood by one of ordinary skill in the art, that the ionic form of the component is the form that reacts with the monomers to produce polymers. In addition, a reactor is any container(s) in which a chemical reaction occurs.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

A propylene polymer is a polymer having at least 50 mol % of propylene. As used herein, Mn is number average molecular weight as determined by proton nuclear magnetic resonance spectroscopy ($^1$H NMR) where, unless otherwise stated, the data are collected at 120° C. in a 5 mm probe using a spectrometer with a $^1$H frequency of at least 400 MHz. Data is recorded using a maximum pulse width of 45°, 8 seconds between pulses and signal averaging 120 transients. Unless stated otherwise, Mw is weight average molecular weight as determined by gel permeation chromatography (GPC), Mz is z average molecular weight as determined by GPC as described in the VINYL-TERMINATED MACROMONOMERS section below, wt % is weight percent, and mol % is mole percent. Molecular weight distribution (MWD) is defined to be Mw (GPC) divided by Mn (GPC). Unless otherwise noted, all molecular weight units, e.g., Mw, Mn, Mz, are g/mol.

An "aromatic containing monomer" is a $C_4$ to $C_{36}$ hydrocarbyl group containing at least one aromatic group. Examples include styrene, alpha-methyl styrene, para-methyl-styrene, and 4-(dichloromethylsilyl)diphenylethylene. An aromatic group is defined to be a cyclic group having at least one pair of conjugated double bonds. Examples include cyclopentadiene, indene, fluorene, and benzene.

A "styrenic" monomer is a monomer comprising a styrene unit, such as:

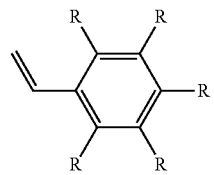

wherein each R is, individually, hydrogen or a $C_1$ to $C_{12}$ hydrocarbyl group, or $C_1$ to $C_{12}$ substituted hydrocarbyl group, or substituted with a halogen (such as Br or Cl).

A reaction zone is any vessel where a reaction occurs, such as glass vial, a polymerization reactor, reactive extruder, tubular reactor, and the like.

As used herein the term continuous means a system that operates without interruption or cessation. For example a continuous process to produce a polymer would be one where the reactants are continually introduced into one or more reactors and polymer product is continually withdrawn.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, 4M1P is 4-methyl-1-pentene, BHT is butylated hydroxytoluene (2,6-tBu$_2$-4-Me-C$_6$H$_2$OH), BF$_{20}$ is [CPh$_3$]$^+$[B(C$_6$F$_5$)$_4$], TMS is trimethylsilyl, TIBA (or TIBAL) is triisobutylaluminum, TNO (or TNOAL is triisobutyl n-octylaluminum, MAO is methylalumoxane, OMC is ordered mesoporous carbon composite catalyst, CTA is chain transfer agent, pMe is para-methyl, Ar* is 2,6-diisopropylaryl, Bz is benzyl, THF is tetrahydrofuran, PP is polypropylene, aPP is atactic polypropylene, iPP is isotactic polypropylene, M is macromonomer, VTM is vinyl-terminated macromonomer, DP is degree of polymerization, RT is room temperature which is defined as 25° C. unless otherwise specified, and tol is toluene.

Vinyl-Terminated Macromonomers

A "vinyl-terminated macromonomer," (also referred to as a "VTM" or a "vinyl-terminated polyolefin") as used herein, refers to one or more of:

(i) a vinyl-terminated polymer having at least 5% allyl chain ends (preferably 15%, 20%, 30%, 40%, 50%, 60%, 70%, 80%, 90%, 95%, 98%, or 99%);

(ii) a vinyl-terminated polymer having an Mn of at least 160 g/mol, preferably at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl-terminated macromonomer has at least 40% allyl chain ends relative to total unsaturation;

(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;

(vii) a propylene oligomer, comprising: at least 50 mol % propylene and from 10 mol % to 50 mol % ethylene, wherein the oligomer has: at least 90% allyl chain ends, an Mn of about 150 g/mol to about 20,000 g/mol, preferably 10,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0;

(x) a homo-oligomer, comprising propylene, wherein the oligomer has: at least 93% allyl chain ends, an Mn of about 500 g/mol to about 70,000 g/mol, alternately to about 20,000 g/mol, an isobutyl chain end to allylic vinyl group ratio of 0.8:1 to 1.2:1.0, and less than 1400 ppm aluminum;

(xi) vinyl-terminated polyethylene having: (a) at least 60% allyl chain ends; (b) a molecular weight distribution of less than or equal to 4.0; (c) a g'$_{(vis)}$ of greater than 0.95; and (d) an Mn ($^1$HNMR) of at least 20,000 g/mol; and (xii) vinyl-terminated polyethylene having: (a) at least 50% allyl chain ends; (b) a molecular weight distribution of less than or equal to 4.0; (c) a g'$_{(vis)}$ of 0.95 or less; (d) an Mn ($^1$HNMR) of at least 7,000 g/mol; and (e) a Mn (GPC)/Mn ($^1$HNMR) in the range of from about 0.8 to about 1.2.

It is understood by those of ordinary skill in the art that when the VTM's, as described here, are reacted with another material the "vinyl" (e.g. the allyl chain end) is involved in the reaction and has been transformed. Thus, stating that a product or material comprises a VTM means that the reacted form of the VTM is present, unless the context clearly indicates otherwise (such as a mixture of ingredients that do not have a catalytic agent present).

In some embodiments, the vinyl-terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprises one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl-terminated macromonomer comprises substantially no propylene derived units (e.g., less than 0.1 wt % propylene, e.g., 0 wt %); and wherein the vinyl-terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl-terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl-terminated macromonomers are further described in U.S. Ser. No. 13/072,288, which is hereby incorporated by reference.

In some embodiments, the vinyl-terminated macromonomers may have an Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin; and (b) from about 0.1 mol % to 80 mol % (e.g., from about 5 mol % to 70 mol %, from about 10 mol % to about 65 mol %, from about 15 mol % to about 55 mol %, from about 25 mol % to about 50 mol %, or from about 30 mol % to about 80 mol %) of propylene;

wherein the vinyl-terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. Ser. No. 13/072,249, hereby incorporated by reference.

In another embodiment, the vinyl-terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:
(a) from about 80 mol % to about 99.9 mol % of at least one $C_4$ olefin, e.g., about 85 mol % to about 99.9 mol %, e.g., about 90 mol % to about 99.9 mol %;
(b) from about 0.1 mol % to about 20 mol % of propylene, e.g., about 0.1 mol % to about 15 mol %, e.g., about 0.1 mol % to about 10 mol %; and
wherein the vinyl-terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Ser. No. 13/072,249, which is hereby incorporated by reference.

In other embodiments, the vinyl-terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)−83], alternately 1.50 [1.83*(mol % ethylene incorporated)-83]}), when 70 mol % to 90 mol % ethylene is present in the co-oligomer. Such macromonomers are further described in U.S. Ser. No. 12/143,663, which is hereby incorporated by reference.

In other embodiments, the vinyl-terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the oligomer has: at least 93% allyl chain ends (e.g., at least 95%, e.g., at least 97%, e.g., at least 98%); a number average molecular weight (Mn) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. Ser. No. 12/143,663.

In other embodiments, the vinyl-terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); an Mn of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers are further described in U.S. Ser. No. 12/143,663.

In other embodiments, the vinyl-terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight (Mn) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. Ser. No. 12/143,663.

In other embodiments, the vinyl-terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight (Mn) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. Ser. No. 12/143,663.

In other embodiments, the vinyl-terminated macromonomer is a propylene homo-oligomer, comprising propylene and less than 0.5 wt % comonomer, e.g., 0 wt % comonomer, wherein the oligomer has:
i) at least 93% allyl chain ends (e.g., at least 95%, e.g., at least 96%, e.g., at least 97%, e.g., at least 98%, e.g., at least 99%);
ii) a number average molecular weight (Mn) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);

iii) an isobutyl chain end to allylic vinyl group ratio of 0.8:1 to 1.3:1.0; and iv) less than 1400 ppm aluminum, (e.g., less than 1200 ppm, e.g., less than 1000 ppm, e.g., less than 500 ppm, e.g., less than 100 ppm). Such macromonomers are also further described in U.S. Ser. No. 12/143,663.

The vinyl-terminated macromonomers may be homopolymers, copolymers, terpolymers, and so on. Any vinyl-terminated macromonomers described herein has one or more of:
(i) an isobutyl chain end to allylic vinyl group ratio of 0.8:1 to 1.3:1.0;
(ii) an allyl chain end to vinylidene chain end ratio of greater than 2:1 (e.g., greater than 2.5:1, greater than 3:1, greater than 5:1, or greater than 10:1);
(iii) an allyl chain end to vinylene ratio is greater than 1:1 (e.g., greater than 2:1 or greater than 5:1); and
(iv) at least 5% allyl chain ends (preferably 15%, 20%, 30%, 40%, 50%, 60%, 70%, 80%, 90%, 95%, 98%, or 99%).

Vinyl-terminated macromonomers generally have a saturated chain end (or terminus) and/or an unsaturated chain end or terminus. The unsaturated chain end of the vinyl-terminated macromonomer comprises an "allyl chain end" or a "3-alkyl" chain end.

An allyl chain end is represented by $CH_2CH—CH_{2-}$, as shown in the formula:

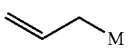

where M represents the polymer chain. "Allylic vinyl group," "allyl chain end," "vinyl chain end," "vinyl termination," "allylic vinyl group," and "vinyl-terminated" are used interchangeably in the following description. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer, and in selected cases, confirmed by $^{13}C$ NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl-terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination", is represented by the formula:

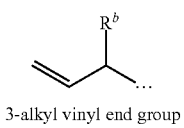

3-alkyl vinyl end group where "⸺" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}C$ NMR as set out below.

$^{13}C$ NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}C$ NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl-terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown

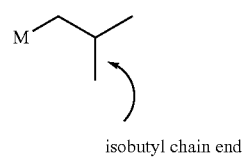

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends. The "isobutyl chain end to alpha bromo carbon ratio" is defined to be the ratio of the percentage of isobutyl chain ends to the percentage of brominated chain ends (at about 34 ppm).

In polymerizations comprising $C_4$ or greater monomers (or "higher olefin" monomers), the saturated chain end may be a $C_4$ or greater (or "higher olefin") chain end, as shown in the formula below:

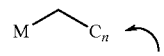

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end.

Mn ($^1$H NMR) is determined according to the following NMR method. $^1$H NMR data are collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds or less between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Unless otherwise stated, Mn (GPC) is determined using the SEC-DRI method described below, however, Nota Bene: for the purpose of the claims, Mn is determined by $^1$H NMR unless otherwise stated. Mn, Mw, Mz, number of carbon atoms, g value and g'(vis) may be determined by using a Gel Permeation Chromatography (GPC) method using a High Temperature Size Exclusion Chromatograph (SEC, either from Waters Corporation or Polymer Laboratories), equipped with three in-line detectors, a differential refractive index detector (DRI or RI), a light scattering (LS) detector, and a viscometer (VIS). Experimental details, including detector calibration, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B LS columns are used. The nominal flow rate is 0.5 cm$^3$/min and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1,2,4 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 145° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and =690 nm. For purposes of this invention and the claims thereto, (dn/dc)=0.104 for propylene polymers and ethylene polymers, and 0.1 otherwise. Units of parameters used throughout this description of the SEC method are such that concentration is expressed in g/cm$^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene and ethylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index g'(vis) is calculated using the output of the SEC-DRI-LS-VIS (SEC-3) method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g'(vis) is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 and k=0.000262 for linear propylene polymers, and α=0.695 and k=0.000181 for linear butene polymers. $M_v$ is the viscosity-average molecular weight based on molecular weights determined by LS analysis.

The value "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, standard, and $Rg_{ls}=K_sM^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_TM^{\alpha_s}$. $\alpha_s$ is the size coefficient for the polymacromer, $K_T$ is the power law coefficient for the polymacromer. See Macromolecules, 2001, 34, 6812-6820, for guidance on selecting a linear standards having the molecular weight and comonomer content, and determining K coefficients and a exponents.

As used herein, where indicated, molecular weight distribution (MWD) is Mw/Mn, determined by the method indicated, viz. MWD(SEC-RI)=Mw(SEC-RI)/Mn(SEC-RI), applying a conventional calibration and using data from the DRI detector, whereas MWD based on Mw and Mn from SEC DRI-VIS (universal calibration) and DRI-VIS-LS (triple SEC calibration or SEC-3) outputs may be indicated in this specification and claims using the following nomenclatures: MWD(SEC-VIS)=Mw(SEC-VIS)/Mn(SEC-VIS); and MWD(SEC-DRI-VIS-LS)=Mw(SEC-DRI-VIS-LS)/Mn(SEC-DRI-VIS-LS) or MWD(SEC-3)=Mw(SEC-3)/Mn(SEC-3).

In an embodiment, the polyolefin is derived from a vinyl-terminated propylene polymer. In an embodiment, the vinyl-terminated propylene polymer is produced using a process comprising: contacting propylene, under polymerization conditions, with a catalyst system comprising an activator and at least one metallocene compound represented by the formula:

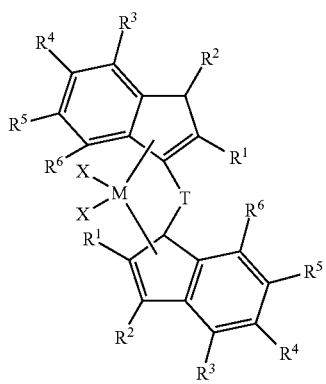

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$ is, independently, a $C_1$ to $C_{10}$ alkyl group;
each $R^2$ is, independently, a $C_1$ to $C_{10}$ alkyl group;
each $R^3$ is hydrogen;
each $R^4$, $R^5$, and $R^6$, is, independently, hydrogen or a substituted hydrocarbyl or unsubstituted hydrocarbyl group, or a heteroatom;
T is a bridging group; and
further provided that any of adjacent $R^4$, $R^5$, and $R^6$ groups may form a fused ring or multicenter fused ring system where the rings may be aromatic, partially saturated or saturated; and
obtaining a propylene polymer having at least 50% allyl chain ends (relative to total unsaturations), as described in co-pending U.S. Ser. No. 13/072,280, filed Mar. 25, 2011, which is incorporated by reference in its entirety herein.

In an embodiment, the vinyl-terminated propylene polymer is produced using a process comprising:
1) contacting:
a) one or more olefins with
b) a transition metal catalyst compound represented by the formula:

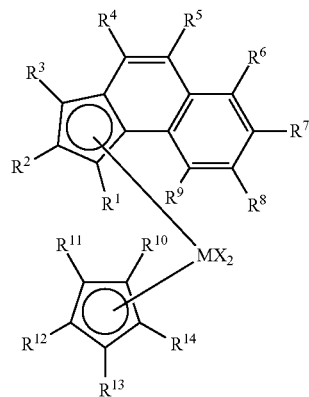

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are independently, hydrogen, or a substituted or unsubstituted hydrocarbyl group having from 1 to 8 carbon atoms, provided however that at least three of the $R^{10}$-$R^{14}$ groups are not hydrogen; and
2) obtaining vinyl-terminated polymer having an Mn of 300 g/mol or more and at least 30% allyl chain ends (relative to total unsaturation), as described in co-pending U.S. Ser. No. 13/072,279, filed Mar. 25, 2011, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:

(i) from about 20 to about 99.9 mol % of at least one $C_5$ to $C_{40}$ higher olefin;
(ii) from about 0.1 mol % to about 80 mol % of propylene; and wherein the higher olefin copolymer has at least 40% allyl chain ends, as described in U.S. Ser. No. 13/072,249, filed Mar. 25, 2011, which is incorporated by reference in its entirety herein.

In an embodiment, the polyolefin chain is derived from a vinyl-terminated branched polyolefin. In an embodiment, the vinyl-terminated branched polyolefin has an Mn ($^1$H NMR) of 7,500 to 60,000 g/mol, comprising one or more alpha olefin derived units comprising ethylene and/or propylene, and having:

(i) 50% or greater allyl chain ends, relative to total number of unsaturated chain ends; and
(ii) a g'$_{vis}$ of 0.90 or less, as described in U.S. Ser. No. 61/467,681, filed Mar. 25, 2011, which is incorporated by reference in its entirety herein.

In an embodiment, the polyolefin chain is derived from a vinyl-terminated branched polyolefin produced by a process for polymerization, comprising:

(i) contacting, at a temperature greater than 35° C., one or more monomers comprising ethylene and/or propylene, with a catalyst system comprising a metallocene catalyst compound and an activator, wherein the metallocene catalyst compound is represented by the following formula:

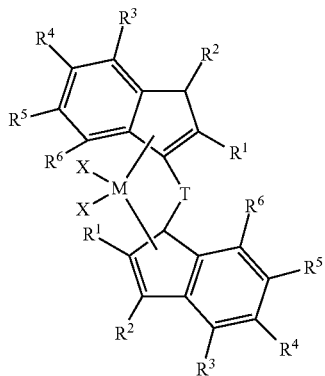

where: M is selected from the group consisting of zirconium or hafnium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated;
further provided that any of adjacent $R^4$, $R^5$, and $R^6$ groups may form a fused ring or multicenter fused ring system where the rings may be aromatic, partially saturated or saturated;
T is a bridging group represented by the formula (Ra)$_2$J, where J is one or more of C, Si, Ge, N or P, and each Ra is, independently, hydrogen, halogen, $C_1$ to $C_{20}$ hydrocarbyl or a $C_1$ to $C_{20}$ substituted hydrocarbyl, provided that at least one $R^3$ is a substituted or unsubstituted phenyl group, if any of $R^1$, $R^2$, $R^4$, $R^5$, or $R^6$ are not hydrogen;
(ii) converting at least 50 mol % of the monomer to polyolefin; and
(iii) obtaining a branched polyolefin having greater than 50% allyl chain ends, relative to total unsaturated chain ends and a Tm of 60° C. or more, as described in U.S. Ser. No. 61/467,681, filed Mar. 25, 2011, which is incorporated by reference in its entirety herein.

In an embodiment of the invention, the polyolefin is derived from a vinyl-terminated ethylene polymer, preferably a vinyl-terminated polyethylene (preferably in particulate form) having:

(a) at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably at least 100%);

(b) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, or preferably less than or equal to 2.5);

(c) an Mn ($^1$HNMR) of at least 20,000 g/mol (preferably at least 25,000 g/mol, preferably at least 30,000 g/mol, preferably at least 40,000 g/mol, preferably at least 50,000 g/mol, and, optionally, less than 125,000 g/mol, preferably less than 120,000, or preferably less than 110,000);

(d) optionally, an Mn (GPC)/Mn ($^1$HNMR) in the range of from about 0.8 to about 1.2 (preferably from about from 0.9 to about 1.1, preferably from about 0.95 to about 1.1); and (e) optionally, a g'(vis) of greater than 0.95 (preferably greater than 0.96, preferably greater than 0.98, preferably greater than 0.98, and, optionally, preferably less than or equal to 1.0).

Preferably, the vinyl-terminated ethylene polymers are prepared by a process comprising:
(a) contacting ethylene with a supported metallocene catalyst system;
wherein the supported catalyst system comprises: (i) a support material; (ii) an activator having from about 1 wt % to about 14 wt % trimethylaluminum, based on the weight of the activator; (iii) a metallocene compound represented by the formula:

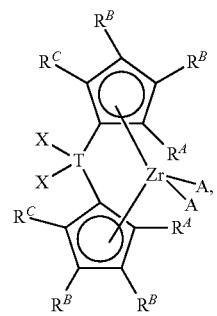

wherein: T is Si or Ge; each $R^A$ is a $C_1$ to $C_{20}$ substituted or unsubstituted hydrocarbyl group; group; each $R^B$ is, independently, H, or a $C_1$ to $C_8$ substituted or unsubstituted hydrocarbyl group, or a group represented by the formula —CH$_2$R$^x$; wherein R$^x$ is a $C_1$ to $C_{20}$ substituted or unsubstituted hydrocarbyl group, provided that at least one $R^B$ is methyl or a group represented by the formula —CH$_2$R$^x$; each RC is, independently, H or a C$_1$ to C$_{20}$ substituted or unsubstituted hydrocarbyl group; each A is independently selected from the group consisting of C$_1$ to C$_{20}$ substituted or unsubstituted hydrocarbyl groups, hydrides, amides, amines, alkoxides, sulfides, phosphides, halides, dienes, phosphines, and ethers; each X is, independently, hydrogen, halogen or a C$_1$ to C$_{20}$ hydrocarbyl, and two X groups can form a cyclic structure including aromatic, partially saturated, or saturated cyclic or fused ring system; further provided that any of adjacent R$^A$, R$^B$, and/or R$^C$ groups may form a fused ring or multicenter fused ring systems, where the rings may be substituted or unsubstituted, and may be aromatic, partially unsaturated, or unsaturated; and (b) obtaining a vinyl-terminated polyethylene having: (i) at least 60% allyl chain ends; (ii) a molecular weight distribution of less than or equal to 4.0; and (iii) a Mn ($^1$HNMR) of at least 20,000 g/mol. Preferably the vinyl-terminated ethylene polymers are made according the process (and using the catalyst systems) described in U.S. Ser. No. 61/704,606, filed Sep. 24, 2012.

In an embodiment of the invention, the polyolefin is derived from a vinyl-terminated ethylene polymer, preferably a vinyl-terminated polyethylene having: (i) at least 50% allyl chain ends (preferably 60%, 70%, 80%, 90%, 95%, 96%, 97%, 98%, 99%, or 100%); (ii) a molecular weight distribution of less than or equal to 4.0 (preferably less than or equal to 3.8, 3.6, 3.5, 3.4, 3.2, 3.0, 2.8, or 2.5); (iii) a g'$_{(vis)}$ of 0.95 or less (preferably less than 0.93, 0.90, 0.88, or 0.85); (iv) an Mn ($^1$HNMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol); and (v) a Mn (GPC)/Mn ($^1$HNMR) in the range of from about 0.8 to about 1.2 (preferably from 0.85 to 1.15, 0.90 to 1.10, and 0.95 to 1.00). Preferably, the vinyl-terminated ethylene polymers are produced by a process comprising:

(a) contacting ethylene with a metallocene catalyst system; wherein the catalyst system comprises:
   (i) an ionizing activator;
   (ii) a metallocene compound represented by the formula:

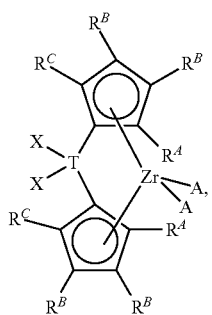

wherein T is Si or Ge; each R$^A$ is a C$_1$ to C$_{20}$ substituted or unsubstituted hydrocarbyl group; each R$^B$ is, independently, H or a C$_1$ to C$_8$ substituted or unsubstituted hydrocarbyl group, or a group represented by the formula —CH$_2$R$^x$; wherein R$^x$ is a C$_1$ to C$_{20}$ substituted or unsubstituted hydrocarbyl group, provided that at least one R$^B$ is methyl or a group represented by the formula —CH$_2$R$^x$; each R$^C$ is, independently, H or a C$_1$ to C$_{20}$ substituted or unsubstituted hydrocarbyl group; each A is independently selected from the group consisting of C$_1$ to C$_{20}$ substituted or unsubstituted hydrocarbyl groups, hydrides, amides, amines, alkoxides, sulfides, phosphides, halides, dienes, phosphines, and ethers; each X is, independently, hydrogen, halogen, or a C$_1$ to C$_{20}$ hydrocarbyl, and two X groups can form a cyclic structure including aromatic, partially saturated, or saturated cyclic or fused ring system; further provided that any of adjacent R$^A$, R$^B$, and/or R$^C$ groups may form a fused ring or multicenter fused ring systems, where the rings may be substituted or unsubstituted, and may be aromatic, partially unsaturated, or unsaturated; and (b) obtaining a vinyl-terminated polyethylene having: (i) at least 50% allyl chain ends; (ii) a molecular weight distribution of less than or equal to 4.0; (iii) a g'$_{(vis)}$ of 0.95 or less; and (iv) a Mn ($^1$HNMR) of at least 7,000 g/mol; and (v) a Mn (GPC)/Mn ($^1$HNMR) in the range of from about 0.8 to about 1.2. Preferably, the vinyl-terminated ethylene polymers are made according the process (and using the catalyst systems) described in U.S. Ser. No. 61/704,604, filed Sep. 24, 2012.

In any of the polymerizations described herein, the activator may be an alumoxane, an aluminum alkyl, a stoichiometric activator (also referred to as an ionizing activator), which may be neutral or ionic, and/or a conventional-type cocatalyst, unless otherwise stated. Preferred activators typically include alumoxane compounds, modified alumoxane compounds, stoichiometric activators, and ionizing anion precursor compounds that abstract one reactive, σ-bound, metal ligand making the metal complex cationic and providing a charge-balancing noncoordinating or weakly coordinating anion.

Alumoxane Activators

In an embodiment of the invention, alumoxane activators are utilized as an activator in the catalyst composition, preferably methylalumoxane (MAO), modified methylalumoxane (MMAO), ethylalumoxane, and/or isobutylalumoxane. Preferably, the activator is a TMA-depleted activator (where TMA means trimethylaluminum). Any method known in the art to remove TMA may be used. For example, to produce a TMA-depleted activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid. In such embodiments, the TMA-depleted activator comprises from about 1 wt % to about 14 wt % trimethylaluminum (preferably less than 13 wt %, preferably less than 12 wt %, preferably less than 10 wt %, preferably less than 5 wt %, or preferably 0 wt %, or, optionally, greater than 0 wt % or greater than 1 wt %).

Stoichiometric Activators

The catalyst systems useful herein may comprise one or more stoichiometric activators. A stoichiometric activator is a non-alumoxane compound which when combined in a reaction with the catalyst compound (such as a metallocene compound) forms a catalytically active species, typically at molar ratios of stoichiometric activator to metallocene compound of 10:1 or less (preferably 5:1, more preferably 2:1, or even more preferably 1:1), however is within the scope of this invention to use a molar ratio of stoichiometric activator to metallocene compound of greater than 10:1 as well. Useful stoichiometric (or non-alumoxane) activator-to-catalyst ratios range from 0.5:1 to 10:1, preferably 1:1 to 5:1, although ranges of from 0.1:1 to 100:1, alternately from 0.5:1 to 200:1, alternately from 1:1 to 500:1 alternately from 1:1 to 1000:1 may be used.

Stoichiometric activators are non-alumoxane compounds which may be neutral or ionic, such as tri (n-butyl) ammonium tetrakis (pentafluorophenyl) borate, a tris perfluorophenyl boron metalloid precursor, or a tris perfluoronaphthyl boron metalloid precursor, polyhalogenated heteroborane anions (WO 98/43983), boric acid (U.S. Pat. No. 5,942,459), or a combination thereof. It is also within the scope of this invention to use stoichiometric activators alone or in combination with alumoxane or modified alumoxane activators.

Neutral Stoichiometric Activators

Examples of neutral stoichiometric activators include trisubstituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic Stoichiometric Activators

Ionic stoichiometric activators may contain an active proton, or some other cation associated with, but not coordinated to, or only loosely coordinated to, the remaining anion of the activator. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic stoichiometric activators comprise a cation, which is preferably a Bronsted acid capable of donating a proton, and a compatible non-coordinating anion. Preferably, the anion is relatively large (bulky), capable of stabilizing the catalytically active species (preferably a group 4 catalytically active species) which is formed when the catalyst (such as a metallocene compound) and the stoichiometric activator are combined. Preferably, the anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A and EP 0 277,004 A: 1) anionic coordination complexes comprising a plurality of lipophilic radicals covalently coordinated to and shielding a central charge-bearing metal or metalloid core, and 2) anions comprising a plurality of boron atoms, such as carboranes, metallacarboranes, and boranes.

Ionic stoichiometric activators comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the catalyst (such as metallocene) cation in the sense of balancing its ionic charge at +1, yet retain sufficient lability to permit displacement by an ethylenically or acetylenically unsaturated monomer during polymerization.

In a preferred embodiment of this invention, the ionic stoichiometric activators are represented by the following formula (I):

$$(Z)_d^+ A^{d-} \qquad (1)$$

wherein $(Z)_d^+$ is the cation component and $A^{d-}$ is the anion component; where Z is (L-H) or a reducible Lewis Acid, L is an neutral Lewis base; H is hydrogen; $(L-H)^+$ is a Bronsted acid; $A^{d-}$ is a non-coordinating anion having the charge d-; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, $(Z)_d^+$ is preferably represented by the formula: $(Ar_3C)^+$, where Ar is aryl or aryl substituted with a heteroatom, a $C_1$ to $C_{40}$ hydrocarbyl, or a substituted $C_1$ to $C_{40}$ hydrocarbyl, preferably $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5, or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In other embodiments of this invention, the ionic stoichiometric activator may be an activator comprising expanded anions, represented by the formula:

$$(A^{*+a})_b (Z^*J^*_j)^{-c}_d;$$

wherein $A^*$ is a cation having charge +a; $Z^*$ is an anion group of from 1 to 50 atoms not counting hydrogen atoms, further containing two or more Lewis base sites; $J^*$ independently each occurrence is a Lewis acid coordinated to at least one Lewis base site of $Z^*$, and optionally two or more such $J^*$ groups may be joined together in a moiety having multiple Lewis acid functionality; j is a number from 2 to 12; and a, b, c, and d are integers from 1 to 3, with the proviso that axb is equal to cxd. Examples of such activators comprising expandable anions may be found in U.S. Pat. No. 6,395,671, which is fully incorporated herein by reference.

Examples of ionic stoichiometric activators useful in the catalyst system of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylb orate, trimethylammonium tetrakis(pentafluorophenyl)borate, triethylammonium tetrakis(pentafluorophenyl)borate, tripropylammonium tetrakis(pentafluorophenyl)borate, tri (n-butyl)ammonium tetrakis(pentafluorophenyl)borate, tri (sec-butyl)ammonium tetrakis(pentafluorophenyl)borate, tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis (pentafluorophenyl)borate, benzene(diazonium)tetrakis (pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis (perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis (3,5-bis(trifluoromethyl)phenyl)borate, tripropylammonium tetrakis(3,5-bis(trifluoromethyl)phenyl)borate, tri(n-butyl) ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl) borate, tropillium tetrakis(3,5-bis(trifluoromethyl)phenyl) borate, triphenylcarbenium tetrakis(3,5-bis(trifluoromethyl) phenyl)borate, triphenylphosphonium tetrakis(3,5-bis (trifluoromethyl)phenyl)borate, triethylsilylium tetrakis(3,5-bis(trifluoromethyl)phenyl)borate, benzene(diazonium) tetrakis(3,5-bis(trifluoromethyl)phenyl)borate, and dialkyl ammonium salts such as: di- (1-propyl)ammonium tetrakis (pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, or triphenylcarbenium tetrakis (perfluorophenyl)borate.

Bulky Ionic Stoichiometric Activators

"Bulky activator" as used herein refers to ionic stoichiometric activators represented by the formula:

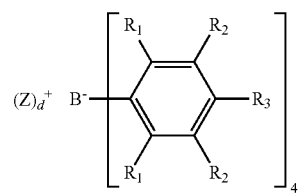

where:
each $R_1$ is, independently, a halide, preferably a fluoride;
each $R_2$ is, independently, a halide, a $C_6$ to $C_{20}$ substituted aromatic 0hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_3$ is a fluoride or a $C_6$ perfluorinated aromatic hydrocarbyl group);
wherein $R_2$ and $R_3$ can form one or more saturated or unsaturated, substituted or unsubstituted rings (preferably $R_2$ and $R_3$ form a perfluorinated phenyl ring); $(Z)_d^+$ is the cation component; where Z is (L-H) or a reducible Lewis Acid, L is an neutral Lewis base; H is hydrogen; $(L-H)^+$ is a Bronsted acid; and d is an integer from 1 to 3; wherein the boron anion component has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

In a preferred embodiment, any vinyl-terminated macromonomer described herein can be fractionated or distilled by any means know in the art and one or more of the fractions may be used in the invention described herein. In an embodiment, the vinyl-terminated macromonomer is derived from one or more fractions of the precursor macromonomer. Preferred fractions typically have a narrow Mw/Mn, such as less than 1.5, preferably 1.4 or less, preferably 1.3 or less, preferably 1.2 or less. Alternately, the Mw/Mn is from 1 to 1.4, preferably 1.05 to 1.3, preferably 1.1 to 1.2, preferably 1.01 to 1.05. Alternately, the Mw/Mn is from 1 to 1.1, preferably 1 to 1.2, preferably 1 to 1.3, preferably 1 to 1.04.

In another embodiment of the invention, the fractions have a narrow boiling point range (as determined by ASTM D86) of less than 70° C., preferably less than 60° C., preferably less than 50° C., preferably less than 40° C., preferably less than 30° C., preferably less than 20° C., preferably less than 10° C.

In a preferred embodiment of the invention, the vinyl-terminated macromonomer injected into a gas chromatograph column to determine the optimum cut points for the fractionation.

In a preferred embodiment, the fractions may be obtained by separation of the vinyl-terminated macromonomer product such as by the processes described in GB 1550419A; U.S. U.S. Pat. Nos. 3,647,906; and 3,592,866. Useful fractions include ranges from about 4 carbon-numbers up to 20 carbon-numbers, e.g., $C_4$-$C_8$, $C_4$-$C_{14}$, $C_4$-$C_{20}$. The lower α-olefin fraction may contain α-olefins having the same carbon-number as the lowest α-olefin in the higher α-olefin fraction, but preferably contains only α-olefins of carbon-numbers lower than the carbon-number of the lowest α-olefin in the higher α-olefin fraction. The higher (alpha-olefin fraction may include α-olefins of the same carbon number as the highest α-olefin in the lower α-olefin fraction up to the highest α-olefin produced in the reaction, but generally not higher than $C_{40}$. Preferably, however, the higher α-olefin fraction contains only α-olefins of carbon-numbers higher than the carbon number of the highest α-olefin in the lower α-olefin fraction.

In a separation where an α-olefin product mixture free of light oligomers, e.g., dimers, trimers, tetramers, etc., is desired, the lower α-olefin fraction is further separated into a light α-olefin fraction and an intermediate α-olefin fraction. The light α-olefin fraction may include from $C_4$ up to $C_{12}$, e.g., $C_4$-$C_6$, $C_4$-$C_8$, $C_4$-$C_{10}$, etc. In this modification, the intermediate α-olefin fraction is removed as product and the light α-olefin fraction is converted to additional intermediate α-olefins.

In another embodiment, any vinyl-terminated macromonomer described herein can be separated into different boiling point cuts by distillation performed according to the procedures described in ASTM methods D2892 and D5236. (D2892: Standard Test Method for Distillation of Crude Petroleum (15-Theoretical Plate Column) and D5236: Standard Test Method for Distillation of Heavy Hydrocarbon Mixtures (Vacuum Potstill Method).)

For example a low molecular weight atactic polypropylene VTM (677.3 gram charge) can be fractionated or distilled using the boiling point range, mass recovery, vacuum conditions listed below. Both initial boiling point (IBP) and final boiling point (FBP) are in degree Fahrenheit (° F.) and corrected to atmospheric pressure.

| Fraction | IBP, ° C. (° F.) | FBP, ° C. (° F.) | Wt collected, g | Pressure, kPa (mmHg) | ASTM method |
| --- | --- | --- | --- | --- | --- |
| Charge (Feed) | — | — | 677.3 | | |
| 1 | IBP | 60 (140) | 3.8 | 101 (760) | D2892 |
| 2 | 60 (140) | 71.1 (160) | 11.9 | 101 (760) | D2892 |
| 3 | 71.1 (160) | 129 (265) | 27.8 | 101 (760) | D2892 |
| 4 | 129 (265) | 185 (365) | 35.0 | 11.7 (88) | D2892 |
| 5 | 185 (365) | 241 (465) | 46.6 | 11.7 (88) | D2892 |
| 6 | 241 (465) | 274 (525) | 34.4 | 11.7 (88) | D2892 |
| 7 | 274 (525) | 298 (568) | 44.0 | 1.33 (10) | D2892 |
| 8 | 298 (568) | 309 (588) | 14.2 | 1.33 (10) | D2892 |
| 9 | 309 (588) | 341 (645) | 53.1 | 1.33 (10) | D2892 |
| 10 | 341 (645) | 371 (700) | 63.4 | 0.266 (2) | D2892 |
| 11 | 371 (700) | 451 (844) | 41.2 | 0.266 (2) | D5236 |
| 12 | 451 (844) | 478 (892) | 42.3 | 0.266 (2) | D5236 |
| 13 | 478 (892) | 484 (904) | 17.9 | 0.266 (2) | D5236 |
| Bottoms | 484 (904)+ | — | 226.6 | — | — |

As shown in the table above, total recovery of collected fractions (fraction 1 to 13) with boiling points between room temperature and 904° F. was 435.6 g (64.3 wt % of initial charge). Total recovery of distillation bottoms with boiling point above 904° F. was 226.6 g (33.5 wt % of initial charge). The total recovery of both distilled fractions and bottoms material amounts to 97.8 wt %. The resulting distilled fractions and distillation bottoms have narrow molecular weight distributions (Mw/Mn <1.4, e.g., 1.01-1.05) as determined by GPC. GPC.

In another embodiment of the invention, the vinyl-terminated macromonomer (preferably a propylene based vinyl-terminated macromonomer, preferably a homopolypropylene vinyl-terminated macromonomer) has less than 1 mol % regio defects (as determined by $^{13}$C NMR), based upon the total propylene monomer. Three types of defects are defined to be the regio defects: 2,1-erythro, 2,1-threo, and 3,1-isomerization. The structures and peak assignments for these are given in L. Resconi, L. Cavallo, A. Fait, and F. Piemontesi, Chem. Rev. 2000, 100, pages 1253-1345, as well as H. N. Cheng, *Macromolecules*, 17, 1950 (1984). Alternately, the vinyl-terminated macromonomer (preferably a propylene based vinyl-terminated macromer, preferably a homopolypropylene vinyl-terminated macromonomer) has less than 250 regio defects per 10,000 monomer units (as determined by $^{13}$C NMR), preferably less than 150, preferably less than 100, preferably less than 50 regio defects per 10,000 monomer units. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
|---|---|
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, $CH$, $CH_2$), and multiplied by 10,000 to determine the defect concentration per 10,000 monomers.

In another embodiment, any vinyl-terminated macromonomer described herein may have a melting point (DSC first melt) of from 60° C. to 160° C., alternately 50° C. to 145° C., alternately 50° C. to 130° C., alternately 50° C. to 100° C. In another embodiment, the vinyl-terminated macromonomer described herein have no detectable melting point by DSC following storage at ambient temperature (23° C.) for at least 48 hours.

In another embodiment, the vinyl-terminated macromonomer described herein may have a glass transition temperature of less than 0° C. or less (DSC), preferably −10° C. or less, more preferably −20° C. or less, more preferably −30° C. or less, more preferably −50° C. or less. Melting temperature ($T_m$) and glass transition temperature (Tg) are measured using Differential Scanning calorimetry (DSC) using commercially available equipment such as a TA Instruments 2920 DSC. Typically, 3 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl-terminated macromonomers described herein are a liquid at 25° C.

In a particularly preferred embodiment of the invention, the vinyl-terminated macromonomer (preferably comprising propylene, at least 50 mol % propylene, preferably at least 70 propylene) has less than 250 regio defects per 10,000 monomer units, preferably less than 150, preferably less than 100, preferably less than 50 regio defects per 10,000 monomer units and a Tg of less than 0° C. or less (DSC), preferably −10° C. or less, more preferably −20° C. or less, more preferably −30° C. or less, more preferably −50° C. or less.

In another embodiment, the vinyl-terminated macromonomers described herein have a viscosity at 60° C. of greater than 1000 cP, greater than 12,000 cP, or greater than 100,000 cP. In other embodiments, the vinyl-terminated macromonomer have a viscosity of less than 200,000 cP, less than 150,000 cP, or less than 100,000 cP. Viscosity is defined as resistance to flow and the melt viscosity of neat copolymers is measured at elevated temperature using a Brookfield Digital Viscometer.

In another embodiment, the VTM described herein also has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 mPa·sec or less, or 70,000 mPa·sec or less, or 60,000 mPa·sec or less, or 50,000 mPa·sec or less, or 40,000 mPa·sec or less, or 30,000 mPa·sec or less, or 20,000 mPa·sec or less, or 10,000 mPa·sec or less, or 8,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec, and/or a viscosity of 8,000 mPa·sec or less at 160° C. (as measured by ASTM D 3236 at 160° C.); or 7,000 mPa·sec or less, or 6,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec. In other embodiments, the viscosity is 200,000 mPa·sec or less at 190° C., depending on the application. In other embodiments, the viscosity is 50,000 mPa·sec or less depending on the applications.

In an embodiment, a process to produce polymacromonomer oligomers comprises contacting a vinyl-terminated macromonomer (preferably a propylene macromonomer, e.g., an atactic propylene macromonomer) having an Mn from 100 to 30,000 Da and at least 70% vinyl termination (as measured by $^1$H NMR) relative to total unsaturations, and up to 40 wt % of $C_2$ to $C_{18}$ comonomer with a catalyst system capable of oligomerizing vinyl-terminated macromonomer, in the presence of an aluminum containing compound, a zinc containing compound, or a combination thereof, under polymerization conditions at a temperature from 20° C. to 180° C. and a reaction time of 1 min to 24 hours to produce a polymacromonomer having a degree of polymerization greater than 10, and an Mn of greater than or equal to about 5000 Da. Preferably, the polymacromonomer has a glass transition temperature Tg of less than 0° C.

In an embodiment, the process comprises from 0 wt % to 40 wt %, or 0.1 wt % to 40 wt %, or 0.5 wt % to 15 wt %, or 1 wt % to 10 wt %, or 1 wt % to 5 wt %, or 0 wt % to 5 mol %, of a $C_2$ to $C_{18}$ comonomer, or a $C_2$ to $C_{12}$ comonomer, or ethylene, propylene, butene, hexene, 4-methyl pentene-1,3-methyl pentene-1, and/or norbornene.

In an embodiment, the macromonomer comprises at least 70%, or 80%, or 90%, or 91%, or 95%, or 98%, 99% vinyl (allyl) chain ends, also referred to herein as vinyl termination, as determined by $^1$H NMR relative to total unsaturations.

In an embodiment, the macromonomer has a number average molecular weight (Mn) of about 100 to 30,000 Da, or 125 to about 20,000 Da, or from 150 to about 15,000 Da, as measured by $^1$H NMR, or 200 to 10,000 Da, or 250 to 10,000 Da, or 300 to 10,000 Da, or 400 to 9500 Da, or 500 to 9,000 Da, or 750 to 9,000 Da.

In an embodiment, the macromonomers comprise an isobutyl chain end to allylic vinyl group ratio of 0.8:1 to 1.35:1.0.

In an embodiment, the macromonomer used herein is a propylene homo oligomer, a vinyl-terminated propylene homo oligomer, a vinyl-terminated atactic propylene homo oligomer, a vinyl-terminated isotactic propylene homo oligomer, a vinyl-terminated syndiotactic propylene homo oligomer, or a combination thereof (e.g., a macromonmer co-oligomer). In an embodiment, the macromonomer comprises at least 50 mol % propylene, or at least 60, or 70 to 99.5, or 80 to 99, or 90 to 98.5 mol % propylene; from 0 to 40 mol %, or 0.1 to 40, or 0.5 to 30, or 1 to 20, or 1.5 to 10 mol % ethylene and/or a $C_4$ to $C_{18}$ alpha olefin, and/or from 0.1 to 5, or 0.5 to 3, or 0.5 to 1 mol % diene, including a $C_4$ to $C_{12}$ alpha-omega diene exemplified by butadiene, hexadiene, octadiene, norbornene, ethylidene norbornene, vinylnorbornene, norbornadiene, and dicyclopentadiene), or the like.

In an embodiment, the macromonomers and/or the polymacromonomers according to the instant disclosure comprise less than 1400 ppm aluminum, or less than 1000 ppm aluminum, or less than 500 ppm aluminum, or less than 100 ppm aluminum, or less than 50 ppm aluminum, or less than 20 ppm aluminum, or less than 5 ppm aluminum.

In an embodiment, the macromonomer is amorphous (atactic), which is defined to mean a heat of fusion of less than 10 J/g. Isotactic is defined to be at least 50% isotactic pentads (as determined by $^{13}$CNMR as described herein) or at least 60%, or at least 70%, or at least 80% isotactic pentads. Syndiotactic is defined to be at least 50% syndiotactic pentads (as determined by $^{13}$CNMR as described below) or at least 60%, or at least 70%, or at least 80% syndiotactic pentads.

In any of the embodiments described herein the macromonomer contains only, or consists essentially of or consists of, $C_2$ to $C_{18}$ linear alpha olefin monomer units, or $C_2$ to $C_{12}$, or ethylene, propylene, butene, octene, decene, or dodecene, or ethylene and propylene, or propylene. In an embodiment, the macromonomer does not comprise any, or less than 0.1 mol % styrene based monomer units. In an embodiment, the macromonomer does not comprise any, or less than 0.1 mol % cyclic monomer units. In an embodiment, the macromonomer does not comprise any, or less than 0.1 mol % aromatic monomer units. In an embodiment, the macromonomer comprises 1 wt % or less of a styreneic monomer unit, a cyclic monomer unit or an aromatic monomer unit, or less than 0.5 wt %, or 0.0 wt %, based upon the weight of the macromonomer.

In an embodiment, the macromonomer comprises at least 50 wt % amorphous material, or 60 wt %, or 70 wt %, or 80 wt %, or 90 wt %, or 95 wt %, or 99 wt % amorphous material, based upon the weight of the macromonomer. Percent amorphous material is determined by subtracting the percent crystallinity from 100. The percent crystallinity (X %) is calculated using the formula: [area under the DSC curve (in J/g)/H° (in J/g)]* 100, where H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion) (H° for 100% crystalline polyethylene, a value of 140 J/g is used as the equilibrium heat of fusion (H°) for 100% crystalline polybutene, and a value of 207 J/g)(H°) is used as the heat of fusion for a 100% crystalline polypropylene. The DSC curve is obtained as described in the Experimental section below.

In an embodiment, the macromonomer, the polymacromonomer, or both have a glass transition temperature (Tg) of 50° C. or less as determined by differential scanning calorimetry as described herein, or 40° C. or less, or 30° C. or less, or 25° C. or less, or 20° C. or less, or −20° C. or less, or −30° C. or less, or −50° C. or less.

In an embodiment, the macromonomer, the polymacromonomer, or both have a melting point (DSC first melt) of less than 25° C. In an embodiment, the macromonomer, the polymacromonomer, or both described herein have no detectable melting point by DSC following storage at ambient temperature (23° C.) for at least 48 hours. In an embodiment, the macromonomer is a liquid at 25° C.

In an embodiment, any macromonomer or polymacromonomer described herein may have a heat of fusion of less than 50 J/g, or 40 J/g, or 30 J/g, or 20 J/g, or 10 J/g, or 5 J/ as determined by differential scanning calorimetry as described herein.

In an embodiment, any macromonomer or polymacromonomer according to the instant disclosure contains less than 1000 ppm of a group 4 metal (or less than 750 ppm or Ti, Hf and/or Zr).

In an embodiment, any macromonomer or polymacromonomer described herein comprises less than 3 wt % of functional groups selected from hydroxide, aryls and substituted aryls, halogens, alkoxys, carboxylates, esters, acrylates, oxygen, nitrogen, and carboxyl, or less than 2 wt %, or less than 1 wt %, or less than 0.5 wt %, or less than 0.1 wt %, or 0 wt %, based upon the weight of the macromonomer.

Macromonomers useful herein may be made by process known in the art to produce vinyl-terminated macromonomers, including those described in U.S. Pat. Nos. 6,117,962; 6,555,635; Small, Brookhart, Bennett, JACS 120, 1998, 4049, Britovsek, et al. Chem. Comm. 1998, 849; and Su, et al. Organomet. 25, 2006, 666.

In an embodiment, the polymacromonomers can be produced using one or more activators (including all activators described above) in combination with one or more catalyst systems capable of oligomerizing vinyl-terminated macromonomer. The catalyst system comprises a catalyst compound, also referred to herein as a catalyst precursor and/or a transition metal compound, and an activator. A catalyst compound or catalyst system is determined to be capable of polymerizing vinyl-terminated macromonomers by taking the catalyst compound (plus an activator) or the catalyst system in question and combining it with 1-octene at the reactor conditions in question (such as 80° C.). If the catalyst compound or catalyst system can polymerize 1-octene to a number average molecular weight of 1000 or more, then the catalyst system can perform in embodiments of the instant invention.

Catalysts useful to polymerize the macromonomers include those described in U.S. Pat. No. 7,126,031, especially the compound represented by the formula:

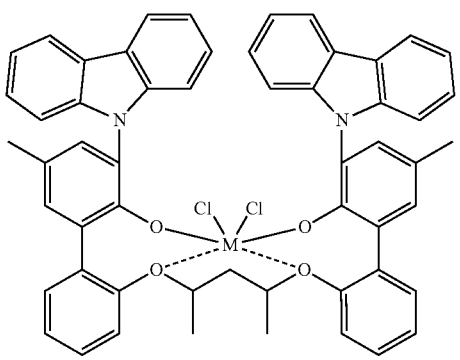

wherein M is a Group 4 metal. In an embodiment, M is Hf. In an embodiment, the catalyst comprises an ordered mesoporous carbon composite catalyst comprising the compound, especially wherein M is Hf.

Useful activators in embodiments include any of the activators described above, including, for example, alumoxanes and non-coordinating anion activators, whether neutral or or ionic. Examples include alkylalumoxanes, such as methylalumoxane (MAO), ethyl alumoxane, butyl alumoxane, isobutyl alumoxane; modified alumoxanes such as modified alkyl alumoxanes, including modified methyl alumoxane and the like. Mixtures of different alumoxanes and modified alumoxanes may also be used. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346; European publications EP-A-0 561 476; EP-B1-0 279 586; EP-A-0 594 218; EP-B1-0 586 665; PCT publications WO 94/10180; and WO 99/15534; all of which are herein fully incorporated by reference. It may be preferable to use a visually clear methylalumoxane. A cloudy or gelled alumoxane can be filtered to produce a clear solution or clear alumoxane can be decanted from the cloudy solution. Another useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). When the activator is an alumoxane (modified or unmodified), some embodiments select the maximum amount of activator at a 5000-fold molar excess Al/M over the catalyst precursor (per metal catalytic site). The minimum activator-to-catalyst-precursor is typically a 1:1 molar ratio. In an embodiment, the ratio of equivalents of Al/Hf is from about 1 to 10,000, or 10 to 10,000, wherein the minimum number of equivalents of Al to Hf is is about 1, or 10 or 100, or 1000, and the maximum number of equivalents of Al to Hf is 50,000, or 20,000, or 10,000, or 5,000, or 1,000, or 500.

In an embodiment, the activator may be an ionizing or stoichiometric activator, neutral or ionic, such as tri(n-butyl) ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combinations thereof. It is also within the scope of this invention to use neutral or ionic activators alone or in combination with alumoxane or modified alumoxane activators as described above.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be prepared with activator components which are ionic compounds or compositions. However, preparation of activators utilizing neutral compounds is also contemplated by this invention.

In an embodiment, the catalyst system comprises an activator selected from the group consisting of: N,N-dimethylanilinium tetrakis(pentafluorophenyl)borate; triphenylcarbenium tetrakis(pentafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl) ammonium tetrakis(perfluoronaphthyl)borate; tri(tert-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis (perfluoronaphthyl)borate; tropillium tetrakis (perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis (perfluoronaphthyl)borate; trimethylammonium tetrakis (perfluorobiphenyl)borate; triethylammonium tetrakis (perfluorobiphenyl)borate; tripropylammonium tetrakis (perfluorobiphenyl)borate; tri(n-butyl)ammonium tetrakis (perfluorobiphenyl)borate; tri(tert-butyl)ammonium tetrakis (perfluorobiphenyl)borate; N,N-dimethylanilinium tetrakis (perfluorobiphenyl)borate; N,N-diethylanilinium tetrakis (perfluorobiphenyl)borate; N,N-dimethyl-(2,4,6-trimethylanilinium)tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis (perfluorobiphenyl)borate; [4-tert-butyl-PhNMe$_2$H][(C$_6$F$_3$(C$_6$F$_5$)$_2$)$_4$B]; trimethylammonium tetraphenylborate; triethylammonium tetraphenylborate; tripropylammonium tetraphenylborate; tri(n-butyl)ammonium tetraphenylborate; tri(tert-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; tropillium tetraphenylborate; triphenylcarbenium tetraphenylborate; triphenylphosphonium tetraphenylborate; triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis (pentafluorophenyl)borate; tri(n-butyl)ammonium tetrakis (pentafluorophenyl)borate; tri(sec-butyl)ammonium tetrakis (pentafluorophenyl)borate; N,N-dimethylanilinium tetrakis (pentafluorophenyl)borate; N,N-diethylanilinium tetrakis (pentafluorophenyl)borate; N,N-dimethyl-(2,4,6-trimethylanilinium)tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl) ammonium tetrakis-(2,3,4,6-tetrafluoro-phenyl)borate; dimethyl(tert-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium)tetrakis-(2,3,4,6-tetrafluorophenyl) borate; tropillium tetrakis-(2,3,4,6-tetrafluorophenyl)borate; triphenylcarbenium tetrakis-(2,3,4,6-tetrafluorophenyl)borate; triphenylphosphonium tetrakis-tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(tert-butyl)ammonium tetrakis(3,5-bis (trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis (3,5-bis (trifluoromethyl)phenyl)borate; tropillium tetrakis(3,5-bis (trifluoromethyl)phenyl)borate; triphenylcarbenium tetrakis (3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl) phenyl)borate; benzene(diazonium)tetrakis(3,5-bis(trifluoromethyl)phenyl)borate; di-(i-propyl)ammonium tetrakis (pentafluorophenyl)borate; dicyclohexylammonium tetrakis (pentafluorophenyl)borate; trio-tolyl)phosphonium tetrakis (pentafluorophenyl)borate; tri(2,6-dimethylphenyl) phosphonium tetrakis(pentafluorophenyl)borate; triphenylcarbenium tetrakis(perfluorophenyl)borate; 1-(4-(tris(pentafluorophenyl)borate)-2,3,5,6-tetrafluorophenyl) pyrrolidinium; tetrakis (pentafluorophenyl)borate; 4-(tris (pentafluorophenyl)borate)-2,3,5,6-tetrafluoropyridine; triphenylcarbenium tetrakis(3,5-bis(trifluoromethyl)phenyl) borate); and combinations thereof thereof.

In an embodiment, useful activators include: is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, and triphenylcarbenium tetra(perfluorophenyl)borate.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio as described above. Combinations of the described activator compounds may also be used for activation. For example, tris(perfluorophenyl)boron can be used with methylalumoxane.

In general the catalyst compounds and the activator are combined in ratios of about 1:10,000 to about 10:1. When alumoxane or aluminum alkyl activators are used, the catalyst-to-activator molar ratio may be from 1:5000 to 10:1, alternatively from 1:1000 to 10:1; alternatively, 1:500 to 2:1; or 1:300 to 1:1. When ionizing activators are used, the catalyst-to-activator molar ratio is from 10:1 to 1:10; 5:1 to 1:5; 2:1 to 1:2; or 1.2:1 to 1:1. Multiple activators may be used, including using mixes of alumoxanes or aluminum alkyls with ionizing activators.

In an embodiment, other additives may be used including scavengers, chain transfer agents, and the like. Suitable examples include an aluminum containing compound comprising an alkylalumoxanes, which may be (1) MAO, (2) a compound represented by the

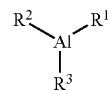

wherein each of $R^1$, $R^2$, and $R^3$ individually comprise a $C_1$-$C_{20}$ hydrocarbyl radical, or (3) a combination thereof, or wherein each of $R^1$, $R^2$, and $R^3$ individually comprise a $C_1$-$C_8$ aliphatic radical, and/or (4) a zinc containing compound represented by the formula $ZnR^1R^2$, wherein each of $R^1$ and $R^2$ individually comprise a $C_1$-$C_{20}$ hydrocarbyl radical, or wherein each of $R^1$ or $R^2$ individually comprise a $C_1$-$C_8$ aliphatic radical.

In an embodiment, the aluminum containing compound comprises MAO, trimethylaluminum, triisobutylaluminum, trioctylaluminum, or a combination thereof. In an embodiment, the ratio of equivalents of Al/Hf or Zn/Hf is from about 10 to 10,000.

In an embodiment a process to produce polymacromonomer comprises contacting the macromonomer and up to 40 wt % of $C_2$ to $C_{18}$ comonomer with a catalyst system capable of oligomerizing vinyl-terminated macromonomer, in the presence of an aluminum containing compound, a zinc containing compound, or a combination thereof, under polymerization conditions at a temperature from 20° C. to 180° C. and a reaction time of 1 min to 24 hours to produce a polymacromonomer having a degree of polymerization greater than 10 and an Mn of greater than or equal to about 5000 Da.

The catalysts and catalyst systems described herein may be used to produce the polymacromonomers in a solution, bulk, gas or slurry polymerization process or a combination thereof, or a solution phase or slurry phase polymerization process. A supercritical process can also be used, or a supercritical process above the melting point of the macromonomers being produced may be used, or a supercritical process above the cloud point of the polymerization system may be used. For more information on the details of the supercritical process (including definitions of cloud point and polymerization system) please see WO 2004/026921.

In an embodiment, other additives may be used, such as diethyl zinc, in combination with the catalyst compounds(or more than one, such as two) and activators.

In an embodiment, the process is an in-line process, or a continuous process to produce polymacromonomer, comprising introducing monomer (macromonomer), catalyst system, and aluminum or zinc compound into a reactor, obtaining a reactor effluent containing polymacromonomer, removing unused monomer and/or other volatiles, optionally removing (such as flashing off) solvent, obtaining polymacromonomer (such as those described herein) essentially free of residual monomer.

In an embodiment, a two stage process to obtain polymacromonomer may comprise contacting macromonomer with a catalyst system and thereafter obtaining polymacromonomer.

In an embodiment, the temperature of the polymerization may be from 20° C. to 180° C., or 25° C. to 180° C., or 60° C. to 150° C., or 80° C. to 120° C.

In an embodiment, the reaction time of the polymerization is from 1 minute to 24 hours, or 10 min to 5 hours, or 20 min to 2 hours, or 30 to 90 min, or 5 min to 3 hours, or 10 min to 2 hours, or 15 min to 90 min.

In an embodiment, the reactor contains less than 90 wt % diluent or solvent, or less than 85 wt %, or less than 80 wt %, based upon the weight of the solvent and monomers entering the reactor.

In an embodiment, the weight ratio of macromonomer to catalyst compound entering the reactor is 10:1 to 20,000:1, or 100:1 to 15000:1, or 500:1 to 10000:1, or 50:1 to 15000:1, or 1000:1 to 10000:1. In embodiments, the ratio of macromonomer to catalyst compound is greater than 500:1 or greater than 1000:1. In embodiments, the ratio of macromonomer to catalyst compound is less than 1000:1 or less than 500:1.

In an embodiment, the degree of polymerization for the polymacromonomer is 3 or more, or 4 or more, or 5 or more, or 6 or more, or 10 or more, or 50 or more, or 100 or more, or 150 or more, or 200 or more.

In an embodiment, at least 70% of the macromonomer is consumed in the polymerization, or at least 75%, or at least 80%, or at least 85%, or at least 90%, or at least 95%, or at least 98%, as determined by $^1$H NMR described in the Experimental section below.

In an embodiment, the polymacromonomer comprises at least one atactic propylene macromonomer and from 0 wt % to 40 wt % of a $C_2$ to $C_{18}$ comonomer, wherein the polymacromonomer has a degree of polymerization greater than 10, an Mn greater than 5000 Da, and a glass transition temperature less than 0° C. and/or an Mw/Mn greater than or equal to about 1.5.

In an embodiment, the polymacromonomer oligomer further comprises a vinyl-terminated isotactic propylene macromonomer having a Mn from 100 to 10,000 Da.

In an embodiment, the polymacromonomer comprises two or more different macromonomers, or three or more different macromonomers, or four or more different macromonomers. By different macromonomers is meant that the macromonomers differ in composition (such as monomer content or comonomer distribution within the macromonomer) or molecular weight. For example, in an embodiment, the polymacromonomer can comprise a propylene macromonomer and an ethylene macromonomer, or a propylene macromonomer and an ethylene-propylene macromonomer, or an ethylene macromonomer and an propylene-ethylene macromonomer. In a particularly preferred embodiment, the entire spectrum from 100% polyethylene macromonomer to 100% polypropylene macromonomer with propylene rich and ethylene rich variations in between is available, including amorphous and crystalline variations. The table below sets out some particularly preferred combinations of macromonomers, where Vinyl-PE is an ethylene macromonomer, or having crystalline structure (e.g., a Tm of 60° C. or more) and 0 to 10 wt % comonomer, and any of the properties described above, Vinyl-aPP is a propylene macromonomer with an amorphous content of at least 10% (or at least 50%, or at least 95%) and or having from 0 wt % to 10 wt % comonomer, Vinyl iPP is a propylene macromonomer with an isotactic pentad content of at least 50% and or having from 0 wt % to 10 wt % comonomer and/or a melting point of at least 70° C., Vinyl-EP is an ethylene-propylene macromonomer having 10 wt % to 50 wt % propylene and 90 wt % to 50 wt % ethylene. Vinyl-Vinyl-PS is a styrene macromonomer, having from 0 wt % to 50 wt % comonomer. Vinyl-pe* is a is an propylene-ethylene macromonomer having 10 wt % to 50 wt % ethylene and 90 wt % to 50 wt % propylene. Where the macromonomers have the same name in the table, please consider that they differ in another means, such as molecular weight or crystallinity.

| Macro-monomer | Vinyl-PE | Vinyl-aPP | Vinyl-iPP | Vinyl-EP | Vinyl-PS | Vinyl-pe* |
|---|---|---|---|---|---|---|
| Vinyl-PE | X | X | X | X | X | X |
| Vinyl-aPP | X | X | X | X | X | X |
| Vinyl-iPP | X | X | X | X | X | X |
| Vinyl-EP | X | X | X | X | X | X |
| Vinyl-PS | X | X | X | X | X | X |
| Vinyl-pe* | X | X | X | X | X | X |

In an embodiment, the polymacromonomer comprises at least two macromonomers where the first macromonomer comprises 60 wt % or more of ethylene and the second macromonomer comprises 60 wt % or more of propylene.

In an embodiment, a termacromonomer is present to produce a polymacromonomer having three different macromonomers, such as Vinyl-aPP+Vinyl-PE+vinyl-EP.

In an embodiment, the polymacromonomer can comprise macromonomers that differ in molecular weight (Mw) by at least 200 g/mol, alternately by at least 300 g/mol, alternately by at least 1000 g/mol, alternately by at least 3000 g/mol, alternately by at least 5000 g/mol. In an embodiment, at least 50 wt % (or at least 60 wt %, or at least 70 wt %, or at least 80 wt %) of the monomers in the macromonomers differ by in molecular weight (Mw) by at least 200 g/mol, alternately by at least 300 g/mol, alternately by at least 1000 g/mol, alternately by at least 3000 g/mol, alternately by at least 5000 g/mol.

In an embodiment, the polymacromonomer can comprise macromonomers that differ in monomer content where the monomers differ by at least one carbon, alternately by at least 2 carbons, alternately by at least 4 carbons, alternately by at least 6 carbons. In an embodiment, at least 50 wt % (or at least 60 wt %, or ate last 70 wt %, or at least 80 wt %) of the monomers in the macromonomers differ by at least one carbon, alternately by at least 2 carbons, alternately by at least 4 carbons, alternately by at least 6 carbons.

In an embodiment the polymacromonomer can comprise macromonomers that differ in total comonomer content by at least 2 wt %, or by at least 5 wt %, or by at least 10 wt %, or by at least 15 wt %, or by at least 20 wt %.

In an embodiment, a polymacromonomer comprises at least one vinyl-terminated macromonomer and from 0 wt % to 40 wt % of a $C_2$ to $C_{18}$ comonomer, wherein the polymacromonomer has a degree of polymerization greater than 10, an Mn greater than 5000 Da, a branching index $g'_{(vis)}$ less than 0.9, and a glass transition temperature less than 60° C., wherein the macromonomer prior to polymerization comprises 1) from 12 to 600 carbon atoms, 2) an Mn of 170 or more, 3) a melting point (Tm) of 60° C. or less, and 4) less than 10 wt % aromatic containing monomer, based on the weight of the macromonomer.

In an embodiment, the vinyl-terminated macromonomer comprises polypropylene, e.g., the vinyl-terminated macromonomer comprises atactic polypropylene, or comprises isotactic polypropylene and atactic polypropylene. In an embodiment, the Mw/Mn of the vinyl-terminated macromonomer is less than 1.5, preferably less than 1.4, preferably from 1 to 1.4, preferably from 1 to 1.3, preferably from 1 to 1.2, preferably from 1.0 to 1.1, preferably from 1.01 to 1.05.

In an embodiment, the degree of polymerization of the polymacromonomer is 15 or more, e.g., from 30 to 200. In an embodiment, the $g'_{(vis)}$ of the polymacromonomer is 0.3 or less, 0.25 or less, or 0.20 or less. In an embodiment, the polymacromonomer has an MWD greater than or equal to about 1.5, or greater than or equal to about 2. In an embodiment, an Mn (SEC-vis) greater than Mn (SEC-RI) and an MWD (SEC-vis) less than MWD (SEC-RI).

In an embodiment, the polymacromonomer comprises a shear thinning rheology. In an embodiment, the polymacromonomer comprises a zero shear viscosity at 35° C. greater than 100 Pa·s and a zero shear viscosity at 100° C. less than 100 Pa·s. In an embodiment, the polymacromonomer comprises a flow activation energy greater than 5 kcal/mol, or greater than 10 kcal/mol, or greater than or equal to 15 kcal/mol. As used herein, flow activation energy is determined using the small amplitude oscillatory shear (SAOS) procedure to develop viscosity data and applying an Arrhenius type of relationship, e.g., a plot of ln(η) versus 1/T is linear with a slope of Ef/R, where η is the viscosity, T is in Kelvin, R is the universal gas constant, and Ef is the flow activation energy.

In an embodiment, a process to control the molecular weight of an oligomerization product comprises contacting a vinyl-terminated atactic propylene macromonomer having an Mn from 100 to 10,000 Da and comprising at least 70% vinyl termination (as measured by $^1H$ $^1H$ NMR) relative to total unsaturations, and up to 40 wt % of $C_2$ to $C_{18}$ comonomer with a catalyst system capable of oligomerizing vinyl-terminated macromonomer, under polymerization conditions at a temperature from 20° C. to 180° C. and for a reaction time in the presence of a chain transfer agent comprising an alkylalumoxanes, a compound represented by the formula $AlR_3$, $ZnR_2$ or a combination thereof, wherein each R is independently a $C_1$-$C_8$ aliphatic radical, to produce a polymacromonomer having a degree of polymerization greater than 10, and an Mn of greater than or equal to about 5000 Da, wherein the composition of R, the ratio of Al to the catalyst, the ratio of Zn to the catalyst, the reaction time, or a combination thereof are selected to produce the polymacromonomer having a molecular weight within a range from 2000 Da to 20,000 Da. In an embodiment the polymacromonomer has a glass transition temperature Tg of less than 0° C.

In an embodiment, the chain transfer agent is $AlR_3$ and each R is selected to be a methyl radical to reduce the molecular weight of the polymacromonomer as compared to an essentially identical process wherein each R is selected to be an octyl radical.

In an embodiment, the reaction time is selected to be longer to reduce the molecular weight of the polymacromonomer as compared to an essentially identical process wherein the reaction time is selected to be shorter. In an embodiment, the chain transfer agent is alumoxane, and the process further comprises adding butylated hydroxytoluene in an amount sufficient to increase the molecular weight of the polymacromonomer relative to an essentially identical process in the absence of butylated hydroxytoluene.

In an embodiment, a process to produce an oligomer having a bimodal molecular weight distribution comprises contacting a first portion of a vinyl-terminated atactic propylene macromonomer having an Mn from 100 to 10,000 Da, and comprising at least 70% vinyl termination (as measured by $^1H$ NMR) relative to total unsaturations, and up to 40 wt % of $C_2$ to $C_{18}$ comonomer with a catalyst system capable of oligomerizing vinyl-terminated macromonomer, under polymerization conditions in a reactor at a temperature from 20° C. to 180° C. for a first reaction time in the presence of a chain transfer agent comprising an methylalumoxane, a compound represented by the formula $AlR_3$, $ZnR_2$, or a combination thereof, wherein each R is independently a $C_1$-$C_8$ aliphatic radical, followed by addition of a second portion of the vinyl-terminated atactic propylene macromonomer to the reactor which is further contacted with the catalyst system for a second period of time to produce a polymacromonomer having a degree of polymerization greater than 10, a glass transition temperature Tg of less than 0° C., and an Mn of greater than or equal to about 5000 Da, and having a bimodal molecular weight distribution.

In additional embodiments, one could manipulate the polymerization conditions such that blocks of macromonomers can be made by, for example, pulsing in different macromonomers, catalyst additions, con concentration and/or addition of chain transfer agents, and the like, at certain time intervals. For example, propylene macromonomers could be polymerized then a large amount of ethylene macromonomer could be polymerized to create a diblock polymacromonomer, or a mixture of polymacromonomers could be made.

This invention relates to the following embodiments:

1. A process to produce polymacromonomers comprising contacting (1) a vinyl-terminated macromonomer (VTM) having an Mn of 125 Da or more and at least 70% vinyl termination (as measured by $^1H$ NMR) relative to total unsaturations, and (2) up to 40 wt % of $C_2$ to $C_{18}$ comonomer, with (3) a catalyst system capable of oligomerizing vinyl-terminated macromonomer, in the presence of a chain transfer agent, under polymerization conditions at a temperature from 20° C. to 180° C. and a reaction time of 1 min to 24 hours to produce a polymacromonomer having a degree of polymerization greater than 10, and an Mn of greater than or equal to about 5000 Da.

2. The process of embodiment 1, wherein the VTM is, prior to polymerization one or more of:
(i) a vinyl-terminated polymer having at least 5% allyl chain ends;
(ii) a vinyl-terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
(iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;
(iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl-terminated macromonomer has at least 40% allyl chain ends relative to total unsaturation;
(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
(vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;
(vii) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;
(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;
(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0;
(x) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum;
(xi) vinyl-terminated polyethylene having: (a) at least 60% allyl chain ends; (b) a molecular weight distribution of less than or equal to 4.0; (c) a g'$_{(vis)}$ of greater than 0.95; and (d) an Mn ($^1$HNMR) of at least 20,000 g/mol; and
(xii) vinyl-terminated polyethylene having: (a) at least 50% allyl chain ends; (b) a molecular weight distribution of less than or equal to 4.0; (c) a g'$_{(vis)}$ of 0.95 or less; (d) an Mn ($^1$HNMR) of at least 7,000 g/mol; and (e) a Mn (GPC)/Mn ($^1$HNMR) in the range of from about 0.8 to about 1.2.

3. The process of either of embodiment 1 or 2, wherein the chain transfer agent is reversible.

4. The process of any one of embodiments 1 to 3, wherein the chain transfer agent is selected from an aluminum containing compound, a zinc containing compound, or a combination thereof 5. The process of any one of embodiments 1 to 4, wherein the polymacromonomer has a branching index g'$_{(vis)}$ less than 0.9.

6. The process of any one of embodiments 1 to 4, wherein the polymacromonomer has a branching index g'$_{(vis)}$ less than 0.5.

7. The process of any one of embodiments 1 to 4, wherein the polymacromonomer has a branching index g'$_{(vis)}$ less than 0.3.

8. The process of any one of embodiments 1 to 4, wherein the polymacromonomer has a branching index g'$_{(vis)}$ from 0.1 to 0.25, or from 0.12 to 0.22.

9. The process of any one of embodiments 1 to 8, wherein the polymacromonomer has a melting point (Tm) of 60° C. or less.

10. The process of any one of embodiments 1 to 9, wherein the polymacromonomer has a glass transition temperature Tg from −10° C. to 40° C.

11. The process of any one of embodiments 1 to 10, wherein the VTM co0prises prior to polymerization:
1) from 12 (or from 15, or from 18) to 600 carbon atoms;
2) an Mn of 170 or more, or 220 or more, or 260 or more;
3) an Mw/Mn of from 1.01 to 2.5;
4) a melting point (Tm) of 60° C. or less; and
5) less than 10 wt % aromatic containing monomer, based on the weight of the macromonomer.

12. The process of any one of embodiments 1 to 11, wherein the VTM comprises prior to polymerization at least 50 mol % atactic polypropylene.

13. The process of any one of embodiments 1 to 12, wherein the VTM comprises prior to polymerization a glass transition temperature (Tg) of less than 0° C.

14. The process of any one of embodiments 1 to 13, wherein the degree of polymerization of the polymacromonomer is 15 or more.

15. The process of any one of embodiments 1 to 14, wherein the degree of polymerization of the polymacromonomer is from 25 to 200.

16. The process of any one of embodiments 1 to 15, wherein the catalyst system comprises the compound represented by the formula:

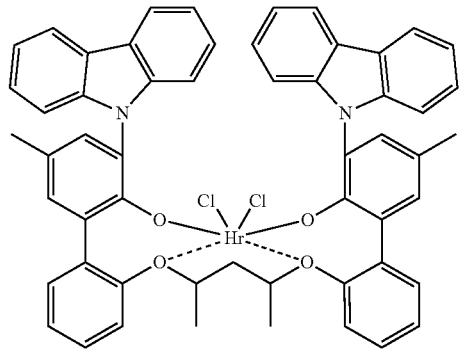

17. The process of any one of embodiments 1 to 16, wherein the chain transfer agent comprises an aluminum containing compound comprising one or a combination of an alkylalumoxane and a compound represented by the formula:

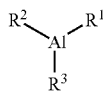

wherein each of $R^1$, $R^2$, and $R^3$ individually comprise a $C_1$-$C_{20}$ hydrocarbyl radical.

18. The process of embodiment 17, wherein each of $R^1$, $R^2$, and $R^3$ individually comprise a $C_1$-$C_8$ aliphatic radical.

19. The process of any one of embodiments 1 to 18, wherein the chain transfer agent further comprises a zinc containing compound represented by the formula $ZnR_2$, wherein each R individually comprises a $C_1$-$C_{20}$ hydrocarbyl radical.

20. The process of any one of embodiments 1 to 18, wherein the chain transfer agent further comprises a zinc containing compound represented by the formula $ZnR_2$, wherein each R individually comprises a $C_1$-$C_8$ aliphatic radical.

21. The process of any one of embodiments 1 to 20, wherein the chain transfer agent comprises an aluminum containing compound comprising MAO, trimethylaluminum, triisobutylaluminum, trioctylaluminum, or a combination thereof 22. The process of any one of embodiments 1 to 21, wherein the catalyst system comprises a ratio of equivalents of Al/Hf from about 10 to 10,000.

23. The process of any one of embodiments 1 to 22, wherein a ratio of equivalents of macromonomer/catalyst Hf is greater than 500, or greater than 1000.

24. The process of any one of embodiments 1 to 23, wherein a ratio of equivalents of macromonomer/catalyst Hf is less than 1000.

25. The process of any one of embodiments 1 to 24, wherein the catalyst system comprises an activator represented by the formula:

wherein Z is (L-H), or a reducible Lewis Acid, wherein L is a neutral Lewis base; H is hydrogen; (L-H)+ is a Bronsted acid; Ad− is a non-coordinating anion having the charge d−; and d is an integer from 1 to 3.

26. The process of any one of embodiments 1 to 25, wherein the catalyst system comprises an activator represented by the formula:

wherein Ad− is a non-coordinating anion having the charge d−; d is an integer from 1 to 3, and Z is a reducible Lewis acid represented by the formula: $(Ar_3C+)$, where Ar is aryl radical, an aryl radical substituted with a heteroatom, an aryl radical substituted with one or more $C_1$ to $C_{40}$ hydrocarbyl radicals, an aryl radical substituted with one or more functional groups comprising elements from Groups 13 to 17 of the periodic table of the elements, or a combination thereof.

27. The process of any one of embodiments 1 to 26, wherein the catalyst system comprises an activator selected from the group consisting of: N,N-dimethylanilinium tetrakis(pentafluorophenyl)borate; triphenylcarbenium tetrakis(pentafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(tert-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis (perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(tert-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium)tetrakis (perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; [4-tert-butyl-PhNMe$_2$H] [$(C_6F_3(C_6F_5)_2)_4$B]; trimethylammonium tetraphenylborate; triethylammonium tetraphenylborate; tripropylammonium tetraphenylborate; tri(n-butyl)ammonium tetraphenylborate; tri(tert-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; ropillium tetraphenylborate; triphenylcarbenium triphenylcarbenium tetraphenylborate; triphenylphosphonium tetraphenylborate; triethylsilylium tetraphenylborate; benzene(diazonium)tetraphenylb orate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium)tetrakis (pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(tert-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyeborate; N,N-dimethyl-(2,4,6-trimethylanilinium)tetrakis-(2,3,4,6-tetrafluorophenyl)borate; tropillium tetrakis-(2,3,4,6-tetrafluorophenyl)borate; triphenylcarbenium tetrakis-(2,3,4,6-tetrafluorophenyl)borate; triphenylphosphonium tetrakis-tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(3,5-bis(trifluoromethyl)phenyl)borate; triethylammonium tetrakis(3,5-bis(trifluoromethyl)

phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(tert-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis (3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium)tetrakis(3,5-bis(trifluoromethyl)phenyl)borate; di-(i-propyl)ammonium tetrakis(pentafluorophenyl)borate; dicyclohexylammonium tetrakis(pentafluorophenyl)borate; trio-tolyl)phosphonium tetrakis(pentafluorophenyl)borate; tri(2,6-dimethylphenyl)phosphonium tetrakis(pentafluorophenyl)borate; triphenylcarbenium tetrakis(perfluorophenyl)borate; 1-(4-(tris(pentafluorophenyl)borate)-2,3,5,6-tetrafluorophenyl)pyrrolidinium; tetrakis (pentafluorophenyl)borate; 4-(tris(pentafluorophenyl)borate)-2,3,5,6-tetrafluoropyridine; triphenylcarbenium tetrakis(3,5-bis(trifluoromethyl)phenyl)borate); and combinations thereof thereof.

28. The process of any one of embodiments 1 to 27, wherein the vinyl-terminated macromonomer and up to 40 wt % of $C_2$ to $C_{18}$ comonomer are contacted with the oligomerization catalyst system in the presence of hydrogen.

29. The process of any one of embodiments 1 to 28, wherein the vinyl-terminated atactic macromonomer and up to 40 wt % of $C_2$ to $C_{18}$ comonomer are contacted with the oligomerization catalyst system in the presence of methylalumoxane and butylated hydroxytoluene.

30. The process of any one of embodiments 1 to 29, wherein the vinyl-terminated macromonomer, prior to polymerization, has an MWD (Mw/Mn) less than 2, less than 1.5, less than 1.2, less than 1.1, or from 1.01 to 1.05.

31. The process of any one of embodiments 1 to 30, wherein the polymacromonomer comprises an Mn (SEC-RI) greater than Mn ($^1$H NMR).

32. The process of any one of embodiments 1 to 31, wherein the polymacromonomer comprises an Mn (SEC-vis) greater than Mn (SEC-RI).

33. The process of any one of embodiments 1 to 32, wherein the polymacromonomer comprises an Mn (SEC-3) greater than Mn (SEC-RI).

34. The process of any one of embodiments 1 to 33, wherein the polymacromonomer comprises an MWD (SEC-RI) less than MWD ($^1$H NMR).

35. The process of any one of embodiments 1 to 34, wherein the polymacromonomer comprises an MWD (SEC-vis) less than MWD (SEC-RI).

36. The process of any one of embodiments 1 to 35, wherein the polymacromonomer comprises an MWD (SEC-3) less than MWD (SEC-RI).

37. The process of any one of embodiments 1 to 29, wherein the polymacromonomer comprises a flow activation energy greater than 5 kcal/mol, greater than 10 kcal/mol, or greater than 12 kcal/mol, or greater than 15 kcal/mol.

38. The process of any one of embodiments 1 to 37, wherein the contacting is in stages with a first portion of the vinyl-terminated macromonomer in a reactor for a first period of time, followed by addition of a second portion of the vinyl-terminated macromonomer to the reactor for a second period of time, wherein the polymacromonomer has a bimodal molecular weight distribution.

39. The polymacromonomer produced according to the process of any one of embodiments 1 to 38.

40. A polymacromonomer comprising at least one atactic propylene macromonomer and from 0 wt % to 40 wt % of a $C_2$ to $C_{18}$ comonomer, wherein the polymacromonomer has a degree of polymerization greater than 10, an Mn greater than 5000 Da, a branching index (g'$_{(vis)}$) less than 0.9, and a glass transition temperature less than 60° C., wherein the macromonomer prior to polymerization comprises:
  1) from 12 to 600 carbon atoms;
  2) an Mn of 170 or more;
  3) a melting point (Tm) of 60° C. or less; and
  4) less than 10 wt % aromatic containing monomer, based on the weight of the macromonomer.

41. The polymacromonomer of embodiment 40, wherein the polymacromonomer has a branching index g'$_{(vis)}$ less than 0.5.

42. The polymacromonomer of either one of embodiments 40 or 41, wherein the polymacromonomer has a branching index g'$_{(vis)}$ less than 0.3.

43. The polymacromonomer of any one of embodiments 40 to 42, wherein the polymacromonomer has a branching index g'$_{(vis)}$ less than 0.25.

44. The polymacromonomer of any one of embodiments 40 to 43, wherein the polymacromonomer has a branching index g'$_{(vis)}$ from 0.12 to 0.22.

45. The polymacromonomer of any one of embodiments 40 to 44, comprising a glass transition temperature Tg from −10° C. to 40° C.

46. The polymacromonomer of any one of embodiments 40 to 45, wherein the macromonomer comprises prior to polymerization:
  1) at least 15, or at least 18 carbon atoms;
  2) an Mn of 220 or more, or 260 or more; and
  3) an Mw/Mn of from 1.01 to 2.5.

47. The polymacromonomer of any one of embodiments 40 to 46, wherein the degree of polymerization of the polymacromonomer is 15 or more.

48. The polymacromonomer of any one of embodiments 40 to 47, wherein the degree of polymerization of the polymacromonomer is from 25 to 200.

49. The polymacromonomer of any one of embodiments 40 to 48, wherein the vinyl-terminated macromonomer, prior to polymerization, has an MWD (Mw/Mn) less than 2, less than 1.5, less than 1.2, less than 1.1, or from 1.01 to 1.05.

50. The polymacromonomer of any one of embodiments 40 to 49, wherein the polymacromonomer comprises an Mn (SEC-RI) greater than Mn ($^1$H NMR).

51. The polymacromonomer of any one of embodiments 40 to 50, wherein the polymacromonomer comprises an Mn (SEC-3) greater than Mn (SEC-RI).

52. The polymacromonomer of any one of embodiments 40 to 51, wherein the polymacromonomer comprises an MWD (SEC-RI) less than MWD ($^1$H NMR).

53. The polymacromonomer of any one of embodiments 40 to 52, wherein the polymacromonomer comprises an MWD (SEC-vis) less than MWD (SEC-RI).

54. The polymacromonomer of any one of embodiments 40 to 53, wherein the polymacromonomer comprises an MWD (SEC-3) less than MWD (SEC-RI).

55. The polymacromonomer of any one of embodiments 40 to 54, wherein the polymacromonomer comprises a flow activation energy greater than 12 kcal/mol, or greater than 15 kcal/mol.

56. The polymacromonomer of any one of embodiments 40 to 55, comprising a bimodal MWD.

57. The polymacromonomer of any one of embodiments 40 to 56, comprising a flow activation energy greater than 5 kcal/mol, greater than 10 kcal/mol, greater than 12 kcal/mol or greater than 15 kcal/mol.

58. The polymacromonomer of any one of embodiments 40 to 57, comprising a shear thinning rheology.

59. The polymacromonomer of any one of embodiments 40 to 58, comprising a zero shear viscosity at 35° C. greater than 100 Pa·s and a zero shear viscosity at 100° C. less than 100 Pa·s.

60. The polymacromonomer of any one of embodiments 40 to 59, comprising a transition from a Newtonian plateau to a shear thinning rheology between a shear rate of from 1 to 100 s$^{-1}$ and at least one temperature between 35° C. and 100° C.

61. The polymacromonomer of any one of embodiments 40 to 60, comprising a Newtonian plateau over a shear rate of from 1 to 100 5$^{-1}$ at a temperature of 35° C.

62. A process to produce polymacromonomers comprising contacting (1) a vinyl-terminated macromonomer having an Mn of 160 Da or more and at least 30% vinyl termination (as measured by $^1$H NMR) relative to total unsaturations, and (2) up to 40 wt % of $C_2$ to $C_{18}$ comonomer, with (3) optionally, a catalyst system capable of oligomerizing vinyl-terminated macromonomer, in the presence of a reversible chain transfer agent selected from an aluminum containing compound, a zinc containing compound, or a combination thereof, under polymerization conditions at a temperature from 20° C. to 180° C. and a reaction time of 1 1 min to 24 hours to produce a polymacromonomer having a degree of polymerization greater than 10, a branching index g'$_{(vis)}$ less than 0.9, a Tg from −10° C. to 40° C. and an Mn of greater than or equal to about 1500 Da.

63. A process to produce polymacromonomers comprising contacting (1) a vinyl-terminated atactic propylene macromonomer comprising from 12 to 600 carbon atoms, an Mn of 220 Da or more, a melting point (Tm) of 60° C. or less and at least 70% vinyl termination (as measured by $^1$H NMR) relative to total unsaturations, and (2) up to 40 wt % of $C_2$ to $C_{18}$ comonomer, with (3) a hafnium catalyst system capable of oligomerizing vinyl-terminated macromonomer, in the presence of a reversible chain transfer agent selected from an aluminum containing compound, a zinc containing compound, or a combination thereof, under polymerization conditions at a temperature from 20° C. to 180° C., a ratio of equivalents of Al/Hf from about 10 to 10,000, a ratio of equivalents of macromonomer/catalyst Hf greater than 500 and a reaction time of 1 min to 24 hours, to produce a polymacromonomer having a degree of polymerization greater than 10, a branching index g'$_{(vis)}$ less than 0.3, a Tg from −10° C. to 40° C., an Mn of greater than or equal to about 5000 Da, an Mn (SEC-vis) greater than Mn (SEC-RI), an MWD (SEC-RI) greater than MWD (SEC-vis) and a flow activation energy greater than 10 kcal/mol.

EXPERIMENTAL

The following non-limiting examples disclose embodiments of the homooligomerization and copolymerization of vinyl-terminated macromonomers (VTMs), in particular, a series of VT-atacticPPs (VT-aPP) macromonomers with Mn from 125 to 6,400 Da are oligimerized. Exemplified embodiments include the homooligomerization of these VT-aPPs using a system based on the bis(phenolate)ether hafnium complex referred to herein as OMC, having the structure as shown in FIG. 1. These experiments and examples explore, among other things, the kinetics of oligomerization, the effect of different activators/scavengers, reaction conditions (temperature, concentration, [M]/[Hf] ratio, macromonomer Mn or Mw, and the like) and hydrogen, on deactivation/reactivation, and the characterization and evaluation of some VT-aPP polymacromonomers and oligomacromers. VT-aPPs are further exemplified in copolymerization embodiments utilizing 1-hexene and 4-methyl-1-pentene (4M1P) as α-olefin comonomers. Examples further include VTM heterooligomers with VT-isotacticPP (VT-iPP) and VT-aPP as cooligomers. Methods of controlling the molecular weight of the oligomer produced include oligomerization examples performed in the presence of aluminum and zinc alkyls as chain transfer agents (CTAs).

Experimental Section

All manipulations were performed under an argon atmosphere using a glove box (Braun MB-150 G1 or LM-130) and Schlenk techniques. $^1$H NMR spectroscopy was performed using a Varian 400 NMR spectrometer. Data were acquired using VNMR-software. Chemical shifts are reported relative to residual CHCl$_3$ (δ at 7.26 ppm for $^1$H). Size Exclusion Chromatography (SEC) was measured on a Waters Alliance system equipped with a Waters 2695 separation module, a Waters 2414 refractive index detector (40° C.), a Waters 2487 dual absorbance detector, a PSS SDV 5 mm guard column followed by 2 PSS SDV linearXL columns in series of 5 mm (8×300) at 40° C. Tetrahydrofuran (THF, Biosolve), stabilized with BHT, was used as eluent at a flow rate of 1 mL·min$^{-1}$. The molecular weights were calculated with respect to polystyrene standards (Polymer Laboratories, M$_p$=580 Da up to M$_p$=7.1.10$^6$ Da). Before SEC analysis was performed, the samples were filtered through a 0.2 μm PTFE filter (13 mm, PP housing, Alltech). SEC of low molecular weight samples was performed on a Waters Alliance system equipped with a Waters 2695 separation module, a Waters 2414 refractive index detector (40° C.), a Waters 2486 UV detector, a PSS SDV 5 mm guard column followed by 2 PSS SDV 5 mm 500 Å columns in series (8×300) at 40° C., using THF stabilized with BHT as eluent, at a flow rate of 1 mL·min$^{-1}$. The molecular weights were calculated with respect to polystyrene standards (Polymer Laboratories, M$_p$=580 Da up to M$_p$=21,000 Da). High-temperature SEC was performed on a Polymer Laboratories PLXT-20 Rapid GPC Polymer Analysis System (including pump, refractive index detector and viscosity detector) at 160° C. with 3 PLgel Olexis (300×7.5 mm, Polymer Laboratories) columns in series. 1,2,4-Trichlorobenzene containing butylated hydroxytoluene (0.5 g·L$^{-1}$) and Irganox 1010 (20 mg·L$^{-1}$) was used as eluent at a flow rate of 1.0 mL·min$^{-1}$ The molecular weights were calculated with respect to polyethylene standards (Polymer Laboratories, Mp=5.310 up to Mp=1.510.000 g/mol). A Polymer Laboratories PL XT-220 robotic sample handling system was used as autosampler. Thermal analyses were carried out with a differential scanning calorimeter (DSC Q1000 from TA Instruments). Between 6 to 10 mg of polymer were placed in an aluminum pan. The samples were generally heated from −80° C. to 50° C. at 10° C.·min$^{-1}$, held at 50° C. for 2 min, and then cooled to −80° C. at 10° C.·min$^{-1}$ After 2 min at this temperature, the sample was heated again to 50° C. at 10° C.·min$^{-1}$ Rheology experiments were performed using an AR G2 torsion rheometer (TA Instruments) equipped with a Peltier plate and a 40 mm upper plate (400 μm gap). Steady state flow measurements were carried out isothermally at temperatures ranging from 25° C. to 100° C. Before the actual measurement the sample was equilibrated at the particular temperature for 2 min. Shear rates ranged from 0.5 to 500 sec$^{-1}$.

Dichloro(2',2'''-(pentane-2,4-diylbis(oxy)) bis(3-(9H-carbazol-9-yl)-5-methyl-[1,1'-biphenyl]-2-olate))hafnium in an ordered mesoporous carbon catalyst system (OMC) was prepared as described in U.S. Patent Application Publication No. 2006/ 0052554 A1 or U.S. Pat. No. 7,126,031. The VT-aPP monomers were produced according to the procedures in U.S. Patent Application Publication No. 2009/0318644. The VT-aPP monomers were dried over 3 Å molecular sieves. Methylalumoxane (10 wt % in toluene, Chemtura), trioctylaluminum (25 wt % in hexanes, Aldrich), trimethylaluminium (Aldrich), triisobutylaluminum (Aldrich) and diethylzinc (Aldrich) were used without further purification. 4-Methyl-1-pentene and 1-hexene were purchased from Fischer Scientific and Acros, respectively, purified by passing through a column of activated alumina and subsequently stored under argon over molecular sieves. Ethylene (4.5 grade supplied by Air Liquid) was purified by passing over columns of BTS copper catalyst and 4 Å molecular sieves. Toluene and methanol were purchased from Biosolve. Toluene was dried over an alumina column, degassed three times (vacuum/argon cycles) and stored in a glove box under nitrogen over molecular sieves prior to use.

Catalytic runs were carried out in 10 mL crimp-capped vials dried in oven at 150° C. prior to use. The monomer/scavenger mixtures were prepared in a glove box as follow: a solution of VT-aPP (typically 1 mmol) and TOA (10-100 µmol) in toluene (1.2 g) were stirred in a closed vial between 2 and 12 h. The vial was then decapped and 0.5 g of a 2 µmol·g$^{-1}$ solution of OMC and trityl tetrakis(pentafluorophenyl)borate in toluene was added. The vial was closed and stirred at the appropriate temperature (oil bath) for a set time. The oligomerizations were quenched using methanol and diluted hydrochloric acid (10 mL). After an overnight stirring, the acidic methanol was separated from the resulting viscous oil and the latter was stirred with methanol (3×10 mL during 2 h) and dried overnight at 80° C. in a vacuum oven.

The conversion of VT-aPP was followed by $^1$H NMR in CDCl$_3$, by comparing vinyl vs. vinylidene signals, assuming the vinylidene-terminated chains were not oligomerized.

The following macromonomers were used in the examples below:

| Macromonomer | Mn (Da) | DP | Vinyl (%) | Tg (° C.) |
|---|---|---|---|---|
| VT-aPP #1 | 125 | 2.97 | 98.1 | |
| VT-aPP #2 | 183 | 4.35 | 95.7 | |
| VT-aPP #3 | 241 | 5.72 | 95 | |
| VT-aPP #4 | 271 | 6.44 | 95.7 | |
| VT-aPP #5 | 313 | 7.44 | 95.2 | |
| VT-aPP #6 | 364 | 8.65 | 94.8 | |
| VT-aPP #179 | 540 | 12.8 | 91 | |
| VT-aPP #26 | 1980 | 47.1 | 91.8 | −21.5 |
| VT-aPP #64 | 6390 | 152 | 93.6 | |

Gel Permeation Chromotography

Mw, Mz number of carbon atoms, g value and g'$_{vis}$ were determined by GPC as described above. As used herein g'$_{vis}$, g' vis or g' (vis) are used interchangeably and refer to the "branching index" which is the ratio of the intrinsic viscosity of a long chain branched polymer to a linear polymer of the same monomer(s). In other words, a linear polymer has a branching index g'$_{vis}$ of 1.0.

$^{13}$C NMR $^{13}$C NMR data were collected and used as described above.

$^1$H NMR $^1$H NMR data was collected and used as described above.

Differential Scanning Calorimetry (DSC)

Crystallization temperature ($T_c$), melting temperature (or melting point, $T_m$), glass transition temperature ($T_g$) and heat of fusion ($H_f$) are measured using Differential Scanning calorimetry (DSC) as described above.

Ethylene Content

Ethylene content in ethylene copolymers was determined by ASTM D 5017-96, except that the minimum signal-to-noise was 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Flow Activation Energy

The flow activation energy was calculated assuming Arrhenius type temperature dependence of the Newtonian viscosity as seen in a plot of the logarithm of complex viscosity viscosity as a function of 1/T.

VT-aPP Homooligomers

1. Oligomerization of VT-aPP 6 at 25 and 60° C.: Preliminary experiments were performed with VT-aPP #6 as macromonomer (M) and in the presence of OMC catalyst to evaluate the latter as oligomerization catalyst precursor. The reactions were performed in toluene at 25° C., using different scavengers/activators and various monomer/catalyst ratios, to find conditions for full conversion and methods to follow the reaction. The conversion of VT-aPP was determined by $^1$H NMR in CDCl$_3$ (vinyl vs. vinylidene) assuming the vinylidene-terminated chains were not oligomerized. The comparison between vinylic and aliphatic protons was less accurate due to the additional aliphatic protons issued from the scavenger (aluminum alkyls). The conversion as determined by size exclusion chromatography (SEC) in THF, which was also possible in the absence of overlapping between the peaks attributed to oligo(VT-aPP) and VT-aPP, was not determined. The initial results are reported in Table 1.

TABLE 1

VT-aPP#6 oligomerization in the presence of OMC.

| Run | [Vinyl]/[Hf] ratio | Scav. (eq./Hf) | Cocatalyst[a] (eq./Hf) | T (° C.) | Time (h) | Vinyl Conv.[b] (%) (Aliph./Vinylidene) | Activity[c] (kg/mol/h) |
|---|---|---|---|---|---|---|---|
| 1 | 100 | MAO (70) | — | 25 | 10 | 100/100 | 3.6 |
| 2 | 480 | MAO (75) | — | 25 | 10 | 53/56 | 9.6 |
| 3 | 940 | MAO (75) | — | 25 | 10 | 21/30 | 8.7 |
| 14 | 1020 | MAO (1020) | — | 25 | 10 | 46/39 | 15.8 |
| 7 | 1000 | — | BF$_{20}$ (1.4) | 25 | 12 | 10/<0 | 1.9 |
| 8 | 990 | MAO (50) | BF$_{20}$ (1.4) | 25 | 12 | 41/45 | 13.8 |
| 13 | 970 | MAO (970) | BF$_{20}$ (1.5) | 25 | 10 | 45/41 | 15.9 |
| 9 | 1000 | MAO/BHT (100)/(50) | BF$_{20}$ (1.4) | 25 | 12 | 31/36 | 10.5 |

TABLE 1-continued

VT-aPP#6 oligomerization in the presence of OMC.

| Run | [Vinyl]/[Hf] ratio | Scav. (eq./Hf) | Cocatalyst[a] (eq./Hf) | T (° C.) | Time (h) | Vinyl Conv.[b] (%) (Aliph./Vinylidene) | Activity[c] (kg/mol/h) |
|---|---|---|---|---|---|---|---|
| 12 | 1010 | MAO/BHT (100)/(100) | $BF_{20}$ (1.5) | 25 | 10 | 21/26 | 8.6 |
| 4 | 115 | TOA (50) | $BF_{20}$ (1.2) | 25 | 18 | 100/100 | 2.2 |
| 5 | 490 | TOA (55) | $BF_{20}$ (1.2) | 25 | 18 | 100/100 | 9.6 |
| 6 | 940 | TOA (50) | $BF_{20}$ (1.2) | 25 | 18 | 69c/67d | 13.0 |
| 18 | 940 | TOA (1000) | $BF_{20}$ (1.5) | 25 | 10 | 38/39 | 10.4 |
| 22 | 1000 | TOA (50) | $BF_{20}$ (1.3) | 60 | 5 | 97/97 | 70.6 |
| 19 | 1000 | TOA (1000) | $BF_{20}$ (1.3) | 60 | 5 | 100/100 | 72.5 |
| 10 | 1020 | $Et_2Al(OEt)$ (60) | $BF_{20}$ (1.4) | 25 | 12 | 28/29 | 9.4 |
| 11 | 1010 | $Et_2Al(OEt)$ (120) | $BF_{20}$ (1.5) | 25 | 10 | 33/34 | 12.3 |
| 15 | 960 | TIBA (50) | $BF_{20}$ (1.5) | 25 | 10 | 31/29 | 10.5 |
| 16 | 960 | TMA (60) | $BF_{20}$ (1.5) | 25 | 10 | 43/32 | 14.3 |
| 17 | 960 | $ZnEt_2$ (50) | $BF_{20}$ (1.5) | 25 | 10 | 18/<0 | — |
| 21 | 1010 | $ZnEt_2$ (50) | $BF_{20}$ (1.3) | 25 | 10 | 16/4 | — |

Table Notes:
Reaction conditions: Hf: 1 μmol; s = toluene (volume reaction mixture: 2.5 mL);
[a]$BF_{20}$ = $[CPh_3]^+[B(C_6F_5)_4]$;
[b]determined as H vinyl/H aliphatic ($^1$H NMR/ExxonMobil value), H vinyl/H vinylidene ($^1$H NMR);
[c]average value from different conversion calculations.

Although there was some deviation between the methods used to determine the catalytic activity, the results in Table 1 clearly demonstrate that OMC can be used as catalyst precursor for the VT-aPP oligomerization, and full conversion was obtained at 25° C. for M/Hf ratios up to 500, using $[(C_6H_5)_3C]^+[B(C_6F_5)_4]^-$ as cocatalyst and in the presence of a limited amount of scavenger (~50 eq./Hf, run 5). For M/Hf ratios of 1000, the reaction was never complete, and the activities measured were within the same order of magnitude, independently of the aluminum alkyl used for scavenger under similar conditions, between 9.4 ($Et_2Al(OEt)$, run 10) and 14.3 kg·mol$^{-1}$·h$^{-1}$ (TMA, run 16). Higher Al/Hf ratios did not significantly affect the activity and resulted in slight increases for MAO (compare run 13 vs. 8) and $Et_2Al(OEt)$ (compare run 10 vs. 11) and a slight decrease for TOA (compare run 18 vs 6). No polymer was detected by SEC in the presence of $ZnEt_2$ (runs 17 and 21).

The influence of the different aluminum alkyls was more pronounced on the molecular weight. Thus, Mn values between 3,900 (TMA, run 16) and 14,700 Da (TIBA, run 15) were determined for reactions performed under similar conditions. This difference in molecular weight suggests a significant chain transfer to Al occurred in the presence of TMA while this phenomenon proceeded to a significant lesser extent with the bulkier TIBA. Chain transfer also yielded polymer of lower MWD (1.5 vs. 2.2), suggesting a reversible chain transfer process.

The introduction of larger amounts of MAO, e.g., 1000 equivalents Al/Hf, resulted in a a drop in molecular weight from 7900 in run 8 to 2700 Da in run 13, and also a drop in MWD, probably due to TMA contained in MAO. The chain transfer due to TMA was suppressed by the addition of a sterically hindered phenol to react selectively with free TMA in MAO. In this way, Mn of 15800 Da was obtained by adding 1 equivalent of BHT/Al in run 12, compared to 7900 Da in run 8, performed in the absence of BHT. However, the catalytic activity decreased significantly (8.6 and 13.8, respectively).

Lower activity and molecular weight were observed at a TOA/Hf ratio of 1000/1 by comparison with 50/1 (runs 6 and 18). This indicates that TOA can act as a chain transfer agent as well, but to a lesser extent than TMA or MAO.

Comparing runs 13 and 14, similar activity, molecular weight and MWD were determined when MAO was used as scavenger/activator with and without $BF_{20}$. Finally, full conversion of VT-aPP was obtained in run 19 at 60° C. within 5 h, in the presence of 1000 eq. TOA/Hf, corresponding to an activity of 72 kg oligo(VT-aPP)·mol$^{-1}$ (Hf)·h$^{-1}$. In run 20, 50 eq. TOA/Hf led to nearly complete conversion and material of slightly higher molecular weight (14,700 vs. 13,200 Da).

In summary, oligomerization of VT-aPP of Mn=364 using different aluminum alkyl scavengers/activators and the bis (phenolate) ether Hf complex OMC as catalyst precursor afforded oligo(VT-aPP) of molecular weight between 2,200 and 15,700 Da. The molecular weights were strongly depending on the scavenger. The addition of TMA, neat as well as contained in MAO, resulted in a lowering of molecular weight and MWD due to chain transfer, while TOA, TIBA, $Et_2AlOEt$, and MAO/BHT yielded materials of similar molecular weight and MWD. At 25° C., the reaction was rather slow and only partial conversion of VT-aPP was observed for M/Hf ratios of 1000/1 mol/mol, while the macromonomer was fully oligomerized within 5 hours at 60° C.

2a. Effect of temperature: Kinetic studies at 25 and 60° C. (VT-aPP#6 and #1): The evolution of an oligomerization performed under similar conditions as run 6 (M/TOA/Hf=1,000/50/1 mol/mol/mol; 25° C.) was studied. The conversion of VT-aPP increased gradually with time, while the maximum molecular weight was measured after 6 h, leading to a plateau of Mw ~32,000 Da for longer reaction times, thus indicating a non-living behavior and chain transfer of the oligomeric chains resulting in the formation of multiple chains per hafnium. Molecular weight distributions did not follow any particular trend and were between 1.9 and 2.2. At 60° C., the oligomerization occurred much faster and a maximum molecular weight of similar value was already reached within 15 minutes, followed by a slow decrease upon time, which can be attributed to monomer depletion. Full conversion of VT-aPP was obtained after 5 hours.

2b. Effect of temperature: Kinetics at 100° C. (VT-aPP#6): The evolution in time of of an oligomerization performed under similar conditions as run 19 but at 100° C. (M/TOA/Hf=1,000/50/1), is summarized in Table 2.

TABLE 2

VT-aPP#6 oligomerization in the presence of OMC at 100° C.

| Run | [Vinyl]/[Hf] ratio | Scav. (eq./Hf) | Cocatalyst[a] (eq./Hf) | T (° C.) | Time (h) | Vinyl Conv.[b] (%) (Aliph./ Vinylidene) | Activity[c] (kg/mol/h) | DP (M) |
|---|---|---|---|---|---|---|---|---|
| 19 | 1000 | TOA (1000) | BF$_{20}$ (1.3) | 60 | 5 | 100 | 72.5 | 36 |
| 24 | 1,000 | TOA (1000) | BF$_{20}$ (1.6) | 100 | 0.25 | 38 | 549 | 35 |
| 25 | 1,000 | TOA (1000) | BF$_{20}$ (1.6) | 100 | 0.5 | 81 | 593 | 22 |
| 26 | 1,000 | TOA (1000) | BF$_{20}$ (1.6) | 100 | 1.0 | 90 | 370 | 19 |
| 27 | 1,000 | TOA (1000) | BF$_{20}$ (1.6) | 100 | 2.0 | >99.5 | 200 | 17 |

Table Notes:
Reaction conditions: Hf: 1 μmol; s = toluene (volume reaction mixture: 2.5 mL);
[a] BF$_{20}$ = [CPh$_3$]$^+$[B(C$_6$F$_5$)$_4$];
[b] determined as H vinyl/H vinylidene ($^1$H NMR);
[c] average value from different conversion calculations.

At 100° C., the reaction occurred only slightly faster and as seen in run 26 90% of VT-aPP was oligomerized after 1 hour (vs. 79% at 60° C., not shown). However, in run 27 nearly full conversion was obtained within 2 hours, while 5 hours were necessary at 60° C. A maximum molecular weight of 12,800 Da was also measured after 15 minutes (run 24), which was followed by a significant decrease upon time, down to 6,200 Da at full conversion (13,200 Da at 60° C.). The degree of polymerization of the resulting material was half the value obtained during run 19 (17 vs. 36), which clearly indicates increasing chain transfer with increasing temperature.

2c. Effect of Temperature: Higher temperatures (VT-aPP#5, Mn 312.8, 95.25% vinyl): The oligomerization of VT-aPP#5 macromonomer was conducted at various temperatures from 60° C. up to 150° C. The results related to the variation of conversion, molecular weight, molecular weight distribution and degree of polymerization are displayed in Table 3.

was reduced to 100/1, which resulted in in run 28 an increase in molecular weight from 8,700 and DP 28 to 13,500 Da and DP 43 in run 53, although only 70% of the macromonomer was oligomerized. Under the same experimental conditions with respect to catalyst, cocatalyst, scavenger, monomer concentration and temperature, the oligomerization of VT-aPP#5 only reached 30% when the catalyst was added shortly after the scavenger. Hence, the lower activity for run 48 compared to run 53 is probably due to decomposition of the complex by residual traces of water. Therefore, in subsequent runs the macromonomers were pre-dried on the TOA for a prolonged time prior to the oligomerization reactions.

The catalytic activity improved as the temperature increased, and conversions above 95% were seen between 80° C. and 120° C. (runs 49-51). The catalyst proved to be robust at a temperature as high as 150° C., yielding 88% of oligomerization (run 52). Interestingly, the rise in temperature led to only a moderate drop in molecular weight, e.g., an

TABLE 3

VT-aPP#5 oligomerization in the presence of OMC at 60° C.-150° C.

| Run | [Vinyl]/[Hf] ratio | Scav. (eq./Hf) | Cocatalyst[a] (eq./Hf) | T (° C.) | Time (h) | Vinyl Conv.[b] (%) (Aliph./ Vinylidene) | Activity[c] (kg/mol/h) | DP (M) |
|---|---|---|---|---|---|---|---|---|
| 28 | 930 | TOA (940) | BF$_{20}$(1.6) | 60 | 5 | 96 | 56 | 28 |
| 48 | 960 | TOA (100) | BF$_{20}$(1.3) | 60 | 2 | 30 | 45 | 50 |
| 53 | 1,000 | TOA (100) | BF$_{20}$(1.3) | 60 | 2 | 70 | 109 | 43 |
| 49 | 1,000 | TOA (100) | BF$_{20}$(1.3) | 80 | 2 | 96 | 150 | 40 |
| 50 | 1,000 | TOA (100) | BF$_{20}$(1.3) | 100 | 2 | 96 | 149 | 36 |
| 51 | 1,000 | TOA (100) | BF$_{20}$(1.3) | 120 | 2 | 99 | 154 | 31 |
| 52 | 1,000 | TOA (100) | BF$_{20}$(1.3) | 150 | 2 | 88 | 138 | 36 |

Table Notes:
Reaction conditions: Hf: 1 μmol; s = toluene (volume reaction mixture: 2.5 mL); addition of catalyst 2 minutes after TOA addition;
[a] BF$_{20}$ = [CPh$_3$]$^+$[B(C$_6$F$_5$)$_4$];
[b] determined as H vinyl/H vinylidene ($^1$H NMR);
[c] average value from different conversion calculations.

For runs 48-53, the reactions were quenched after 2 hours, as nearly full conversion of VT-aPP#6 was achieved at 100° C. in run 27 within that time. In addition, the TOA/Hf ratio oligomer with Mn of 11,300 Da was obtained at 150° C. The MWD remained rather high (2.0-2.5). Whereas no significant drop in molecular weight with increasing reaction temperature was observed for the oligomerization of VT-aPP#5 macromonomers, a considerable reduction in molecular weight value was measured with increasing temperatures for the oligomerization of of VT-aPP#6 (Table 2). Since the only two differences are (i) the Al/Hf ratio and (ii) the macromonomer used, the difference in molecular weight for both systems is probably the result of the difference in [TOA] and suggests an increased chain transfer behavior at elevated elevated temperatures, which only becomes apparent at high TOA concentrations (Table 2).

During run 60, a catalytic reaction mixture was prepared at 23° C. and then placed in a heating block kept at 180° C.; following this procedure 96% of monomer was oligomerized after 2 hours. In run 84, a VT-aPP/TOA mixture was preheated at 180° C. before the catalyst solution was added. This procedure also led to high conversion, showing the robustness of the catalyst system at such a high temperature. A slight drop in conversion (89%) was noticed, however, which could be resulting from catalyst deactivation as a result of exposure to air during the injection of the catalyst solution or the low amount (10 eq./Hf) of TOA.

TABLE 4

VT-aPP#4 oligomerization in the presence of OMC at 60° C.-150° C.

| Run | [Vinyl]/[Hf] ratio | Scav. (eq./Hf) | Cocatalyst[a] (eq./Hf) | T (° C.) | Time (h) | Vinyl Conv.[b] (%) (Aliph./ Vinylidene) | Activity[c] (kg/mol/h) | DP (M) |
|---|---|---|---|---|---|---|---|---|
| 54 | 1,000 | TOA (100) | $BF_{20}$ (1.4) | 60 | 2 | 89 | 121 | 52 |
| 55 | 1,000 | TOA (100) | $BF_{20}$ (1.4) | 80 | 2 | 100 | 136 | 43 |
| 56 | 1,000 | TOA (100) | $BF_{20}$ (1.4) | 100 | 2 | 100 | 136 | 40 |
| 57 | 1,000 | TOA (100) | $BF_{20}$ (1.4) | 120 | 2 | 100 | 136 | 31 |
| 58 | 1,000 | TOA (100) | $BF_{20}$ (1.4) | 150 | 2 | 97 | 132 | 33 |
| 59 | 1,000 | TOA (100) | $BF_{20}$ (1.4) | 180 | 2 | 96 | 130 | 35 |
| 60 | 1,000 | TOA (100) | $BF_{20}$ (1.4) | 180 | 2 | 89 | 110 | 36 |
| 84 | 1,000 | TOA (10) | $BF_{20}$ (1.2) | 180 | 2 | 89 | 121 | 52 |

Table Notes:
Reaction conditions: Hf: 1 μmol; s = toluene (volume reaction mixture: 2.5 mL;
[a]$BF_{20}$ = $[CPh_3]^+[B(C_6F_5)_4]$;
[b]determined as H vinyl/H vinylidene ($^1$H NMR);
[c]average value from different conversion calculations.

2d. Effect of Temperature: Oligomerization of VT-aPP#4 (Mn 271.4, 95.72% vinyl) at different temperatures: To investigate the type of macromonomer as the cause of the Mn variations, oligomerizations of VT-aPP#4 were performed at different temperatures. Under the same reaction conditions (M/TOA/Hf=1000/100/1), VT-aPP#4 oligomerization took place slightly faster than the oligomerization of VT-aPP#5, as shown in Table 4.

Full conversions were measured between 80° C. and 120° C. (runs 55-57), 95% at 150° C., and 96% at 180° C. (runs 58 and 60). Although increasing the temperature resulted into a drop in molecular weight, from Mn 14,200, DP 52 at 60° C. (run 54) to Mn 10,900, DP 40 at 100° C., the drop was less pronounced than in Table 2. At higher temperatures, the Mn and DP values differed only marginally, from Mn 8,400, DP 31 (run 57) to Mn 9,400, DP 35 (run 60), at 120° C. and 180° C., respectively. The degrees of polymerizations were similar to those determined with sample VT-aPP#5. Hence, the MWD did not show any strong dependence on temperature and the difference in molecular weight at high temperature between Table 2 and Tables 3-4 may have been the result of the different aluminum alkyl activators used.

2e. Effect of Temperature: Kinetics of VT-aPP#1 (Mn 125.2, 98.06% vinyl) oligomerization at 25° C. and 60° C. The evolution of the oligomerization of VT-aPP#1, the smallest Mn of the, at 60° C. with M/Hf and TOA/Hf ratios of 1,000/1 (conditions of run 19, Table 1) was followed in time and the results summarized in Table 5.

Under these conditions, the oligomerization of VT-aPP#1 occurred much faster than that of VT-aPP #6. Almost full conversion (>99%) was reached within 30 minutes (run 42), and 85% after 15 minutes (run 41). By comparison, only 54% of VT-aPP #6 was oligomerized after 30 minutes. This is obviously the result of the difference in size of VT-aPP#6 with regard to VT-aPP#1. The Mn of the resulting material in run 42 was about 6,500 Da, corresponding to a degree of polymerization of 53 compared to around 40 with monomer VT-aPP#6. Molecular weight distributions were between 3.2 and 3.6, considerably higher than the ones determined for oligomers produced from the other batches. At 25° C. (run 45), the reaction proceeded much slower than at 60° C., and after 18 hours, the conversion was 92% (30% with VT-aPP#6 after 15 h), affording a material with Mn of 13,100, DP 105 and MWD of 2.7.

TABLE 5

VT-aPP#1 oligomerization in the presence of OMC at 25° C. and 60° C.

| Run | [Vinyl]/[Hf] ratio | Scav. (eq./Hf) | Cocatalyst[a] (eq./Hf) | T (° C.) | Time (h) | Vinyl Conv.[b] (%) (Aliph./ Vinylidene) | Activity[c] (kg/mol/h) | DP (M) |
|---|---|---|---|---|---|---|---|---|
| 45 | 1,000 | TOA (1020) | $BF_{20}$ (1.4) | 25 | 18 | 92 | 6 | 105 |
| 41 | 1,000 | TOA (1020) | $BF_{20}$ (1.4) | 60 | 0.25 | 85 | 422 | 43 |
| 42 | 1,000 | TOA (1020) | $BF_{20}$ (1.4) | 60 | 0.5 | >99 | 248 | 53 |
| 43 | 1,000 | TOA (1020) | $BF_{20}$ (1.4) | 60 | 1 | 100 | 125 | 49 |
| 34 | 1,000 | TOA (1000) | $BF_{20}$ (1.4) | 60 | 5 | 100 | 25 | 52 |

Table Notes:
Reaction conditions: Hf: 1 μmol; s = toluene (volume reaction mixture: 2.5 mL;
[a] $BF_{20}$ = $[CPh_3]^+[B(C_6F_5)_4]$;
[b] determined as H vinyl/H vinylidene ($^1$H NMR);
[c] average value from different conversion calculations.

2f. Effect of Temperature: Summary: VT-aPP oligomerization using TOA as scavenger/activator and OMC as catalyst precursor afforded oligo(VT-aPP)s of molecular weights up to 15,000 Da. This catalytic system proved to be robust at temperatures up to 180° C., and high conversions (>95%) of several VT-aPP macromonomers were observed at temperatures from 60° C. to 180° C. for M/Hf of 1,000/1. Monitoring conversion, molecular weight and molecular weight over time revealed that in general a maximum molecular weight value was reached at early stages of oligomerization, after which the oligomeric chains generally did not grow further, in spite of monomer consumption.

3. Low TOA/Hf ratios (VT-aPP #4, Mn 271.4, 95% vinyl): These runs investigated conditions yielding high monomer conversions (95% or more) with low to moderate amounts of scavenger, e.g., Al/Hf ratios reduced to 50/1 to 10/1 and M/Hf raised up to 5000/1. Because of the low amounts of scavenger, protic impurities contained in VT-aPP were neutralized by TOA during at least one day prior to use. To reach full conversion, reactions involving M/Hf ratios of 5000 were allowed to proceed during 24 h and at 80° C. The results of oligomerization of VT-aPP#4 using low amounts of TOA are presented in Table 6.

between 52 and 56. A slight drop in MWD was noticed as well, from 2.4 to 2.3 to 2.1, which might be due to a lower interaction of the aluminum alkyl with the active species at low Al/Hf ratios. Interestingly, VT-aPP was completely oligomerized when the TOA content was low, unlike with a TOA/Hf ratio of 100/1. In the latter case, the scavenging of protic species contained in the monomer was probably not complete and the catalyst was introduced into the reaction vessel too early (15-30 min. after M/TOA mixing). Apparently, the purification of the VT-aPP takes considerably more time than was anticipated. Full conversions of VT-aPP were also obtained for M/Hf ratio of 5000/1 at 80° C., after 24 h. The molecular weight of the resulting oligomers was even higher, about 18,000 Da (DP ~66) and the MWD slightly below 2 (runs 68 and 67).

4. Effects of M/Hf ratio and catalyst concentration (VT-aPP#3 and VT-aPP#5): Reactions conducted under the conditions of run 19 (Table 1) using VT-aPP#5 ($M_n$: 312.8 Da; 95.25% vinyl) as the monomer with various M/Hf ratios are depicted in Table 7. For a similar M/Hf ratio (run 28), a slightly lower conversion was reached (96% vs. 100% in run

TABLE 6

VT-aPP#4 oligomerization in the presence of OMC at low TOA.

| Run | [Vinyl]/[Hf] ratio | Scav. (eq./Hf) | Cocatalyst[a] (eq./Hf) | T (° C.) | Time (h) | Vinyl Conv.[b] (%) (Aliph./ Vinylidene) | Activity[c] (kg/mol/h) | DP (M) |
|---|---|---|---|---|---|---|---|---|
| 61 | 1,010 | TOA (10) | $BF_{20}$ (1.4) | 60 | 2 | 100 | 137 | 56 |
| 68 | 5,000 | TOA (10) | $BF_{20}$ (1.4) | 80 | 24 | 100 | 56 | 67 |
| 70 | 1,000 | TOA (50) | $BF_{20}$ (1.4) | 60 | 2 | 100 | 135 | 53 |
| 67 | 5,000 | TOA (50) | $BF_{20}$ (1.4) | 80 | 24 | 100 | 57 | 67 |
| 54 | 1,000 | TOA (100) | $BF_{20}$ (1.4) | 60 | 2 | 89 | 121 | 52 |

Table Notes:
Reaction conditions: Hf: 1 μmol; s = toluene (volume reaction mixture: 2.5 mL;
[a] $BF_{20}$ = $[CPh_3]^+[B(C_6F_5)_4]$;
[b] determined as H vinyl/H vinylidene ($^1$H NMR);
[c] average value from different conversion calculations.

Decreasing the amount of scavenger resulted in a very slight rise in molecular weight at 60° C. from 14,200 (run 54) to 14,400 (run 70) to 15,100 (run 61), for TOA/Hf ratios of 100/1, 50/1 and 10/1, respectively, corresponding to DP's 19), along with a lower DP (28 for 36) and $M_n$ (8,700 Da). For a M/Hf of around 2000 (run 32), the reaction was not complete (79%), but the activity was significantly higher, as well as $M_n$ (12,500 Da) and DP (40). Sequential addition of twice 1,000 eq. monomer/Hf resulted in somewhat lower total conversion (73%) and as expected a lower molecular weight (9,990 Da; DP: 32; run 33).

from complete. Thus, 55% of VT-aPP#4 remained unreacted for M/Hf ratio of 8,000/1 (0.5 mmol Hf, run 77) and a conversion of 16% was determined for M/Hf of 20,000/1 (0.2 mmol Hf, run 71). The activities (~40 kg/mol Hf/h for both reactions) were much lower than for the M/Hf ratio of 1,000/1 (1 mmol Hf, run 61). Yet again, higher molecular weights were seen for increased M/Hf ratios (15,100 for run 77 and 20,500 Da for run 71). The difference in catalytic activity between the rather similar VT-aPP#3 and VT-aPP#4 was unexpected.

TABLE 7

VT-aPP#5 oligomerization in the presence of OMC at different M/Hf ratios.

| Run | [Vinyl]/[Hf] ratio | Scav. (eq./Hf) | Cocatalyst[a] (eq./Hf) | T (°C.) | Time (h) | Vinyl Conv.[b] (%) (Aliph./Vinylidene) | Activity[c] (kg/mol/h) | DP (M) |
|---|---|---|---|---|---|---|---|---|
| 19[d] | 1,000 | TOA (10) | $BF_{20}$ (1.3) | 60 | 5 | 100 | 137 | 36 |
| 28 | 930 | TOA (10) | $BF_{20}$ (1.6) | 60 | 5 | 96 | 56 | 28 |
| 32 | 1,960 | TOA (50) | $BF_{20}$ (1.6) | 60 | 5 | 79 | 135 | 40 |
| 33 | 980/1000 | TOA (1000/240) | $BF_{20}$ (1.6) | 60 | 5 | 73 | ND | 32 |

Table Notes:
Reaction conditions: Hf: 1 μmol; s = toluene (volume reaction mixture: 2.5 mL);
[a]$BF_{20}$ = [$CPh_3$][$^+$][$B(C_6F_5)_4$];
[b]determined as H vinyl/H vinylidene ($^1$H NMR);
[c]average value from different conversion calculations;
[d]VT-aPP#6; ND = not determined.

Oligomerization experiments of VT-aPP#3 (Mn 240.7 Da, 95% vinyl) and VT-aPP#4 (Mn 271.4 Da, 95% vinyl) with reduced amounts of OMC (between 0.2 and 0.5 μmol) and constant M/scavenger ratio are presented in Table 8.

TABLE 8

VT-aPP oligomerization with low OMC amounts.

| Run | M (Mn) | Hf (μmol) | [Vinyl] (eq./[Hf]) | Scav. (eq./Hf) | $BF_{20}$[a] (eq./Hf) | T (°C.) | Time (h) | Vinyl Conv.[b] (%) | Activity[c] (kg/mol/h) | DP (M) |
|---|---|---|---|---|---|---|---|---|---|---|
| 72 | VT-aPP#3 (240.7) | 1.0 | 1,010 | TOA (10) | 1.4 | 60 | 2 | 100 | 122 | 34 |
| 91 | VT-aPP#3 (240.7) | 0.5 | 2,000 | TOA (20) | 1.3 | 60 | 2 | 92 | 231 | 40 |
| 92 | VT-aPP#3 (240.7) | 0.2 | 4,670 | TOA (50) | 1.3 | 60 | 2 | 43 | 240 | 85 |
| 61 | VT-aPP#4 (271.4) | 1.0 | 1,010 | TOA (80) | 1.4 | 60 | 2 | 100 | 137 | 41 |
| 77 | VT-aPP#4 (271.4) | 0.5 | 8,000 | TOA (200) | 1.4 | 60 | 24 | 45 | 41 | 56 |
| 71 | VT-aPP#4 (271.4) | 0.2 | 20,000 | TOA (50) | 1.4 | 60 | 24 | 16 | 37 | 76 |
| 100 | VT-aPP#3 (240.7) | 0.4 | 9,720 | TOA (10) | 1.3 | 120 | 2 | 83 | 1,170 | 64 |
|  |  |  |  |  |  |  | 4 | 87 | 512 | 68 |
|  |  |  |  |  |  |  | 14 | 89 | 150 | 78 |
| 101 | VT-aPP#3 (240.7) | 0.2 | 20,000 | TOA (100) | 1.3 | 120 | 4 | 57 | 683 | 88 |
|  |  |  |  |  |  |  | 24 | 58 | 116 | 74 |

Table Notes: Reaction conditions: s = toluene, volume reaction mixture: 2.5 mL;
[a]$BF_{20}$ = [$CPh_3$][$^+$][$B(C_6F_5)_4$];
[b]determined as H vinyl/H vinylidene ($^1$H NMR);
[c]average value from different conversion calculations.

Under similar conditions (60° C., 1 mmol monomer, 10 mmol TOA), the decrease of catalyst amount from 1 to 0.5 mmol resulted in a slight rise in molecular weight from 8,300 (run 72) to 9,700 Da (run 91), which became even more pronounced (20,800 Da) in the presence of just 0.2 mmol of OMC (run 92). After 2 hours, the oligomerization of VT-aPP#3 was only complete with 1 mmol of Hf. The similar activities determined for runs 91 and 92 showed that partial conversion was due to too short reaction time and not to catalyst deactivation.

For VT-aPP#4, a significant increase of the monomer/catalyst ratio resulted in a severe drop in activity and, in spite of reaction times of 24 h, the conversion of the monomer was far To oligomerize larger quantities of monomer using less catalyst, the temperature was raised to 120° C. and the reactions were allowed to proceed for a longer time (reactions carried out with monomer VT-aPP#3). The reaction data determined from runs 100 (0.4 mmol Hf; M/Hf=9,700/1) and 101 (0.2 μmol Hf; M/Hf=20,000/1) show clearly that a rapid catalyst deactivation occurred during the process, with conversions remaining rather constant after 2 and 4 h, respectively. The increase of M/Hf ratio resulted in oligomers with $M_n$ of 18,000 Da.

In summary, the catalyst system proved to be still active when only 0.2 μmol of OMC was used. A reaction temperature of 120° C. improved the catalytic activity. Higher temperature also resulted in apparent catalyst deactivation, as indicated by only partial monomer conversion, in spite of high activity.

5. Oligomerization of high molecular weight macromonomers VT-aPP#26 (Vinyl 91.8%, Mn 1,983 Da) and VT-aPP#64 (Vinyl 93.6, Mn 6,393 Da): OMC was evaluated as oligomerization catalyst precursor for VT-aPPs with relatively high Mn. The reaction conditions were established to reach high monomer conversion with a low to moderate amount of scavenger (TOA). As the two macromonomers were very viscous, stock solutions in toluene were prepared and stored over calcined basic alumina. The resulting material was purified by treatment with acidic methanol, washed with methanol and dried in vacuo. The results are summarized in Table 9.

TABLE 9

VT-aPP#26 oligomerization in the presence of OMC.

| Run | [Vinyl]/[Hf]ratio | TOA (eq./Hf) | $BF_{20}$- (eq./Hf) | T (° C.) | Time (h) | Vinyl Conv.$^a$ (%) (Aliph./Vinylidene) | Activity$^b$ (kg/mol/h) | $DP^c$ (M) |
|---|---|---|---|---|---|---|---|---|
| 85 | 770 | 10 | 1.2 | 60 | 3 | 81 | 417 | 38 |
| 86 | 760 | 10 | 1.2 | 60 | 3 | 78 | 400 | 41 |
| 89 | 770 | 20 | 1.3 | 60 | 3 | 77 | 390 | 40 |
| 87 | 770 | 50 | 1.2 | 60 | 3 | 73 | 375 | 39 |
| 88 | 770 | 10 | 1.2 | 100 | 3 | 93 | 477 | 35 |
| 93 | 760 | 10 | 1.3 | 120 | 3 | 94 | 480 | 36 |
| 95 | 750 | 10 | 1.3 | 100 | 24 | 100 | 63 | 33 |
| 97 | 770 | 10 | 1.3 | 100 | 24 | 100 | 65 | 32 |
| 98 | 1,000 | 10 | 1.3 | 100 | 15 | 100 | 135 | 36 |
| 99$^d$ | 500 | 50 | 1.3 | 100 | 15 | 94 | 200 | 25 |
|  |  |  |  |  | 24 | 100 | 133 | 23 |

Table Notes: Reaction conditions: Hf: 1 μmol; s = toluene (volume reaction mixture: 2.5 mL;
$^a$determined as H vinyl/H vinylidene ($^1$H NMR);
$^b$average value from different conversion calculations;
$^c$after purification;
$^d$VT-aPP#64

The reactions at 60° C. with M/Hf ratio of ~750/1 and low TOA content (TOA/Hf=10/1) yielded, after 3 h, around 80% of monomer conversion into oligomers with Mn of 80,000 Da (DP 40, runs 85 and 86). The increase of TOA/Hf ratio to 20 and 50/1 led to similar molecular weight and marginal decrease of activity (runs 89 and 87). A conversion of 94% was obtained at 100° C., along with a small drop in Mn (71,000 Da, run 88). At this temperature, VT-aPP#26 was fully converted after 24 h into a material with Mn of 65,000 Da (runs 95 and 97). The reaction was in fact complete after 15 h, even for a M/Hf of 1,000/1, leading, as previously observed for the other VT-aPPs, to a higher Mn (72,000 Da; run 98). Similar activities and molecular weight were measured at 100° C. and 120° C. (compare runs 88 and 93).

Because of the high molecular weight of VT-aPP#64 by comparison with other monomers, run 99 used a lower M/Hf ratio to 500/1 and higher TOA/Hf ratio to 50/1 to reduce the chances of catalyst deactivation by potential protic impurities. Full conversion was achieved at 100° C. after 24 hours (94% after 15 hours). The Mn of the purified oligomer was 144,000 Da, corresponding to a DP of 23.

Unlike the lower Mn VT-aPPs, unreacted monomer (VT-aPP#26 and 64) and vinylidene-terminated species could not be separated from the product by the purification procedure described previously. As a consequence, size exclusion chromatography in THF showed some overlap of peaks, which could alter Mn determination and give narrow calculated MWDs. The results presented do not include a deconvolution process to circumvent this phenomenon.

6. Thermal analysis (DSC): The thermal transition temperatures of the purified oligomers derived from VT-aPP macromonomers of various length were determined by DSC at heating and cooling rates of 10° C.·min$^{-1}$ and are reported in Table 10.

TABLE 10

VT-aPP oligomerization in the presence of OMC: Tg values.

| | | VT-aPP | | Oligomacromer | | | |
|---|---|---|---|---|---|---|---|
| Run | # | Mn (Da) | DP ($C_3^-$) | Mn (Da) | MWD | DP (M) | Tg (° C.) |
| 59 | 1 | 125.2 | 2.98 | 22,000 | 1.91 | 176 | 18.0$^a$ |
| 90 | 1 | 125.2 | 2.98 | 14,020 | 2.74 | 112 | 16.2$^a$ |

TABLE 10-continued

VT-aPP oligomerization in the presence of OMC: Tg values.

| | | VT-aPP | | Oligomacromer | | | |
|---|---|---|---|---|---|---|---|
| Run | # | Mn (Da) | DP ($C_3^-$) | Mn (Da) | MWD | DP (M) | Tg (° C.) |
| 73 | 1 | 125.2 | 2.98 | 11,110 | 3.26 | 61 | −9.2$^a$ |
| 75 | 2 | 182.8 | 4.35 | 11,770 | 3.12 | 64 | −5.4$^a$ |
| 82 | 2 | 182.8 | 4.35 | 16,650 | 2.33 | 91 | 1.1$^a$ |
| 72 | 3 | 240.7 | 5.72 | 8,260 | 3.69 | 34 | −15.6 |
| 83 | 3 | 240.7 | 5.72 | 14,000 | 2.30 | 58 | −20.3 |
| 55 | 3 | 240.7 | 5.72 | 10,860 | 2.52 | 40 | −18.2 |
| 61 | 4 | 271.4 | 6.45 | 11,110 | 2.55 | 41 | −17.5 |
| 68 | 4 | 271.4 | 6.45 | 18,130 | 1.94 | 67 | −18.9 |
| 37 | 5 | 312.8 | 7.43 | 11,970 | 2.48 | 38 | −21.3 |
| 19 | 6 | 363.6 | 8.64 | 12,090 | 2.27 | 33 | −21.0 |
| 95 | 26 | 1983 | 47.1 | 65,430 | 1.49 | 33 | −7.2 |
| 97 | 26 | 1983 | 47.1 | 64,880 | 1.49 | 33 | −6.8 |
| 99 | 64 | 6393 | 151.9 | 143,970 | 1.27$^e$ | 23$^e$ | −9.4 |

Table Notes:
$^a$weak transition;
$^e$on purified material

For the series VT-aPP#1-6 of macromonomers with Mn from 125 to 343 Da, as a general trend, an increase in propylene monomer chain length resulted in a product with lower Tg, from 18° C. with 1 (run 59) to −21° C. with 6 (run 19). Monomers of higher molecular weight from DP 3 (Mn=241 Da) to DP 6 led to oligomers of Tg's within the same range, from −15° C. (run 72) to −21° C. (runs 37 and 19), close to the values given for atactic polypropylene (~−20° C.). A significant increase in Tg was measured for VT-aPP of shorter chain length. Thus, in addition to oligo-VT-aPP#1 with Tg's above 15° C. already mentioned (runs 59 and 90), oligo-VT-aPP#2 (Mn 183 Da) gave materials with Tg's between −9° C. (run 73) and 1° C. (run 82). The origin of the large difference between the latter two Tg's could be due to the difference in DP, 61 and 91, respectively. VT-aPP#64, with much higher macromonomer Mn value (6,390 Da) gave an oligomer with Tg of −9° C., close to the Tg of the macromonomer (−10° C.). The Tg values of the oligomers produced from the VT-aPP#26 (Mn 1980 Da, Tg −21.5° C.) were in the range of −7±0.2° C. (runs 95 and 97). The oligomacromers were all viscous oils or sticky waxes, with Tg between −21° C. and 18° C. With the notable exceptions of oligomacromers made from high molecular weight monomers VT-aPP#26 and VT-aPP#64, an increase of monomer chain length led to a decrease in the oligomacromer Tg.

7. Rheological measurements: Oligomacromers were prepared using approximately 5 g of the macromonomers VT-aPP#2, VT-aPP#3 and VT-aPP#6 to obtain sufficient material to perform shear rheological measurements. Rheology was evaluated on a rotational rheometer, ARG2 (TA Instruments), using a parallel plate geometry of 40 mm diameter, with a gap of 400 μm. The viscosity was determined for shear rates over the range 0.05 to 100 s$^{-1}$, at temperatures from 25° C. to 100° C. The results, summarized in Table 11, were extracted from the viscosity curves of FIGS. 2a, 2b, and 2c.

TABLE 11

Viscosity measurements as a function of temperature.

| | VT-aPP | | Oligomacromer | | | | Rheology | |
|---|---|---|---|---|---|---|---|---|
| Run | # | Mn (Da) | DP ($C_3^-$) | Mn (Da) | MWD | DP (M) | Tg (° C.) | T (° C.) | Viscosity at 0 shear (Pa·s) |
| 83 | 3 | 240.7 | 5.72 | 14,000 | 2.30 | 58 | −20.3 | 35 | 2848 |
| | | | | | | | | 50 | 581 |
| | | | | | | | | 75 | 70 |
| 97 | 26 | 1980 | 47.1 | 64,880 | 1.49 | 33 | −6.8 | 25 | 22,000 |
| | | | | | | | | 50 | 567 |
| | | | | | | | | 75 | 43 |
| | | | | | | | | 100 | 9 |
| | | | | | | | | 35 | 4035 |
| | | | | | | | | 100 | 10 |
| 82 | 2 | 183 | 4.35 | 16,650 | 2.33 | 91 | 1.1$^a$ | 75 | |
| | | | | | | | | 75 | |
| | | | | | | | | 100 | |
| | | | | | | | | 100 | |

Table Notes:
$^a$weak transition

Figure 2A:
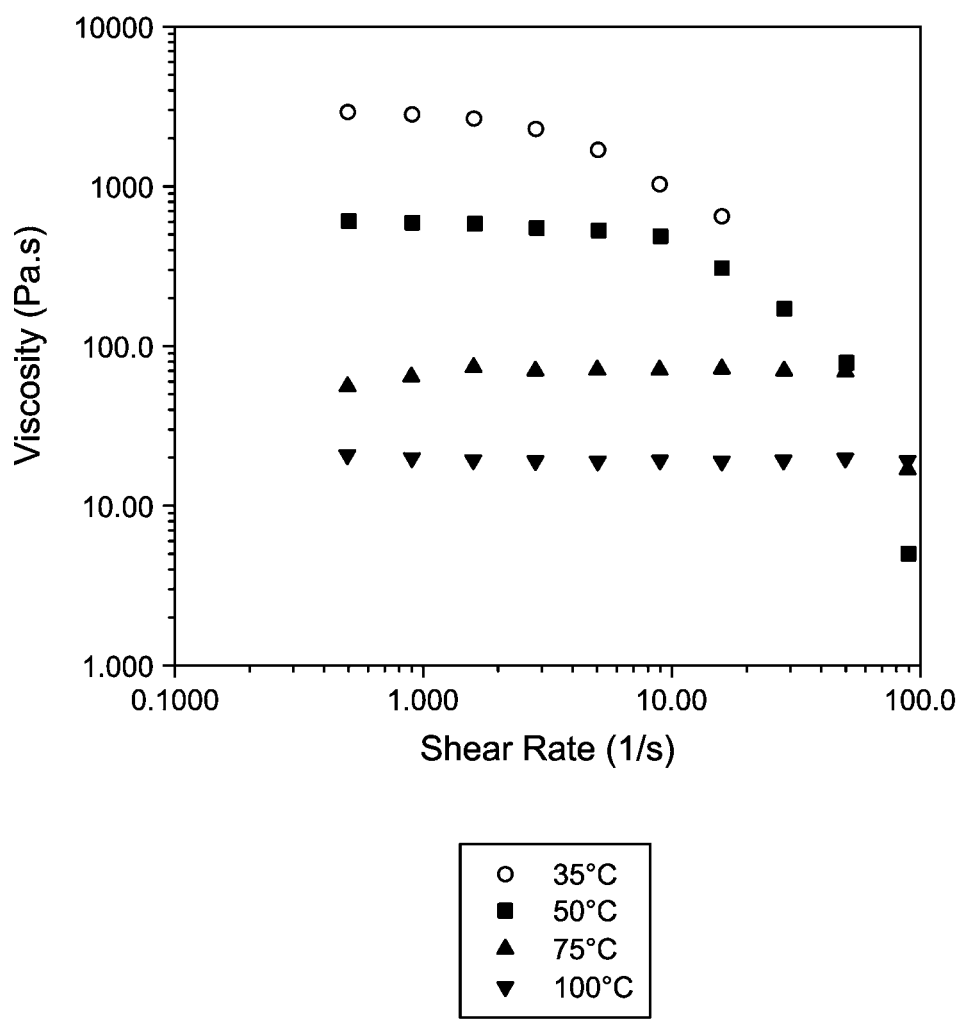
FIG. 2a is a graph of viscosity as a function of shear rate at various temperatures for a oligomacromonomer according to an embodiment (run 83).
Figure 2B:
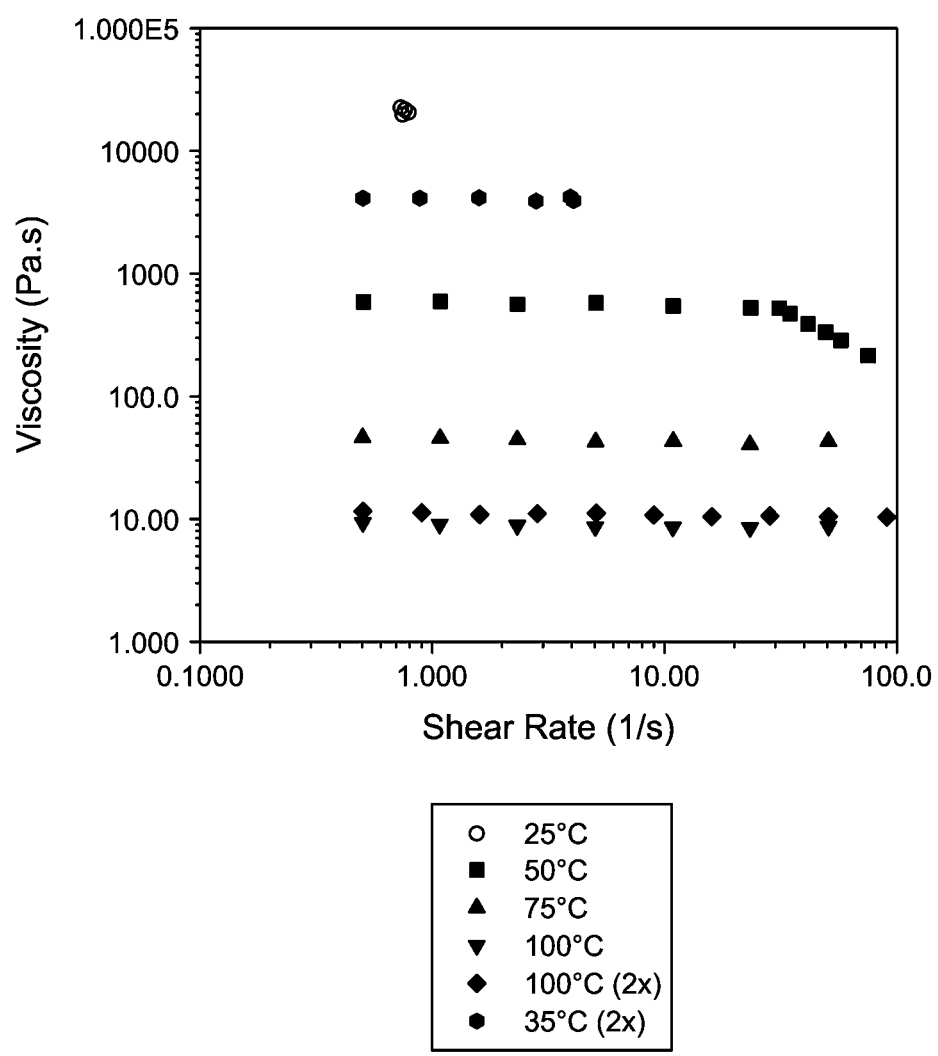
FIG. 2b is a graph of viscosity as a function of shear rate at various temperatures for a oligomacromonomer according to an embodiment (run 97).

Polymers 83 and 97 presented both zero shear rate viscosities of the same order of magnitude, which strongly decreased from 2,800 and 4,000 Pa·s at 35° C. to 17 and 10 Pa·s at 100° C., respectively (FIGS. 2a and 2b). A transition from the Newtonian plateau (for which the viscosity is independent of the shear rate) to a shear thinning regime (decrease of viscosity viscosity with increase of shear rate) were observed at temperatures below 100° C.; below 75° C. for run 83; and 50° C. for run 97, the Newtonian zone of the latter material being slightly broader. Sample 82 showed strong shear thinning and even at 100° C., no evident Newtonian plateau appeared at low shear rate (FIG. 2c).

8. Determination of $M_n$ and DP by $^1$H NMR $M_n$s and DPs were determined from the $^1$H NMR spectrum (in CDCl$_3$) of several purified products, assuming full conversion into vinylidene-terminated oligomers. The values, calculated from the vinylidene and aliphatic protons are listed in Table 12, and compared to the results obtained from SEC in THF. The table shows that $M_n$ and DP determined by NMR are generally much higher than those determined by SEC, in other words that the intensity of the vinylidene signals was lower than expected. The presence of Al-oligomeryl species, even after full monomer conversion, could be responsible of the lower values obtained by NMR, particularly when the number of chains generated by hafnium site is small. Indeed, $M_n$s with similar values were determined by SEC and NMR for high M/Hf, low TOA content and the higher number of chains/Hf (run 68). However, these Al-oligomeryl species will only contribute to a limited extent, as TOA has not been a very effective chain transfer agent for our system. The addition of D$_2$O to a complete reaction followed by $^2$D NMR could reveal the presence of such species.

TABLE 12

VT-aPP polymerization in the presence of OMC: $M_n$ and DP by $^1$H NMR.

| Run | VT-aPP (eq./Hf) | Vinyl (eq./Hf) | BF$_{20}$ eq./Hf | T (° C.) | Time (h) | Conv.$^a$ % | Mn$^a$ | DP$^a$ |
|---|---|---|---|---|---|---|---|---|
| 33$^b$ | 5 1,000 980 | TOA 1000 240 | 1.6 | 60 60 | 5 5 | 73 | 25,490 | 82 |

TABLE 12-continued

VT-aPP polymerization in the presence of OMC: $M_n$ and DP by $^1$H NMR.

| Run | VT-aPP (eq./Hf) | Vinyl (eq./Hf) | BF$_{20}$ eq./Hf | T (° C.) | Time (h) | Conv.$^a$ % | Mn$^a$ | DP$^a$ |
|---|---|---|---|---|---|---|---|---|
| 68 | 4 5,000 | TOA 10 | 1.4 | 80 | 24 | 100 | 19,780 | 73 |
| 69 | 4 980 | TOA 100 | 1.4 | 180 | 2 | 99 | 17,510 | 65 |
| 72 | 3 1,010 | TOA 10 | 1.4 | 60 | 3 | 100 | 16,640 | 69 |
| 73 | 2 1,770 | TOA 18 | 1.4 | 60 | 3 | 100 | 19,470 | 107 |

TABLE 12-continued

VT-aPP polymerization in the presence of OMC: $M_n$ and DP by $^1$H NMR.

| Run | VT-aPP (eq./Hf) | Vinyl (eq./Hf) | BF$_{20}$ eq./Hf | T (° C.) | Time (h) | Conv.$^a$ % | Mn$^a$ | DP$^a$ |
|---|---|---|---|---|---|---|---|---|
| 75 | 2 1,000 | TOA 10 | 1.4 | 60 | 3 | 98 | 19,280 | 106 |

Reaction conditions: Hf: 1 µmol; cocatalyst = [Trityl][BF$_{20}$]; s = toluene (volume reaction mixture: 2.5 mL);
$^a$determined by $^1$H NMR;
$^b$two successive monomer additions.

Another possible reason for such a drift in molecular weight is that the conventional calibration used so far for molecular weight determination by SEC, and based on refractive index measurements, is not appropriate for our materials.

9. Triple SEC

Sample 33 displayed a very poor to no signal for light scattering (LS), probably due to its low molecular weight. Since the LS signal could not be used, molecular weight determinations were performed by conventional (Refractive index (RI) only) and universal calibration (RI+VIS) methods. The results, presented in Table 13, reveal significant differences between the two methods, especially for Mn and MWD. In addition, the Mn values obtained via the conventional method were higher than the one previously determined (9,990 Da, see Table 7), for comparable Mw values (24,850 Da).

TABLE 13

Triple SEC results obtained for Run 33 in THF.

| Sample # | Mn Da | Mw Da | Mz Da | MWD |
|---|---|---|---|---|
| | Conventional* | | | |
| 33-1-01 | 12,240 | 25,890 | 44,674 | 2.12 |
| 33-1-02 | 13,200 | 27,180 | 47,360 | 1.98 |
| 33-2-01 | 13,420 | 26,560 | 44,710 | 1.98 |
| 33-2-02 | Very poor RI signal | | | |
| | Universal* | | | |
| 33-1-01 | 20,020 | 32,980 | 49,250 | 1.65 |
| 33-1-02 | 22,170 | 36,700 | 56,880 | 1.66 |
| 33-2-01 | 21,880 | 34,980 | 52,300 | 1.60 |
| 33-2-02 | Very poor RI signal | | | |

*Values relative to PS standards.

Triple SEC measurements were also performed on run 68 (Table 6). The results are presented in Table 14. They reveal higher Mn values and lower MWD values using triple SEC or universal calibration compared to the conventional method. Some differences in Mn values and MWD values were also observed for the three samples prepared from 68, while Mws were less subjected to variations. As Mw values seemed more reliable, we could take them into consideration rather the Mn. However, in order to get more reproducible measurements, further analyses will be performed on larger amounts of material and oligomers of higher molecular weight.

TABLE 14

Triple SEC results obtained with Run 68 in THF.

| Run | Mn Da | Mw Da | Mz Da | MWD |
|---|---|---|---|---|
| | Conventional | | | |
| 68-1 | 19,340 | 46,600 | 83,210 | 2.41 |
| 68-2 | 21,890 | 47,060 | 79,600 | 2.15 |
| 68-3 | 17,830 | 43,630 | 80,480 | 2.45 |
| Sample # | Universal* | | | |
| 68-1 | 25,200 | 42,740 | 65,160 | 1.70 |
| 68-2 | 30,550 | 47,700 | 69,120 | 1.56 |
| 68-3 | 27,400 | 46,840 | 73,590 | 1.71 |
| Sample # | Triple SEC* | | | |
| 68-1 | 29,290 | 42,770 | 74,360 | 1.46 |
| 68-2 | 25,040 | 42,800 | 75,790 | 1.71 |
| 68-3 | 21,890 | 40,070 | 75,420 | 1.83 |

*values relative to PS standards.

VT-aPP Homooligomers—Catalyst Deactivation at Low Hafnium Content

1. Temperature. As described above, lowering the amount of Hf to 0.2 µmol, by comparison with "standard" conditions (1.0 µmol Hf for 1.0 mmol VT-aPP and 10.0 µmol TOA as the scavenger) resulted in monomer conversion far from complete, especially at 60° C., even after a reaction time as long as 24 h (Table 8). Thus, the evolution of an oligomerization, performed in the presence of 0.2 µmol of hafnium, keeping the same VT-aPP and TOA content as mentioned above, was investigated at 60° C. and 120° C. The results related to VT-aPP#2 ($M_n$: 182.8 Da; 95.73% vinyl) are presented in Table 15.

TABLE 15

VT-aPP#2 oligomerization catalyzed by OMC and TOA at 60° C. and 120° C.

| Run | VT-aPP eq./Hf | TOA eq./Hf | BF20$^a$ eq./Hf | T ° C. | t h | Conv.$^b$ vinyl (%) | Activity kg/mol/h | DP |
|---|---|---|---|---|---|---|---|---|
| 113 | 5,000 | 50 | 1.3 | 60 | 0.5 | 8 | 150 | 87 |
| 114 | 4,990 | 50 | 1.3 | 60 | 1 | 13 | 120 | 89 |
| 115 | 5,020 | 50 | 1.3 | 60 | 2 | 24 | 109 | 99 |
| 116 | 5,020 | 50 | 1.3 | 60 | 4 | 32 | 73 | 86 |
| 112 | 5,100 | 50 | 1.3 | 60 | 6 | 44 | 69 | 95 |
| 111 | 5,040 | 50 | 1.3 | 60 | 8 | 49 | 56 | 99 |
| 110 | 5,070 | 50 | 1.3 | 120 | 0.25 | 85 | 2,132 | 68 |
| 109 | 5,040 | 50 | 1.3 | 120 | 0.5 | 96 | 1,762 | 66 |
| 108 | 5,010 | 50 | 1.3 | 120 | 1 | 98 | 898 | 77 |
| 107 | 5,060 | 50 | 1.3 | 120 | 2 | >99 | 460 | 66 |
| 106 | 5,020 | 50 | 1.3 | 120 | 4 | 100 | 229 | 75 |

Reaction conditions: Hf = 0.2 µmol; s = toluene (volume reaction mixture: 2.5 mL);
$^a$cocatalyst = [CPh$_3$]$^+$[BF$_{20}$]$^-$;
$^b$determined by $^1$H NMR.

At 60° C., a conversion of 49% was determined after 8 h (run 111). This value may not correspond to the maximum oligomerization, in the light of 44% obtained after 6 h (run 112), a catalyst deactivation could be predicted before full conversion. At 120° C., the reaction occurred much faster and 96% of VT-aPP was oligomerized within 30 minutes (run 109). Thus, oligomerizations may be carried out at 120° C., especially in the presence of low amounts of catalyst, to reach high monomer conversion in short time. As observed earlier, a drop in molecular weight was measured with increasing the reaction temperature. Thus, oligomers with Mn of 16,000-18,000 Da were produced at 60° C. and Mn of 12,000-14,000 Da at 120° C.

2. Hydrogen as reactivator and CTA. Oligomerization reactions were performed in the presence of hydrogen to determine whether the latter could reactivate a deactivated catalyst resulting from 2,1-insertion and to evaluate its potential as CTA. Initially, a low catalyst loading (0.2 μmol) and a high monomer/Hf ratio were investigated for catalyst deactivation. To reach significant conversions, the oligomerizations were performed at 120° C. Then, similar reactions were conducted under hydrogen pressure, either by addition of $H_2$ prior to the oligomerization or after the deactivation had taken place. VT-aPP#1 was used as the monomer. The results are displayed in Table 16.

In a previous experiment with VT-aPP#3, a rapid catalyst deactivation for M/Hf ratio of 20,000/1 led to a constant conversion slightly below 60% after 4 h (see run 101, Table 8). Under similar conditions, only 8% of VT-aPP#1 remained unreacted from 4 h. No further conversion took place afterwards (runs 136-1 and -2). No reactivation occurred after bubbling of $H_2$ through the reaction mixture during 4 minutes at 23° C. (run 136-3), and no significant increase of conversion was observed after 4 more hours at 120° C. (136-4). An increase of the ratio M/Hf to 30,000/1 did not lead to any major drop in conversion by comparison with the 20,000/1 run, and only 10% of the macromonomer was not oligomerized after 8 h (run 152-4). The presence of hydrogen limited the presence of dormant sites, as shown by the total the monomer oligomerization under 10 bar of hydrogen after 10 h (run 150). Dormant sites can also be reactivated by hydrogen. Indeed, a reaction mixture close to the deactivated state (88% of conversion, after 4 h, run 151-1) placed under 10 bar of hydrogen yielded full oligomerization (run 151-2).

TABLE 16-continued

VT-aPP#1 oligomerization in the presence of OMC, TOA and H2.

| Run | Vinyl (eq./Hf) | Scav. (eq./Hf) | $H_2$ | $BF_{20}{}^a$ (eq./Hf) | T (° C.) | Time (h) | Conv.[b] vinyl (%) | DP |
|---|---|---|---|---|---|---|---|---|
| 150 | 29,990 | TOA 50 | 10 bar | 1.3 | 120 | 4 | 100 | 50 50 |
| 151-1 -2 | 29,840 | TOA 50 | — 10 bar | 1.3 | 120 | 4 2 | 88 100 | 171 137 167 |

Reaction conditions: Hf = 0.2 μmol, s = toluene (volume reaction mixture: 2.5 mL);
[a]cocatalyst = [CPh₃]⁺[BF₂₀]⁻;
[b]determined by ¹H NMR;
[d]on crude material;
[e]on purified material Hydrogen also proved to be a chain transfer agent, as indicated by the lower molecular molecular weights measured for runs 150 and 151-2 (6,000 and 17,000 Da, respectively), by comparison with the experiments performed without hydrogen (21,000 Da). This drop in molecular weight was accompanied by an increase of molecular weight distribution, in agreement non-reversible chain transfer. The hydrogen pressure and application time can be adjusted to find the appropriate conditions for high monomer conversion and desired molecular weight.

Investigations on Chain Transfer

1. TOA/$ZnEt_2$ mixture and TMA. As shown in Table 1, little oligomerization activity was observed at 25° C. when 50 equivalent of $ZnEt_2$ with respect to Hf were used as scavenger/chain transfer agent (runs 17 and 21). This was rather surprising since $ZnEt_2$ is generally a suitable chain transfer agent for group 4 metal catalysts. Possibly, the scavenging ability of $ZnEt_2$ is not sufficient to remove the impurities in the macromonomer. Alternatively, it might be possible that $ZnEt_2$ forms stable ato-complexes with the hafnium species, deactivating the system. Then, the combination of a hafnium catalyst with $ZnEt_2/AlR_3$ as CTA/scavenger was explored.

TABLE 17

VT-aPP #5 oligomerization in the presence of OMC and Et₂Zn or TMA.

| Exp # | M/ eq./Hf | Scav. eq./Hf | Cocat. eq./Hf | T ° C. | t h | Conv.[a] vinyl (%) | Activity kg/mol/h | DP |
|---|---|---|---|---|---|---|---|---|
| 28 | 930 | TOA 940 | [CPh₃][BF₂₀] 1.6 | 60 | 5 | 96 | 56 | 28 |
| 29 | 1000 | TOA/ZnEt₂ 1,000/125 | [CPh₃][BF₂₀] 1.6 | 60 | 5 | 100 | 62 | 6 |
| 30 | 960 | TMA 95 | [CPh₃][BF₂₀] 1.6 | 60 | 5 | 100 | 60 | 8 |
| 31 | 1020 | TMA 515 | [CPh₃][BF₂₀] 1.6 | 60 | 5 | 96 | 61 | 6 |

Reaction conditions: Hf: 1 μmol; s = toluene (volume reaction mixture: 2.5 mL);
[a]determined by ¹H NMR

TABLE 16

VT-aPP#1 oligomerization in the presence of OMC, TOA and H2.

| Run | Vinyl (eq./Hf) | Scav. (eq./Hf) | $H_2$ | $BF_{20}{}^a$ (eq./Hf) | T (° C.) | Time (h) | Conv.[b] vinyl (%) | DP |
|---|---|---|---|---|---|---|---|---|
| 136-1 | 19,540 | TOA 50 | — | 1.3 | 120 | 4 | 92 | 140 |
| -2 | | | | | | 16 | 92 | 167 |
| -3 | | | 4 min. | | | 16 | 92 | 140 |
| -4 | | | — | | | 20 | 93 | 135 |
| 152-1 | 29,790 | TOA 50 | — | 1.3 | 120 | 2 | 86 | 171 |
| -2 | | | | | | 4 | 89 | 187 |
| -3 | | | | | | 6 | 90 | 171 |
| -4 | | | | | | 8 | 90 | 167 |

When pretreated with a TOA/$ZnEt_2$/Hf mixture of 1,000/125/1, VT-aPP#5 was fully converted into an oligomer with Mn of 1,830 Da and MWD of 1.27. The low molecular weight and low MWD suggest a fast and reversible oligomeryl group exchange between Zn and Hf (and Al) compared to chain growth propagation (Table 17, run 29). For these bulky oligomers it is not naturally that the chain transfer is reversible. It is therefore interesting to further study the reversibility of the chain transfer, e.g., by adding a second batch of monomer after 100% conversion of the first batch. At 60° C., TMA proved to be an efficient chain transfer agent as well, as is shown by the resulting polymers of low Mn (2,470 and 1,710 Da) and molecular weight distribution (1.56 and 1.34) obtained with TMA/Hf ratios of 95/1 and 515/1, respectively (runs 30 and 31). The somewhat higher MWD suggests that the chain transfer process is non-reversible and/or less efficient than in the case of $ZnEt_2$.

2. Addition of low amounts of $ZnEt_2$ and TMA as CTA: a. T=60° C. The CTA/Hf ratio was reduced to prepare oligomers of higher molecular weight but still with low MWD. The results relative to the oligomerization of VT-aPP#4 ($M_a$: 271.4 Da) in the presence of 10 and 50 eq./Hf of CTA are shown in Table 18.

After pretreatment of VT-aPP#4 with a TOA/$ZnEt_2$ 10/10 mol/mol (with respect to Hf) mixture, the addition of the hafnium catalyst allowed full conversion of 1000 eq. of the monomer at 60° C. within 2 h into oligomers with Mn of 9.300 Da and MWD of 1.84 (run 78), which is lower than the values obtained without $ZnEt_2$ (11,100 Da and 2.10, run 61). This suggests, as previously mentioned, a fast oligomeryl group exchange between Zn and Hf (and Al) compared to chain growth propagation, even at such a low $ZnEt_2$ concentration. The effect was even more pronounced when the ratio Zn/Hf was increased to 50/1, resulting into oligo(VT-aPP#4) with an Mn of 3,900 Da and (run 81). Upon addition of 10 eq./Hf, TMA proved to be an efficient CTA as well, as shown by the resulting material of low Mn (5,200 Da, run 79). An oligo(VT-aPP#4) product of similar properties reported for run 81 was obtained from TMA/Hf of 50/1 (run 80).

TABLE 18

VT-aPP#4 oligomerization with OMC and $Et_2Zn$ and TMA as CTA.

| Exp. # | Vinyl eq./Hf | Scav. eq./Hf | CTA eq./Hf | BF20[a] eq./Hf | T °C. | t h | Conv.[b] vinyl (%) | Activity kg/mol/h | Mnb Da | MWD[b] | DP |
|---|---|---|---|---|---|---|---|---|---|---|---|
| 61 | 1,010 | TOA 10 | — | 1.4 | 60 | 2 | 100 | 137 | 11,110 | 2.55 | 41 |
| 78 | 1,000 | TOA 10 | $ZnEt_2$ 10 | 1.2 | 60 | 2 | 100 | 135 | 9,290 | 1.84 | 34 |
| 81 | 1,000 | TOA 10 | $ZnEt_2$ 50 | 1.2 | 60 | 2 | 100 | 136 | 3,890 | 1.74 | 14 |
| 79 | 1,020 | TMA | TMA 10 | 1.2 | 60 | 2 | 100 | 136 | 5,210 | 2.09 | 19 |
| 80 | 1,000 | TMA | TMA 50 | 1.2 | 60 | 2 | >99.5 | 135 | 3,020 | 1.65 | 11 |

Reaction conditions: Hf = 1 µmol; s = toluene (volume reaction mixture: 2.5 mL);
[a]cocatalyst = [$CPh_3$][$BF_{20}$];
[b]determined by $^1H$ NMR b. T>60° C. similar experiments were carried at 80° C. and 100° C., using the macromonomer VT-aPP#179 (Vinyl: 91%, $M_a$: 540 Da) and ratios CTA/Hf of 10/1 and 50/1, to develop systems with high catalytic activity. The results are summarized in Table 19.

When pretreated with TOA (or TMA) as scavenger, VT-aPP#179 was totally oligomerized within 2 h with 1 eq. of catalyst per 1,000 eq. of monomer, with or without CTA, at 80° C. and 100° C. As already noticed, the addition of CTA resulted in a drop of molecular weight, suggesting a rather fast oligomeryl group exchange between Zn (and Al) compared to chain growth propagation, reaching 13,000 Da with CTA/Hf ratio of 10/1 and 6,000 Da for 50/1, independently of the temperature and the CTA. The molecular weight distribution did not vary significantly upon CTA addition: from 1.8-1.9 without CTA (runs 121-122) to 1.9-2.0 with $Et_2Zn$ (runs 117-120) and 1.6-1.7 with TMA (runs 123-126).

TABLE 19

VT-aPP#179 oligomerization with OMC and ZnEt2 and TMA as CTA.

| Exp. # | Vinyl eq./Hf | Scav. eq./Hf | CTA eq./Hf | BF20a eq./Hf | T °C. | t h | Conv.[b] vinyl (%) | DP | Chains/ Hf |
|---|---|---|---|---|---|---|---|---|---|
| 122 | 1,000 | TOA 10 | — | 1.2 | 80 | 2 | 100 | 48 | 21 |
| 121 | 1,000 | TOA 10 | — | 1.2 | 100 | 2 | 100 | 40 | 25 |
| 118 | 1,010 | TOA 10 | $Et_2Zn$ 10 | 1.2 | 80 | 2 | 100 | 24 | 42 |
| 120 | 1,000 | TOA 10 | $Et_2Zn$ 50 | 1.2 | 80 | 2 | 100 | 11 | 95 |
| 117 | 1,000 | TOA 10 | $Et_2Zn$ 10 | 1.2 | 100 | 2 | 100 | 23 | 43 |
| 119 | 1,010 | TOA 10 | $Et_2Zn$ 50 | 1.2 | 100 | 2 | 100 | 10 | 97 |

TABLE 19-continued

VT-aPP#179 oligomerization with OMC and ZnEt2 and TMA as CTA.

| Exp. # | Vinyl eq./Hf | Scav. eq./Hf | CTA eq./Hf | BF20a eq./Hf | T °C. | t h | Conv.[b] vinyl (%) | DP | Chains/ Hf |
|---|---|---|---|---|---|---|---|---|---|
| 124 | 1,000 | TMA | TMA 10 | 1.2 | 80 | 2 | 100 | 25 | 39 |
| 126 | 1,000 | TMA | TMA 50 | 1.2 | 80 | 2 | 100 | 11 | 90 |
| 123 | 1,000 | TMA | TMA 10 | 1.2 | 100 | 2 | 100 | 24 | 42 |
| 125 | 1,000 | TMA | TMA 50 | 1.2 | 100 | 2 | 100 | 10 | 97 |

Reaction conditions: Hf = 1 μmol; s = toluene (volume reaction mixture: 2.5 mL);
[a]cocatalyst = [CPh$_3$][BF$_{20}$];
[b]determined by $^1$H NMR 3. Sequential addition of VT-aPP (with and without additional catalyst) with CTA. Sequential addition of VT-aPP#179, under the conditions described for run 119 in Table 16 (M/TOA/CTA/Hf=1,000/10/50/1), using ZnEt$_2$ as CTA, was performed to investigate the reversibility of the chain transfer. The results are displayed in Table 20.

TABLE 20

VT-aPP #179 oligomerization in the presence of OMC and ZnEt$_2$ as CTA.

| Exp. # | Vinyl eq./Hf | TOA eq./Hf | ZnEt$_2$ eq./Hf | BF20[a] eq./Hf | T °C. | t h | Conv.[b] vinyl (%) | DP |
|---|---|---|---|---|---|---|---|---|
| 144-1-2 | 1,000 | 10 | 50 | 1.3 | 100 | 2 | 100 | 11 |
|  | 1,000 | 10 | 0 |  |  | 2 | 41[c] | 11 |
| 145-1-2 | 1,000 | 10 | 50 | 1.3 | 100 | 2 | 100 | 13 |
|  | 1,000 | 10 | 0 |  |  | 2 | 100[e] | 18 |

Reaction conditions: Hf = 1 μmol; s = toluene (volume reaction mixture: 2.5 mL);
[a]cocatalyst = [CPh$_3$]$^+$[BF$_{20}$]$^-$;
[b]determined by $^1$H NMR;
[c]conversion of second batch;
[e]from SEC on from crude material During this process, a first batch of macromonomer was first totally oligomerized within two hours (run 144-1), yielding a product with Mn of 6,200 Da. A second fraction of VT-aPP#179, pre-dried on TOA, was then added and allowed to react for two more hours. The conversion of this second batch was limited to 41%, probably due to partial catalyst deactivation (run 144-2). The SEC trace revealed a broad molecular weight distribution (3.4), with an average Mn value of 5,800 Da, corresponding to a bimodal distribution, with peak overlapping and including a fraction of Mn between 10 and 11,000 Da. This oligomer of high molecular weight could be either issued from reversible chain transfer, or from a ratio monomer/Hf involved in catalysis above 1,000/1, due to partial catalyst deactivation (we demonstrated earlier that an increase of monomer/Hf ratio led to an increase in molecular weight).

To circumvent catalyst deactivation, an experiment similar to run 144 was carried out, with additional catalyst introduced just after addition of the second set of monomer (run 145). VT-aPP was then completely oligomerized and the SEC analysis of the product (145-2) presented an increase of Mn to 9,800 Da, by comparison with 6,800 Da determined for 145-1 (first monomer batch). Such observation could be in agreement with reversible chain transfer, or could also result from a reaction mixture depleted from active zinc species and explain the raise in molecular weight distribution, from 1.8 to 2.4.

4. VT-aPP/4-methyl-1-pentene cooligomers. Finally 4-methyl-1-pentene (4M1P), bearing a similar polymerizable group as the macromonomers used so far as comonomer, due to the poor solubility in THF of the corresponding homooligomer. The cooligomerization experiments were carried out under conditions previously described to reach complete conversion, using TOA as CTA and 4M1P/VT-aPP mol/mol ratio of 4/1, corresponding to 1/1.7 weight/weight ratio (T=100° C.; 4M1P/VT-aPP/ZnEt$_2$/TOA/Hf=1,000/50/10/1), as indicated in Table 18. During the monomer sequential addition, an extra portion catalyst was introduced as well. The resulting oligomers were purified by 'precipitation' in acid methanol followed by washing with methanol and drying in vacuo.

Under the applied conditions, full conversion of the (co)monomers was reached in all cases. Oligo-4M1P was isolated as a solid (run 146), while oligo-aPP (run 119) and the random cooligomers as viscous oils (runs 147 and 153).

TABLE 21

VT-aPP/4M1P (co)oligomerization with OMC and ZnEt2 as CTA.

| Exp. # | VT-aPP eq./Hf | 4M1P Eq. Hf | Scav. eq./Hf | Et$_2$Zn eq./Hf | BF20[a] eq./Hf | T °C. | t h | Conv.[b] vinyl (%) | Tge °C. |
|---|---|---|---|---|---|---|---|---|---|
| 122 | 1,000 | — | TOA 10 | — | 1.2 | 80 | 2 | 100 | −21.1 |
| 119 | 1,010 | — | TOA 10 | 50 | 1.2 | 100 | 2 | 100 | −23.3 |
| 146 | — | 4,070 | TOA 10 | 50 | 1.3 | 100 | 2 | 100 | — |
| 147 | 990 | 4,050 | TOA 10 | 50 | 1.3 | 100 | 4 | 100 | −9.2 |
| 153 | 1,000 | 4,020 | TOA 10 | 50 | 1.3 | 100 | 4 | 100 | −9.3 |

TABLE 21-continued

VT-aPP/4M1P (co)oligomerization with OMC and ZnEt2 as CTA.

| Exp. # | VT-aPP eq./Hf | 4M1P Eq. Hf | Scav. eq./Hf | Et$_2$Zn eq./Hf | BF20$^a$ eq./Hf | T °C. | t h | Conv.$^b$ vinyl (%) | Tg$^e$ °C. |
|---|---|---|---|---|---|---|---|---|---|
| 149f | 1) 1,000 | 2) 3,790 | TOA 10 + 10 | — | 1.3 | 100 | 2 + 4 | 100 | −15.8 |
| Filt. | | | | | | | | | −16.3 |
| Prec. | | | | | | | | | — |
| 154f | 1) 990 | 2) 4,000 | TOA 10 + 10 | 50 | 1.3 | 100 | 2 + 4 | 100 | −17.4 |
| Filt. | | | | | | | | | −18.0 |
| Prec. | | | | | | | | | — |

Reaction conditions: Hf = 1 μmol; s = toluene (volume reaction mixture: 2.5 mL);
$^a$cocatalyst = [CPh$_3$][BF$_{20}$];
$^b$determined by $^1$H NMR;
$^d$from HT-SEC in TCB (standards: PE);
$^e$from −80° C. to 150° C.; heating/cooling rate: 10° C./min.; value from second heating;
$^f$sequential addition of monomer Sequential monomer addition resulted into sticky solids (runs 149, performed without ZnEt$_2$, and 154), partially soluble in THF. A solid was separated by filtration after addition of THF and the filtrate gave a viscous oil after evaporation of the volatiles. SEC traces (THF) of showed similar Mn's and mwds for the products issued from the runs 149 and 154 and the filtrates (149F and 154F) obtained after THF treatment. The molecular weight of the precipitates 149P and 154P as well as oligo(4M1P) 146, insoluble in THF, were determined by HT-SEC in TCB (PE standards). Interestingly, 149P (no ZnEt$_2$), 154P (with 50 eq. of ZnEt$_2$ per Hf) presented M$_n$ of 5,300 and 4,600 Da, respectively, close to the value of oligo(4M1P) run 63 (4,900 Da; vide infra, Table 20), prepared without ZnEt$_2$, but much higher than run 146, synthesized using ZnEt$_2$. Thus, at the moment of the second comonomer comonomer addition, zinc species exist as polymeryl complexes which don't transfer any chain to hafnium. 149 and 154 presented one single glass transition temperature at −16° C. and −17° C., respectively, close to the values measured for 149F (−16° C.) and 154F (−18° C.). The corresponding precipitates, 149P and 154P, as well as the oligo (4M1P) 146, did not exhibit any thermal transition during the second heating. Melting temperatures, probably due to crystallization during the cooling down of the reaction mixture, were, however, noticed during the first heating at 108° C., 120° C., and 131° C. for 146 (the latter presented also a weak T$_g$ at 46° C.), 135° C. for 149P, and 131° C. (very weak) for 154P. In the light of those results, it appears that the introduction of ZnEt$_2$ during run 154 probably generated irreversible chain transfer from Hf to Zn, affording a mixture of homooligomers, similarly to run 149.

Heterooligomers: VT-aPP/4M1P Oligomerization Without CTA (VT-aPP#4 and VT-aPP#5)

1. VT-aPP/4M1P

A series of cooligomerization experiments of VT-aPP and 4M1P, with different VT-aPP/4M1P ratios were carried out under conditions to reach high conversion, based on results obtained previously (TOA/Hf=100/1; T=60° C., t=5 hours). Due to the relatively low molar mass of 4M1P, the M/Hf ratio was increased from 1,000/1 to 2000/1 for copolymerizations with high 4M1P content. Batch VT-aPP#5 was used for VT-aPP/M ratios of 1/3 or higher and batch VT-aPP#4 when the VT-aPP content was low. Table 22 is presenting the conversion, molecular weight, molecular weight distribution as well as some thermal properties obtained from various VT-aPP mixtures.

Under the applied conditions, full conversion of both comonomers was reached after 5 5 hours, even with M/Hf of 2000/1. Similar molecular weights, between 11,800 and 13,100 Da, were measured for samples resulting from VT-aPP/4M1P ratios from 1/0 to 1/9 (runs 37-40, 65). A rise in degree of polymerization was observed upon decrease of macromonomer content. Thus, a DP of 37 was determined for oligo(VT-aPP) (run 37) and 126 for the oligomer issued from the feed with VT-aPP/4M1P 75/25 (run 40). So far, the size exclusion chromatography (SEC) measurements were performed in THF, as all the oligomers obtained so far were oily/waxy materials soluble in that solvent. Due to the insolubility of the solid products resulting from mixtures with low VT-aPP content (e.g., 5 mol % in run 64), trichlorobenzene (TCB) was used as the eluent at high temperature (PE standards). The molecular weight and DP values obtained were lower than expected, in particular for oligomer 65, soluble in both solvents, for which SEC measurements gave an M$_n$ of 13,100 Da (DP: 126) in THF and 6,100 in TCB (DP: 59). This difference is dramatic.

TABLE 22

VT-aPP/4M1P copolymerization in the presence of OMC.

| | VT-aPP/4M1P | | TOA | Conv. | Activity | M$_n$ | | | | T$_g$ |
|---|---|---|---|---|---|---|---|---|---|---|
| Exp. # | eq./Hf | weight % | eq./Hf | %$^a$ | kg/mol/h | Da | | mwd | DP | °C. |
| 37$^e$ | 1,015/0 | 100/0 | 100 | 100 | 64 | | | | 40 | −26.6 |
| 39$^d$ | 750/290 | 92/8 | 100 | 100 | 52 | | | | 51 | −18.9 |
| 38$^d$ | 515/515 | 80/20 | 100 | 100 | 41 | | | | 62 | −17.1 |
| 40$^d$ | 250/810 | 54/46 | 110 | 100 | 30 | | | | 85 | −7.3 |
| 65$^e$ | 200/1,800 | 73/27 | 100 | 100 | 41 | 6,070$^c$ | 1.91$^e$ | 126 | 6.7 |

59

TABLE 22-continued

VT-aPP/4M1P copolymerization in the presence of OMC.

| Exp. # | VT-aPP/4M1P eq./Hf | VT-aPP/4M1P weight % | TOA eq./Hf | Conv. %[a] | Activity kg/mol/h | $M_n$ Da | mwd | DP | $T_g$ °C. |
|---|---|---|---|---|---|---|---|---|---|
| 64[e] | 100/2,000 | 15/85 | 100 | 100 | 39 | 4,520[c] | 2.37[c] | 48 | 14.2[f] |
| 63 | 0/2,070 | 0/100 | 100 | 100 | 35 | 4,850 | 2.31[c] | 57 | — |

Reaction conditions: Hf: 1 μmol; cocatalyst = [CPh₃][BF₂₀] (1.4 eq./Hf); s = toluene (volume reaction mixture: 2.5 mL); T: 60° C.; t: 5 h;
[a]determined by ¹H NMR;
[c]determined by SEC in trichlorobenzene at high temperature (relative to PE standards);
[d]VT-aPP#5;
[e]VT-aPP#4;
[f]weak signal 2. DSC Measurements The thermal transition temperatures of these cooligomers were determined by DSC at heating and cooling rates of 10° C./min⁻¹. As expected, an increase in $T_g$ with increasing 4M1P content was observed, starting from –27° C. for oligo (VT-aPP). All the samples were viscous oils or sticky waxes, except oligomer 64, whose second heating thermogram showed, in addition to a $T_g$ at 14° C., melting transitions at 175° C. and 187° C. A crystallization temperature ($T_c$) of 151° C. was determined from the cooling curve. $T_m$ and $T_c$ values of 228 and 209° C., respectively, were measured for oligo(4M1P) (run 63).

Other VTM oligomers
1. (Co-)Oligomerization of VT-iPP

OMC was also evaluated as oligomerization catalyst precursor of VT-iPP ($M_n$=2,100 Da by NMR (95% vinyls); $M_n$=2,210 Da and MWD=1.53 by HT-SEC at 160° C. in trichlorobenzene, TCB). Preliminary experiments were performed under conditions established according to previous investigations, in order to reach full monomer conversion. The poor solubility of VT-iPP in toluene at room temperature prompted us to add more than 10 eq. of scavenger per hafnium, as earlier employed with the liquid/oily VT-aPPs. In addition, the solvent volume was doubled and the reactions carried out at 100° C. or 120° C. Finally we chose to reduce the monomer/catalyst to 250/1. The initial results are presented in Table 24.

runs 138 and 139) while similar values were measured at 100° C. and 120° C. (135 vs. 139). The size exclusion chromatograms showed that all peaks of the oligomer and unreacted vinylidene-terminated-iPP present in the starting material overlap. The purification protocol, which consisted in precipitation in acidic methanol followed by filtration and washing with methanol, did not allow the removal of the unreacted fraction. Thus, the molecular weight values in Table 24 are related to $M_w$ and the MWDs must be read with caution. The molecular weights were first determined by SEC in THF (standards: polystyrene) from the crude material and then in TCB at 160° C. from the purified product (standards: polyethylene), as the latter were insoluble in THF. The results shown in Table 24 reveal significant differences between the two methods, and $M_w$s obtained from SEC in THF were nearly three times higher. The values calculated from HT-SEC with polystyrene standards (not reported in Table 24) were, however, closer to those determined from SEC in THF (e.g., for run 135 $M_w$=77,470 and 65,520 Da in THF and TCB, respectively).

The cooligomerization of 250 eq. of VT-iPP and 250 eq. per Hf of VT-aPP#26 ($M_n$=1,980 Da; 98.5% (NMR) and $M_n$=1,760 Da; MWD=2.03 by SEC in THF) in the presence of 50 eq. of TOA led to full conversion of both monomers within 4 hours, affording a product of higher $M_w$ than after

TABLE 23

VT-iPP # (co)-oligomerization with OMC and TOA as scavenger.

| Exp. # | VT-iPP eq./Hf | VT-aPP Eq. Hf | Scav. eq./Hf | $BF_{20}$[a] eq./Hf | T °C. | t h | Conv.[b] vinyl (%) | $M_w$[d] Da | MWD[d] |
|---|---|---|---|---|---|---|---|---|---|
| 135 | 240 | — | TOA 50 | 1.3 | 100 | 2 | 100 | 27,230 | 1.28 |
| 138 | 250 | — | TOA 75 | 1.3 | 120 | 2 | 100 | 24,420 | 1.31 |
| 139 | 250 | — | TOA 50 | 1.3 | 120 | 4 | 100 | 26,330 | 1.29 |
| 95 | — | 750 | TOA 10 | 1.3 | 100 | 24 | 100 | 37,320 | 1.38 |
| 142 | 250 | 250 | TOA 50 | 1.3 | 120 | 2 / 4 | 90 / 100 | 31,880 | 1.35 |

Reaction conditions: Hf = 1 μmol; s = toluene (volume reaction mixture: 4.5 mL);
[a]cocatalyst = [CPh₃][BF₂₀];
[b]determined by ¹H NMR;
[d]determined by HT-SEC in TCB (relative to PE standards) from purified material The complete conversion of VT-iPP was verified by ¹H NMR in $C_2D_2Cl_4$ in which the monomer is slightly soluble at ambient temperature. It appeared that VT-iPP could be fully oligomerized at 100° C. and 120° C. in the presence of 50 and 75 eq. of TOA per catalyst within 2 h. Using a higher TOA/Hf resulted in a slight decrease of molecular weight (compare homooligomerization, probably due to the higher monomer/catalyst ratio (run 142).

2. DSC Measurements

The thermal transition temperatures of these (co)oligomers were determined by DSC at heating and cooling rates of 10° C. min⁻¹ and are reported in Table 24.

TABLE 24

DSC results for materials obtained from VT-iPP (co)polymerization.

| Sample # | VT-iPP weight % | VT-aPP weight % | $M_w{}^a$ Da | $MWD^a$ | $T_g{}^b$ °C. | $T_m{}^b$ °C. | $T_c{}^c$ °C. | $\Delta H_f$ J g$^{-1}$ |
|---|---|---|---|---|---|---|---|---|
| VT-aPP#26 | — | 100 | 2,220 | 1.51 | −21.5 | — | — | — |
| VT-iPP | 100 | — | 3,160 | 1.53 | −32.6 (w) | 120.8 (br) | 93.2 | 52.0 |
| 135 | 100 | — | 27,230 | 1.28 | −17.8 (w) | 113.5 (br) | 81.2 | 44.8 |
| 138 | 100 | — | 24,420 | 1.31 | −17.9 (w) | 112.6 (br) | 79.7 | 44.3 |
| 139 | 100 | — | 26,330 | 1.29 | −17.6 (w) | 112.5 (br) | 79.7 | 44.6 |
| 95 | — | 100 | 37,320 | 1.38 | −7.2 | — | — | — |
| 142 | 51 | 49 | 31,880 | 1.35 | −10.9 | 107.0 (br) | 69.8 | 20.0 |

Conditions: from −80° C. to 150° C.; heating/cooling rate: 10° C./min;
$^a$determined by HT-SEC in TCB (relative to PE);
$^b$from second heating;
$^c$from first cooling A decrease of $T_m$ to 113° C. was observed for the homooligomers by comparison with VT-iPP (121° C.), probably due to the loss of tacticity introduced by the chain formed between the macromonomers. Similar observations were made for the crystallization temperatures (from $T_c$=93° C. for VT-iPP to $T_c$ ~80° C. for the product). The $T_g$s (appearing as weak transitions) of the oligomers were higher (−20° C.) than the one measured for VT-iPP (−33° C.). Interestingly, the cooligomer 142, isolated as a white powder and composed by 50% in weight of amorphous aPP moieties, exhibited a melting point at 107° C. In addition, a $T_g$ at −11° C. was observed as well, close to the value calculated with the Flory equation for statistical copolymers (−9° C.).

Oligomerization of aPP Fractions

In these examples, $Ph_2C(C_5H_4)(C_{13}H_8)HfMe_2$ was purchased from Boulder Scientific. $[PhNHMe_2][B(C_6F_5)_4]$ was purchased from Albemarle. Anhydrous solvents were purchased from Aldrich and dried over 3 A sieves. Atactic polypropylene (aPP) fractions (MWD ~1.01-1.05) having Mn 214.5 and 259.1 were exuded through a short column of activated basic alumina and stored over 3 A sieves for at least 48 hrs. The neat fraction was transferred to a capped glass vial with TEFLON stir bar and heated to 85° C. A catalyst solution was previously prepared by reacting $Ph_2C(C_5H_4)(C_9H_8)$ $HfMe_2$ (10 mg) and $[PhNHMe_2][B(C_6F_5)_4]$ (16.6 mg) in 1 g of toluene for 30 minutes prior to use. A portion of the catalyst solution (160 mg, 3.3×10$^{-6}$ mol) was added to the reaction mixture and the reaction was stirred for 12 hrs. The product was dried in a vacuum oven at 100° C. for 14 hrs. The results are presented in Table 25.

TABLE 25

Oligomerization of Fractionated aPP

| Property | Run F1 | Run F2 |
|---|---|---|
| aPP Mn $^1$H NMR | 214.5 | 259.1 |
| aPP Tg, ° C. | −129 | −113.1 |
| aPP MWD | <1.05 | <1.05 |
| VTM, g | 2.8 | 5.2 |
| Hf catalyst, 10$^{-6}$ mol | 3.3 | 2.5 |
| Diluent | 0 | 0 |
| Triethylaluminum, 10$^{-6}$ mol | 100 | 0 |
| Temperature, ° C. | 85 | 85 |
| Polymacromonomer Mn | 13,380 | 15,422 |
| Polymacromonomer Mw | 31,018 | 33,159 |
| Polymacromonomer Mz | 49,403 | 53,126 |
| Polymacromonomer g'$_{vis}$ | 0.138 | 0.123 |

From the foregoing data, it is seen that a series of VT-aPP macromonomers with $M_n$ from 125 to 6,400 Da were oligomerized using the bis(phenolate) ether Hf complex OMC as catalyst precursor combined with different alkyl aluminum scavengers/activators. Thus, in the presence of TOA, this system proved to be robust at temperatures up to 180° C., and high conversions (95% to 100%) were observed between 60° C. to 180° C. Monitoring conversion, molecular weight and MWD development over time revealed that a maximum molecular weight value was reached at early stages of oligomerization, after which the oligomeric chains chains did not grow further, in spite of monomer consumption. Remarkably, full conversions were obtained for TOA/Hf ratio as low as 10/1 and M/Hf up to 10,000/1. The catalyst system was still active when only 0.2 µmol of OMC was used, and rapidly high conversion was reached with a reaction temperature of 120° C., and at that temperature the system did undergo undergo partial catalyst deactivation. The latter could nonetheless be inhibited by the presence of hydrogen, which acted as catalyst (re)activator, as indicated by the complete conversion of 30,000 mol. eq. of VT-aPP per Hf observed when hydrogen was introduced at the start or at a later stage of the reaction.

The addition of TMA (neat as well as contained in MAO) and $ZnEt_2$ (combined with TOA) resulted in a lowering of molecular weight and to some extent, of MWD, due to chain transfer, even for CTA/Hf ratio as low as 50/1 and 10/1. TOA, TIBA, $Et_2Al(OEt)$, and MAO/BHT did not have such a pronounced effect. However, investigations on chain transfer to $ZnEt_2$ or TMA, in particular via sequential (co)monomer addition, showed that the process was probably non-reversible, yielding to two homooligomers rather than one block-cooligomer.

The homooligomers were mostly viscous oils or sticky waxes, with $T_g$ between −21° C. and 30° C. The $T_g$ of the product appeared to exhibit a maximum for macromonomers in the about 300-350 Da range.

Rheological measurements (viscosity as a function of shear rate at different temperatures ranging from 25° C. to 100° C.) were performed. The rheology was consistent with bottlebrush type polymers. Triple SEC, used to determine the molecular weight of two samples, was also consistent with a bottlebrush molecular morphology.

Suitable reaction conditions were also established to reach full conversion of VT-iPP ($M_a$: 2,100 Da) during oligomerization and cooligomerization experiments, affording semi-crystalline materials with $T_m$ of ~110° C., even in the presence of an amorphous VT-aPP cooligomer. The molecular weight determination by SEC in THF (standards: PS) and HT-SEC in TCB (standards: PE) revealed significant differences between the two methods, also consistent with bottlebrush molecular morphology The values were three times higher in THF. However, similar molecular weight were obtained using PS standards for HT-SEC.

Finally a VT-PE ($M_n$: 750 Da) was successfully homo- and cooligomerized with VT-iPP and two VT-aPP macromonomers, with full monomer conversion.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Thus, the term "comprising" encompasses the terms "consisting essentially of," "is," and "consisting of" and anyplace "comprising" is used "consisting essentially of," "is," or consisting of may be substituted therefor.

What is claimed is:

1. A process to produce polymacromonomers comprising contacting (1) a vinyl-terminated macromonomer having an Mn of 125 Da or more and at least 70% vinyl termination (as measured by $^1$H NMR) relative to total unsaturations, and (2) up to 40 wt % of $C_2$ to $C_{18}$ comonomer, with (3) a catalyst system capable of oligomerizing vinyl-terminated macromonomer, in the presence of a chain transfer agent, under polymerization conditions at a temperature from 20° C. to 180° C. and a reaction time of 1 min to 24 hours to produce a polymacromonomer having a degree of polymerization greater than 10, a branching index $g'(_{vis})$ less than 0.9, a Tg from -10° C. to 40° C., and an Mn of greater than or equal to about 5000 Da.

2. The process of claim 1, wherein the vinyl-terminated macromonomer, prior to polymerization, is one or more of:
   (i) a vinyl-terminated polymer having at least 5% allyl chain ends;
   (ii) a vinyl-terminated polymer having an Mn of at least 200 g/mol (measured by $^1$H NMR) comprising one or more $C_4$ to $C_{40}$ olefin derived units, where the olefin polymer comprises substantially no propylene derived units; and wherein the olefin polymer has at least 5% allyl chain ends;
   (iii) a copolymer having an Mn of 300 g/mol or more (measured by $^1$H NMR) comprising (a) from about 20 mol % to about 99.9 mol % of at least one $C_5$ to $C_{40}$ olefin, and (b) from about 0.1 mol% to about 80 mol% of propylene, wherein the olefin copolymer has at least 40% allyl chain ends;
   (iv) a copolymer having an Mn of 300 g/mol or more (measured by $^1$H NMR), and comprising (a) from about 80 mol % to about 99.9 mol % of at least one $C_4$ olefin, (b) from about 0.1 mol % to about 20 mol % of propylene; and wherein the vinyl-terminated macromonomer has at least 40% allyl chain ends relative to total unsaturation;
   (v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where:
   1) X =(-0.94*(mol % ethylene incorporated) +100), when 10 mol % to 60 mol % ethylene is present in the co-oligomer, 2) X =45, when greater than 60 mol % and less than 70 mol % ethylene is present in the co-oligomer, and 3) X =(1.83* (mol % ethylene incorporated) -83), when 70 mol % to 90 mol % ethylene is present in the co-oligomer;
   (vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;
   (vii) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;
   (viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;
   (ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0;
   (x) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum;
   (xi) vinyl-terminated polyethylene having: (a) at least 60% allyl chain ends; (b) a molecular weight distribution of less than or equal to 4.0; (c) a g'(vis) of greater than 0.95; and (d) an Mn ($^1$H NMR) of at least 20,000 g/mol; and
   (xii) vinyl-terminated polyethylene having: (a) at least 50% allyl chain ends; (b) a molecular weight distribution of less than or equal to 4.0; (c) a g'(vis) of 0.95 or less; (d) an Mn ($^1$H NMR) of at least 7,000 g/mol; and (e) an Mn (GPC)/Mn ($^1$H NMR) in the range of from about 0.8 to about 1.2.

3. The process of claim 1, wherein the g'(vis) of the polymacromonomer is 0.3 or less.

4. The process of claim 1, wherein the vinyl-terminated macromonomer comprises, prior to polymerization:
   1) from 12 to 600 carbon atoms,
   2) an Mn of 170 or more,
   3) an Mw/Mn of from 1.01 to 2.5,
   4) a melting point (Tm) of 60° C. or less, and
   5) less than 10 wt % aromatic containing monomer, based on the weight of the macromonomer.

5. The process of claim 4, wherein the Mw/Mn of the vinyl-terminated macromonomer is from 1.01 to 1.40.

6. The process of claim 4, wherein the vinyl-terminated macromonomer comprises at least 50 mol % atactic polypropylene and has a glass transition temperature (Tg) of less than 0° C.

7. The process of claim 4, wherein the degree of polymerization of the polymacromonomer is 15 or more.

8. The process of claim 1, wherein the Mw/Mn of the vinyl-terminated macromonomer is less than 1.1.

9. The process of claim 1, wherein the vinyl-terminated macromonomer, prior to polymerization, has an MWD (Mw/Mn) from 1.01 to 1.05.

10. The process of claim 1, wherein the vinyl-terminated macromonomer is derived from a fraction of a precursor macromonomer.

11. The process of claim 1, wherein the catalyst system comprises the compound represented by the formula:

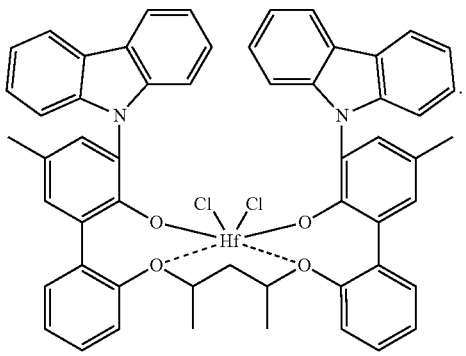

12. The process of claim 11, wherein the vinyl-terminated macromonomer is polypropylene.

13. The process of claim 11, wherein the vinyl-terminated macromonomer comprises isotactic polypropylene and atactic polypropylene.

14. The process of claim 11, wherein the chain transfer agent is selected from an aluminum containing compound or a combination of an aluminum containing compound and a zinc containing compound, and the catalyst system comprises a ratio of equivalents of Al/Hf from about 10 to 10,000.

15. The process of claim 11, wherein a ratio of equivalents of macromonomer/catalyst Hf is greater than 500.

16. The process of claim 1, wherein the chain transfer agent is reversible.

17. The process of claim 1, wherein the chain transfer agent is selected from an aluminum containing compound, a zinc containing compound, or a combination thereof.

18. The process of claim 1, wherein the chain transfer agent comprises an aluminum containing compound comprising one or a combination of an alkylalumoxane and a compound represented by the formula:

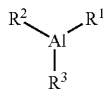

wherein each of $R^1$, $R^2$, and $R^3$ individually comprise a $C_1$-$C_{20}$ hydrocarbyl radical.

19. The process of claim 18, wherein the chain transfer agent further comprises a zinc containing compound represented by the formula $ZnR^1R^2$, wherein each $R^1$ and $R^2$ is individually a $C_1$-$C_{20}$ hydrocarbyl radical.

20. The process of claim 1, wherein the catalyst system comprises an activator represented by the formula:

$$(Z)_d^+(A^{d-})$$

wherein Z is (L-H), or a reducible Lewis Acid, wherein L is a neutral Lewis base;

H is hydrogen;

(L-H)+ is a Bronsted acid;

$A^{d-}$ is a non-coordinating anion having the charge d-; and d is an integer from 1 to 3.

21. The process of claim 1, wherein the vinyl-terminated macromonomer and up to 40 wt % of $C_2$ to $C_{18}$ comonomer are contacted with the oligomerization catalyst system in the presence of hydrogen.

22. The process of claim 1, wherein the polymacromonomer comprises an Mn (SEC-vis) greater than Mn (SEC-RI) and an MWD (SEC-RI) greater than MWD (SEC-vis).

23. The process of claim 1, wherein the polymacromonomer comprises a flow activation energy greater than 10 kcal/mol.

24. A process to produce polymacromonomers comprising contacting (1) a vinyl-terminated macromonomer having an Mn of 160 Da or more and at least 30% vinyl termination (as measured by $^1$H NMR) relative to total unsaturations, and (2) up to 40 wt % of $C_2$ to $C_{18}$ comonomer, with (3), optionally, a catalyst system capable of oligomerizing vinyl-terminated macromonomer, in the presence of a reversible chain transfer agent selected from an aluminum containing compound, a zinc containing compound, or a combination thereof, under polymerization conditions at a temperature from 20° C. to 180° C. and a reaction time of 1 min to 24 hours to produce a polymacromonomer having a degree of polymerization greater than 10, a branching index g'(vis) less than 0.9, a Tg from -10° C. to 40° C. and an Mn of greater than or equal to about 1500 Da.

25. A process to produce polymacromonomers comprising contacting (1) a vinyl-terminated atactic propylene macromonomer comprising from 12 to 600 carbon atoms, an Mn of 220 Da or more, a melting point (Tm) of 60° C. or less and at least 70% vinyl termination (as measured by $^1$H NMR) relative to total unsaturations, and (2) up to 40 wt % of $C_2$ to $C_{18}$ comonomer, with (3), a hafnium catalyst system capable of oligomerizing vinyl-terminated macromonomer, in the presence of a reversible chain transfer agent selected from an aluminum containing compound, a zinc containing compound, or a combination thereof, under polymerization conditions at a temperature from 20° C. to 180° C., a ratio of equivalents of Al/Hf from about 10 to 10,000, a ratio of equivalents of macromonomer/catalyst Hf greater than 500 and a reaction time of 1 min to 24 hours, to produce a polymacromonomer having a degree of polymerization greater than 10, a branching index g'(vis) less than 0.3, a Tg from −10° C. to 40° C., an Mn of greater than or equal to about 5000 Da, an Mn (SEC-vis) greater than Mn (SEC-RI), an MWD (SEC-RI) greater than MWD (SEC-vis) and a flow activation energy greater than 10 kcal/mol.

26. A polymacromonomer comprising at least one vinyl-terminated macromonomer and from 0 wt % to 40 wt % of a $C_2$ to $C_{18}$ comonomer, wherein the polymacromonomer has a degree of polymerization greater than 10, an Mn greater than 5000 Da, a branching index g'(vis) less than 0.9, and a glass transition temperature less than 60° C., wherein the macromonomer prior to polymerization comprises:

1) from 12 to 600 carbon atoms,
2) an Mn of 170 or more,
3) a melting point (Tm) of 60° C. or less, and
4) less than 10 wt % aromatic containing monomer, based on the weight of the macromonomer.

27. The polymacromonomer of claim 26, wherein the vinyl-terminated macromonomer comprises polypropylene.

28. The polymacromonomer of claim 26, wherein the vinyl-terminated macromonomer comprises atactic polypropylene.

29. The polymacromonomer of claim 26, wherein the vinyl-terminated macromonomer comprises isotactic polypropylene and atactic polypropylene.

30. The polymacromonomer of claim 26, wherein the Mw/Mn of the vinyl-terminated macromonomer is less than 1.5.

31. The polymacromonomer of claim 26, wherein the g' of the polymacromonomer is 0.3 or less.

32. The polymacromonomer of claim 26 having an MWD greater than or equal to about 1.5.

33. The polymacromonomer of claim 26, wherein the degree of polymerization of the polymacromonomer is 15 or more.

34. The polymacromonomer of claim 26, wherein the degree of polymerization of the polymacromonomer is from 30 to 200.

35. The polymacromonomer of claim 26, comprising a shear thinning rheology.

36. The polymacromonomer of claim 26, comprising a zero shear viscosity at 35° C. greater than 100 Pa·s and a zero shear viscosity at 100° C. less than 100 Pa·s.

37. The polymacromonomer of claim 26, comprising an Mn (SEC-vis) greater than Mn (SEC-RI) and an MWD (SEC-vis) less than MWD (SEC-RI).

38. The polymacromonomer of claim 26, comprising a flow activation energy greater than 5 kcal/mol.

39. The polymacromonomer of claim 26, wherein the branching index g'(vis) is less than 0.25.

* * * * *